(12) United States Patent
Liu et al.

(10) Patent No.: US 12,018,849 B2
(45) Date of Patent: Jun. 25, 2024

(54) REAR PANEL ASSEMBLY OF WINDOW AIR CONDITIONER, WINDOW AIR CONDITIONER, AND WINDOW AIR CONDITIONER APPARATUS

(71) Applicants: GD MIDEA AIR-CONDITIONING EQUIPMENT CO., LTD., Foshan (CN); MIDEA GROUP CO., LTD., Foshan (CN)

(72) Inventors: Yu Liu, Foshan (CN); Zhigang Xing, Foshan (CN); Kangwen Zhang, Foshan (CN); Zhisheng Lei, Foshan (CN); Hui Yu, Foshan (CN)

(73) Assignees: GD MIDEA AIR-CONDITIONING EQUIPMENT CO., LTD., Foshan (CN); MIDEA GROUP CO., LTD., Foshan (CN)

( * ) Notice: Subject to any disclaimer, the term of this patent is extended or adjusted under 35 U.S.C. 154(b) by 404 days.

(21) Appl. No.: 17/427,284

(22) PCT Filed: Jan. 17, 2020

(86) PCT No.: PCT/CN2020/072723
§ 371 (c)(1),
(2) Date: Jul. 30, 2021

(87) PCT Pub. No.: WO2020/156237
PCT Pub. Date: Aug. 6, 2020

(65) Prior Publication Data
US 2022/0113040 A1    Apr. 14, 2022

(30) Foreign Application Priority Data

Feb. 3, 2019  (CN) .......................... 201910108811.6
Feb. 3, 2019  (CN) .......................... 201920188022.3
(Continued)

(51) Int. Cl.
*F24F 1/02*         (2019.01)
*F24F 1/028*        (2019.01)
(Continued)

(52) U.S. Cl.
CPC .............. *F24F 1/028* (2019.02); *F24F 1/031* (2019.02)

(58) Field of Classification Search
CPC .. F24F 1/028; F24F 1/029; F24F 1/031; F24F 13/20; F24F 2013/205; H05K 5/00
See application file for complete search history.

(56) References Cited

U.S. PATENT DOCUMENTS 6,218,752 B1 *   4/2001  Chang ...................... F16M 7/00
                                                      248/676
7,818,974 B2 *  10/2010  Kim ........................ F24F 13/24
                                                       62/262
2017/0343016 A1 * 11/2017  Kim .................... F04D 25/0693

FOREIGN PATENT DOCUMENTS

CN          201306798 Y        9/2009
CN          202040958 U       11/2011
(Continued)

OTHER PUBLICATIONS

World Intellectual Property Organization (WIPO) International Search Report and Written Opinion for PCT/CN2020/072723 Apr. 17, 2020 17 pages (with translation).
(Continued)

*Primary Examiner* — Marc E Norman
(74) *Attorney, Agent, or Firm* — Anova Law Group, PLLC

(57) ABSTRACT

A rear panel assembly includes a rear panel body provided with a vent and a motor bracket arranged at a side of the rear panel body and connected to the rear panel body. The motor bracket is at least partially opposite to the vent, and the
(Continued)

motor bracket is provided with an air hole to allow air to flow into the vent through the air hole.

18 Claims, 36 Drawing Sheets

(30) Foreign Application Priority Data

Feb. 3, 2019 (CN) .......................... 201920188023.8
Feb. 3, 2019 (CN) .......................... 201920188024.2

(51) Int. Cl.
*F24F 1/03* (2019.01)
*F24F 1/031* (2019.01)

(56) References Cited

FOREIGN PATENT DOCUMENTS

| CN | 105937802 A | 9/2016 |
|---|---|---|
| CN | 205641445 U | 10/2016 |
| CN | 107328084 A | 11/2017 |
| CN | 108302653 A | 7/2018 |
| CN | 108626871 A | 10/2018 |
| CN | 207936330 U | 10/2018 |
| CN | 108758865 A | 11/2018 |
| CN | 108870565 A | 11/2018 |
| CN | 109724163 A | 5/2019 |
| CN | 209689080 U | 11/2019 |
| JP | 2002168198 A | 6/2002 |
| JP | 2009168437 A | 7/2009 |
| KR | 20040055827 A | 6/2004 |
| KR | 20060082335 A | 7/2006 |

OTHER PUBLICATIONS

Canadian Intellectual Property Office the Office Action for CA Application No. 3128411 Dec. 7, 2022 5 Pages.
The China National Intellectual Property Administration (CNIPA) The First Office Action for Chinese Application 201910108811.6, Nov. 8, 2023 31 Pages (With Translation).

* cited by examiner

REAR PANEL ASSEMBLY OF WINDOW AIR CONDITIONER, WINDOW AIR CONDITIONER, AND WINDOW AIR CONDITIONER APPARATUS

CROSS-REFERENCE TO RELATED APPLICATIONS

This application is a National Stage Entry under 35 U.S.C. § 371 of International Application No. PCT/CN2020/072723, filed on Jan. 17, 2020, which is based on and claims priority to Chinese Patent Application Nos. 201920188024.2, 201910108811.6, 201920188022.3 and 201920188023.8, all filed on Feb. 3, 2019, the entire contents of all of which are incorporated herein by reference.

FIELD

This application relates to the field of air treatment technology and, more particularly, to a rear panel assembly of a window air conditioner and a window air conditioner.

BACKGROUND

In the related art, ventilation of outdoor parts of window air conditioners are restricted due to obstruction of internal components, which results in low heat exchange efficiency of the window air conditioners, and in turn leads to reduction of cooling and heating capacity of the window air conditioners.

SUMMARY

The present disclosure aims to solve at least one of the above technical problems in the related art. Accordingly, the present disclosure proposes a rear panel assembly of a window air conditioner, which has a large ventilation area.

The present disclosure also proposes a window air conditioner that includes the above rear panel assembly.

A rear panel assembly according to embodiments of the present disclosure includes: a rear panel body provided with a vent; and a motor bracket arranged at a side of the rear panel body and connected to the rear panel body, the motor bracket being at least partially opposite to the vent, and the motor bracket being provided with an air hole to allow air to flow into the vent through the air hole.

For the rear panel assembly according to the embodiments of the present disclosure, the motor bracket is provided with the air hole so that air can flow into the vent through the air hole, which reduces air obstruction by the motor bracket, increases a ventilation area on an air inlet side of an impeller, and improves heat exchange efficiency of the window air conditioner, thereby enhancing cooling and heating capacity of the window air conditioner. In addition, the air hole is arranged at the motor bracket, which can also reduce resistance in the air flow process and lower noise.

According to some embodiments of the present disclosure, the motor bracket includes: a motor mounting part; a support part, a first end of the support part being connected to an outer peripheral wall of the motor mounting part, and a second end of the support part being connected to the rear panel body; and at least one connection arm, a first end of the connection arm being connected to the outer peripheral wall of the motor mounting part, and a second end of the connection arm being connected to the rear panel body, in which the at least one connection arm and the support part are distributed at intervals along a peripheral direction of the motor mounting part; the motor mounting part, at least a portion of the support part, and at least a portion of the connection arm are all opposite to the vent; at least one of the motor mounting part, the support part, and the at least one connection arm is provided with the air hole.

In some embodiments of the present disclosure, the rear panel body includes a support member, and the second end of the support part is connected to the support member.

In some embodiments of the present disclosure, the support part includes a first bottom plate and a plurality of staggered rib plates, and the plurality of rib plates are connected to a side of the first bottom plate away from the rear panel body.

In some embodiments of the present disclosure, the motor mounting part is provided with a motor mounting hole for mounting a motor.

In some embodiments of the present disclosure, the motor mounting part includes a second bottom plate, a first annular plate, and a second annular plate; the first annular plate and the second annular plate are both connected to a side of the second bottom plate away from the rear panel body; the second annular plate is sleeved outside the first annular plate, and the first annular plate is spaced apart from the second annular plate; a plurality of connection plates are connected between the first annular plate and the second annular plate and arranged at intervals along a circumferential direction of the first annular plate; the first annular plate forms the motor mounting hole, and the second bottom plate is provided with an avoidance hole opposite to the motor mounting hole.

In some embodiments of the present disclosure, the at least one connection arm is provided with a plurality of air holes, and the plurality of air holes are distributed at intervals along a length direction of the connection arm.

In some embodiments of the present disclosure, the connection arm includes: a first segment, a first end of the first segment being connected to the rear panel body; and a second segment, a first end of the second segment being connected to a second end of the first segment, while a second end of the second segment being connected to the outer peripheral wall of the motor mounting part, in which the first segment and the second segment are at an angle to each other.

In some embodiments of the present disclosure, a projection of the second segment in a plane, where the vent is located, is located inside the vent, and a projection of the first segment in the plane, where the vent is located, is located outside the vent.

In some embodiments of the present disclosure, the connection arm includes a bottom plate and two side plates; respective first ends of the two side plates are connected to the bottom plate to form a recess; the recess extends along a length direction of the connection arm, and an opening of the recess faces a space formed by the motor bracket and the rear panel.

In some embodiments of the present disclosure, the bottom plate and the side plates are connected through smooth transition.

According to some embodiments of the present disclosure, an inner wall of the vent is smoothly connected to a surface of the rear panel body facing the motor bracket.

According to some embodiments of the present disclosure, an air guide ring is arranged at the vent and extends toward a side away from the motor bracket.

According to some embodiments of the present disclosure, the window air conditioner includes a heat exchanger, and side boards are arranged at opposite sides of the heat exchanger; a first vertical plate and a second vertical plate are arranged at each of two opposite sides of the rear wall body and spaced apart from each other; the first vertical plate and the second vertical plate both extend in a vertical direction; a first baffle is connected between a first end of the first vertical plate and a first end of the second vertical plate; a plurality of first baffles are spaced apart in the vertical direction, and a gap is formed between two adjacent first baffles; in which a second end of one of the first vertical plate and the second vertical plate is connected with a second baffle, and the second baffle is parallel to the first baffle; there is a space between the second baffle and the other of the first vertical plate and the second vertical plate, to allow the side board to pass through; there are a plurality of second baffles in one-to-one correspondence with and opposite to a plurality of gaps; and a portion of the side board is located in a sliding groove formed by the first baffle and the second baffle; and in which a surface of the first baffle facing the sliding groove has a first inclined guide surface, and the first inclined guide surface is located on a lower end of the first baffle and is inclined toward a direction away from the sliding groove in an up-to-down direction; a surface of the second baffle facing the sliding groove has a second inclined guide surface, and the second inclined guide surface is located at a lower end of the second baffle and is inclined toward the direction away from the sliding groove in the up-to-down direction.

According to some embodiments of the present disclosure, the rear panel body has a vertical reference plane passing through a central axis of the vent; a first water-retaining rib is arranged at the vent and located on a first side of the reference plane; the first water-retaining rib protrudes toward a side of the rear panel body close to the motor bracket; the first water-retaining rib extends along a peripheral direction of the vent; and a lower end of the first water-retaining rib is adjacent to a bottom end of the vent.

In some embodiments of the present disclosure, an angle between a connection line between a bottom end of the first water-retaining rib and a center of the vent and the reference plane is $\alpha 1$ that satisfies: $10° \leq \alpha 1 \leq 20°$.

In some embodiments of the present disclosure, an angle between a connection line between a top end of the first water-retaining rib and the center of the vent and the reference plane is $\alpha 2$ that satisfies: $45° \leq \alpha 2 \leq 145°$.

In some embodiments of the present disclosure, $\alpha 2$ satisfies: $90° \leq \alpha 2 \leq 145°$.

In some embodiments of the present disclosure, a second water-retaining rib is arranged at the vent and located on a second side of the reference plane; the second water-retaining rib protrudes toward the side of the rear panel body close to the motor bracket; the second water-retaining rib extends along the peripheral direction of the vent; and a lower end of the second water-retaining rib is adjacent to the bottom end of the vent.

Further, an angle between a connection line between a bottom end of the second water-retaining rib and the center of the vent and the reference plane is $\beta 1$ that satisfies: $10° \leq \beta 1 \leq 20°$.

In some embodiments of the present disclosure, an angle between a connection line between a top end of the second water-retaining rib and the center of the vent and the reference plane is $\beta 2$ that satisfies: $45° \leq \beta 2 \leq 65°$.

A window air conditioner according to embodiments of the present disclosure includes: a housing; and the above rear panel assembly that is arranged at the housing For the window air conditioner according to the embodiments of the present disclosure, the motor bracket is provided with the air hole so that air can flow into the vent through the air hole, which reduces air obstruction by the motor bracket, increases a ventilation area on an air inlet side of an impeller, and improves heat exchange efficiency of the window air conditioner, thereby enhancing cooling and heating capacity of the window air conditioner. In addition, the air hole is arranged at the motor bracket, which can also reduce resistance in the air flow process and lower noise.

According to some embodiments of the present disclosure, the window air conditioner is supported in a window opening of a wall body, and a movable window is arranged at the window opening; the housing has a receiving groove, and at least a portion of the window is extendable into the receiving groove; the window air conditioner further includes a sealing assembly in contact with the window and an inner wall of the window opening, in which the sealing assembly includes: a first connection component having a variable length, including: a fixed member located in the receiving groove and a sliding block in sliding cooperation with the fixed member; and a plurality of second connection components, any one of the plurality of second connection components being detachably connected to the sliding block, and any two of the plurality of second connection components being detachably connected to each other.

For a window air conditioner apparatus according to embodiments of the present disclosure, a movable window is arranged at a window opening. The window air conditioner apparatus includes: the above window air conditioner, in which the window air conditioner includes a housing provided with a receiving groove and has a mounted state and an unmounted state; and a mounting assembly including a storage box and a mounting attachment. In the mounted state, the window air conditioner is mounted at the window opening by the mounting attachment, and the receiving groove is adapted to receive a window; in the unmounted state, the mounting attachment is stored in the storage box, and the storage box is placed in the receiving groove and held by opposite side walls of the receiving groove.

For the window air conditioner apparatus according to the embodiments of the present disclosure, in the unmounted state, since the mounting attachment is stored in the storage box, while the storage box is placed in the receiving groove and held by the opposite side walls of the receiving groove, it is beneficial to reducing the size of the packaging box for the window air conditioner apparatus, thereby increasing the packaging quantity of the window air conditioner apparatus, which is conducive to reducing the transportation cost and thus increasing the market competitiveness of the window air conditioner apparatus. Moreover, the overall structural stability of the window air conditioner apparatus can be improved.

In some embodiments of the present disclosure, the storage box is a polystyrene foam member.

In some embodiments of the present disclosure, the mounting attachment includes: a mounting rack including: a rack part mounted on the wall body and configured to mount the window air conditioner; and a connection part connected to the rack part and located on an indoor side or an outdoor side of the wall body; and a spacer mounted at the connection part and located on a side of the connection part close to the wall body, in which a plane perpendicular to the thickness direction of the wall body is defined as a projection plane, and an orthographic projection area S1 of the spacer on the projection plane is larger than an orthographic projection area S2 of the connection part on the projection plane.

In some embodiments of the present disclosure, the spacer includes a telescopic mechanism, and the telescopic mechanism includes a first pulling member and a second pulling member, in which the first pulling member is in sliding cooperation with the second pulling member to adjust a length of the telescopic mechanism telescopically.

In some embodiments of the present disclosure, the first pulling member is mounted at the connection part, and the second pulling member is fitted over and slides outside the first pulling member.

In some embodiments of the present disclosure, the first pulling member has a plurality of first positioning holes, and the second pulling member has a second positioning hole; the mounting attachment includes a positioning member, and the positioning member is inserted through the second positioning hole and the first positioning hole right opposite to the second positioning hole.

In some embodiments of the present disclosure, the mounting attachment includes a connection member, and the spacer is detachably mounted at the connection part by the connection member.

In some embodiments of the present disclosure, the mounting rack includes a bottom-holding member connected to a lower portion of the connection part and supported on a bottom of the spacer.

In some embodiments of the present disclosure, the rack part has at least one articulation hole; the mounting attachment includes: a support rod, a first end of the support rod being articulated with the rack part through the articulation hole, and a second end of the support rod having an anti-slip member and abutting against the wall body.

In some embodiments of the present disclosure, the rack part is arranged at a bottom edge of the window opening; the connection part extends downward from the rack part; and the spacer extends along a length direction of the bottom edge.

In some embodiments of the present disclosure, the window air conditioner further includes a sealing assembly in contact with the window and an inner wall of the window opening, in which the sealing assembly includes: a first connection component having a variable length, including: a fixed member partially located in the receiving groove and a sliding block in sliding cooperation with the fixed member; and a plurality of second connection components, any one of the plurality of second connection components being detachably connected to the sliding block, and any two of the plurality of second connection components being detachably connected to each other.

In some embodiments of the present disclosure, the sealing assembly includes a rotatable support fixed to the housing, and the fixed member is rotatably located on the rotatable support to allow the sealing assembly to rotate to be stored in the receiving groove.

In some embodiments of the present disclosure, the window air conditioner includes a sliding positioning assembly, in which the sliding positioning assembly is located on the fixed member and cooperates with the sliding block to position the sliding block in a current position.

In some embodiments of the present disclosure, the fixed member is provided with a sliding cavity, and at least a portion of the sliding block extends into the sliding cavity; the sliding positioning assembly is a rotation member, and the rotation member is rotatably inserted into the fixed member and in threaded fit with the fixed member; the rotation member rotates to adjust a length of a portion, extending into the sliding cavity, of the rotation member; the rotation member is able to abut against the sliding block to position the sliding block.

In some embodiments of the present disclosure, the housing includes: a chassis; a rear case fixed at the chassis and accommodating an outdoor heat exchanger; and a front case fixed at the chassis and spaced apart from the rear case to form the receiving groove.

In some embodiments of the present disclosure, the mounting attachment includes a plurality of members; a plurality of receiving cavities are formed within the storage box and spaced apart from each other; and the plurality of receiving cavities are in one-to-one correspondence with the plurality of members, and the plurality of members are received in the corresponding receiving cavities.

Additional aspects and advantages of embodiments of the present disclosure will be given in part in the following descriptions, become apparent in part from the following descriptions, or be learned from the practice of the embodiments of the present disclosure.

Figure 1:
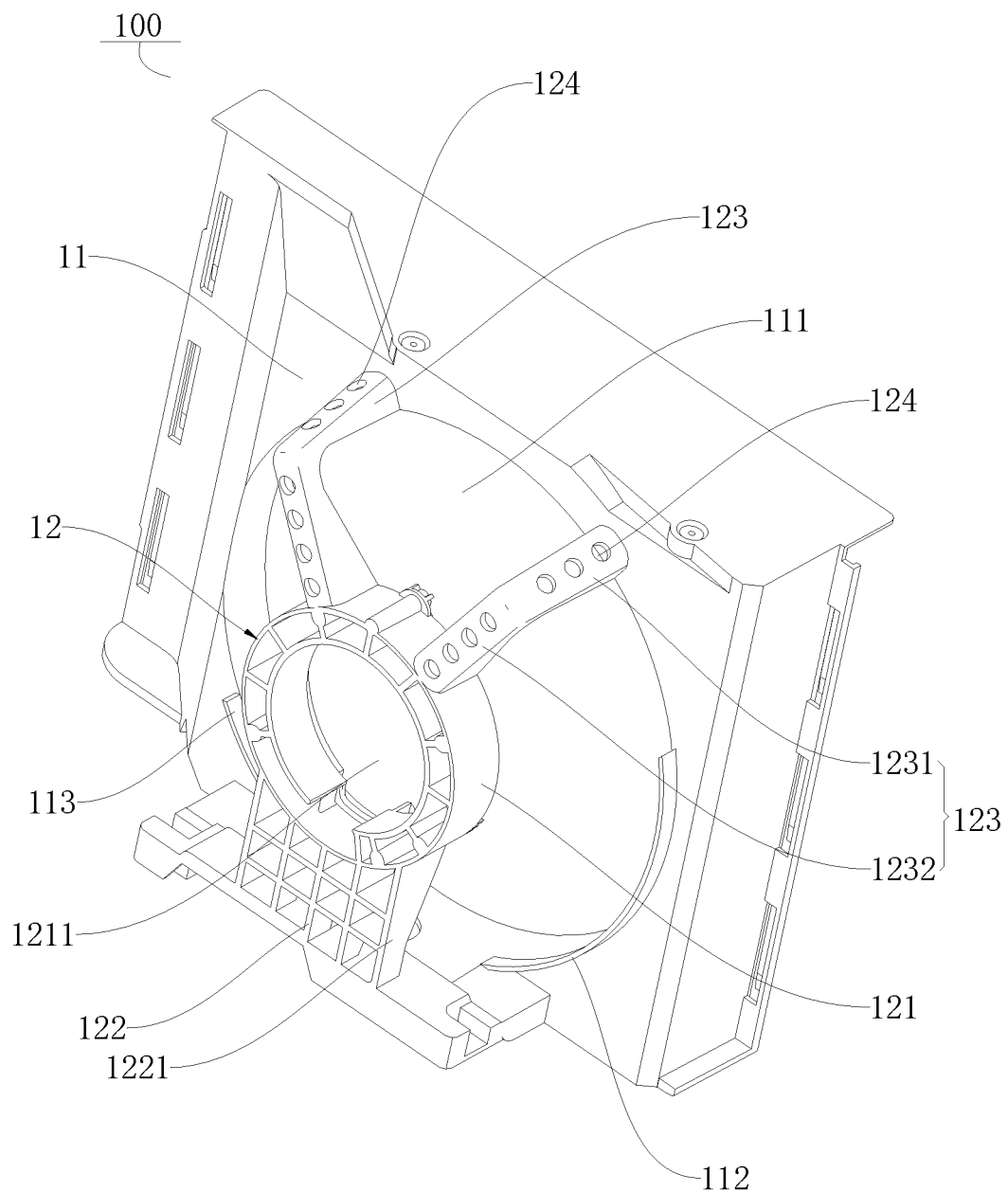
FIG. 1 is a perspective view of a rear panel assembly according to a first embodiment of the present disclosure.

REFERENCE NUMERALS window air conditioner apparatus 10000,
window air conditioner 1000,
rear panel assembly 100,
rear panel body 11, vent 111, first water-retaining rib 112, second water-retaining rib 113, air guide ring 110,
first vertical plate 114, second vertical plate 115, first baffle 116, first inclined guide surface 1161,
second baffle 117, second inclined guide surface 1171, sliding groove 118, gap 119,
motor bracket 12,
motor mounting part 121, motor mounting hole 1211, first annular plate 1212, second annular plate 1213, connection plate 1214, second bottom plate 1215,
support part 122, rib plate 1221, first bottom plate 1222,
connection arm 123, first segment 1231, second segment 1232, bottom plate 1233, side plate 1234, recess 1235,
air hole 124,
housing 200, receiving groove 21,
sealing assembly 300,
first connection component 31, fixed member 311, sliding cavity 3111, sliding block 312,
second connection component 32, insertion member 321, insertion cavity 322,
rotatable support 33,
angle positioning assembly 34, positioning protrusion 341, positioning recess 342,
sliding positioning assembly 35, sealing end cover 36,
indoor part 1011, air inlet a, air outlet b, outdoor part 1012, front case 101a, rear case 101b, chassis 101c, intermediate partition plate 101d, placement space 101e,
mounting assembly 400,
storage box 40, notch 40a, receiving cavity 40b,
mounting attachment 500,
mounting rack 50, rack part 51, articulation hole 51a, connection part 52, bottom-holding member 53, support rod 54, anti-slip member 54a,
spacer 60, telescopic mechanism 61, first end 610a, second end 610b,
first pulling member 611, second pulling member 612, end cap 613, first opening 6111, first positioning hole 6112, second opening 6121, second positioning hole 6122,
positioning member 70, connection member 80,
wall 801, window opening 801a, bottom edge 801b, inner side wall 801c, outer side wall 801d, indoor side 801e, outdoor side 801f, projection plane 900a.

DETAILED DESCRIPTION

Embodiments of the present disclosure will be described in detail below, and examples of the embodiments will be shown in the accompanying drawings. The same or similar elements and the elements having same or similar functions are denoted by like reference numerals throughout the descriptions. The embodiments described below are exemplary and are intended to explain the present disclosure rather than limit the present disclosure.

In the description of the present disclosure, it shall be understood that terms such as "central," "length," "upper," "lower," "front," "rear," "vertical," "top," "bottom," "inner," "outer," "circumferential" and the like should be construed to refer to the orientation as then described or as shown in the drawings under discussion. These relative terms are for convenience and simplicity of description and do not indicate or imply that the devices or elements referred to have a particular orientation and be constructed or operated in a particular orientation. Thus, these terms shall not be construed as limitation on the present disclosure. In addition, the feature associated with "first" and "second" may comprise one or more of this feature. In the description of the present disclosure, the term "a plurality of" means two or more than two, unless specified otherwise.

In the present disclosure, unless specified or defined otherwise, terms "mounted," "connected" and "coupled" should be understood broadly, and may be, for example, fixed connections, detachable connections, or integral connections; may also be mechanical connections, may also be electrical connections; may also be direct connections or indirect connections via intervening structures; may be inner communication of two elements, which can be understood by those skilled in the art according to specific situations.

A rear panel assembly 100 and a window air conditioner 1000 according to a first embodiment of the present disclosure will be described below with reference to the accompanying drawings.

As shown in FIG. 1, the rear panel assembly 100 of the window air conditioner 1000 according to the first embodiment of the present disclosure includes a rear panel body 11 and a motor bracket 12.

Figure 2:
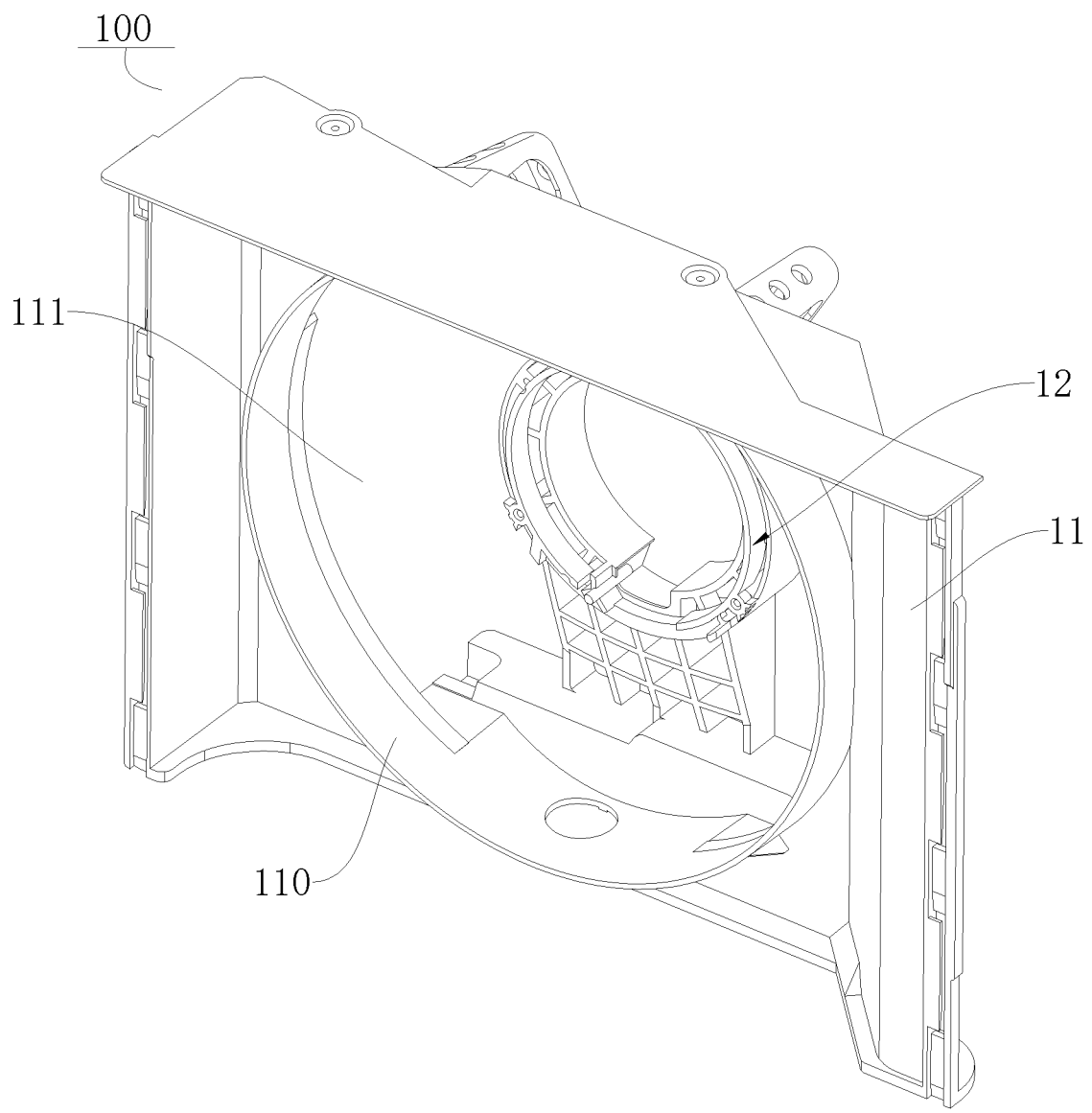
FIG. 2 is a perspective view of the rear panel assembly according to the first embodiment of the present disclosure from another angle of view.

Specifically, as shown in FIGS. 1 and 2, a vent 111 is arranged at the rear panel body 11, the motor bracket 12 is arranged at one side of the rear panel body 11 and connected to the rear panel body 11, and the motor bracket 12 is at least partially opposite to the vent 111. An air guide ring 110 is arranged at the vent 111 and extends toward a side away from the motor bracket 12. A motor can be arranged at the motor bracket 12, and an output shaft of the motor is connected with an impeller to drive the impeller to rotate. The impeller is at least partially located in the air guide ring 110, and the air guide ring 110 can function to guide air.

As shown in FIG. 1, the motor bracket 12 is provided with an air hole 124, to allow air to flow into the vent 111 through the air hole 124. In general, the air enters from an outdoor air inlet of an outdoor portion of the window air conditioner, and under drive of the impeller bypasses the motor bracket and enters the vent to exchange heat with a heat exchanger. However, the motor bracket blocks air intake, which restricts ventilation on an air inlet side of the impeller and reduces heat exchange efficiency. In addition, the motor bracket blocks air flow, increasing resistance to the air flow and noise.

Since the motor bracket 12 is provided with the air hole 124, the air under the drive of the impeller can enter the vent 111 through the air hole 124 in the motor bracket 12, when the air flows, which reduces air obstruction by the motor bracket 12, increases a ventilation area on the air inlet side of the impeller, and improves the heat exchange efficiency of the window air conditioner 1000, thereby enhancing cooling and heating capacity of the window air conditioner 1000. In addition, the air hole 124 is arranged at the motor bracket 12, which can also reduce the resistance in the air flow process and lower the noise.

For the rear panel assembly 100 of the window air conditioner 1000 according to the first embodiment of the present disclosure, the motor bracket 12 is provided with the air hole 124 so that the air can flow into the vent 111 through the air hole 124, which reduces the air obstruction by the motor bracket 12, increases the ventilation area on the air inlet side of the impeller, and improves the heat exchange efficiency of the window air conditioner 1000, thereby enhancing the cooling and heating capacity of the window air conditioner 1000. In addition, the air hole 124 is arranged at the motor bracket 12, which can also reduce the resistance in the air flow process, and lower the noise.

Figure 3:
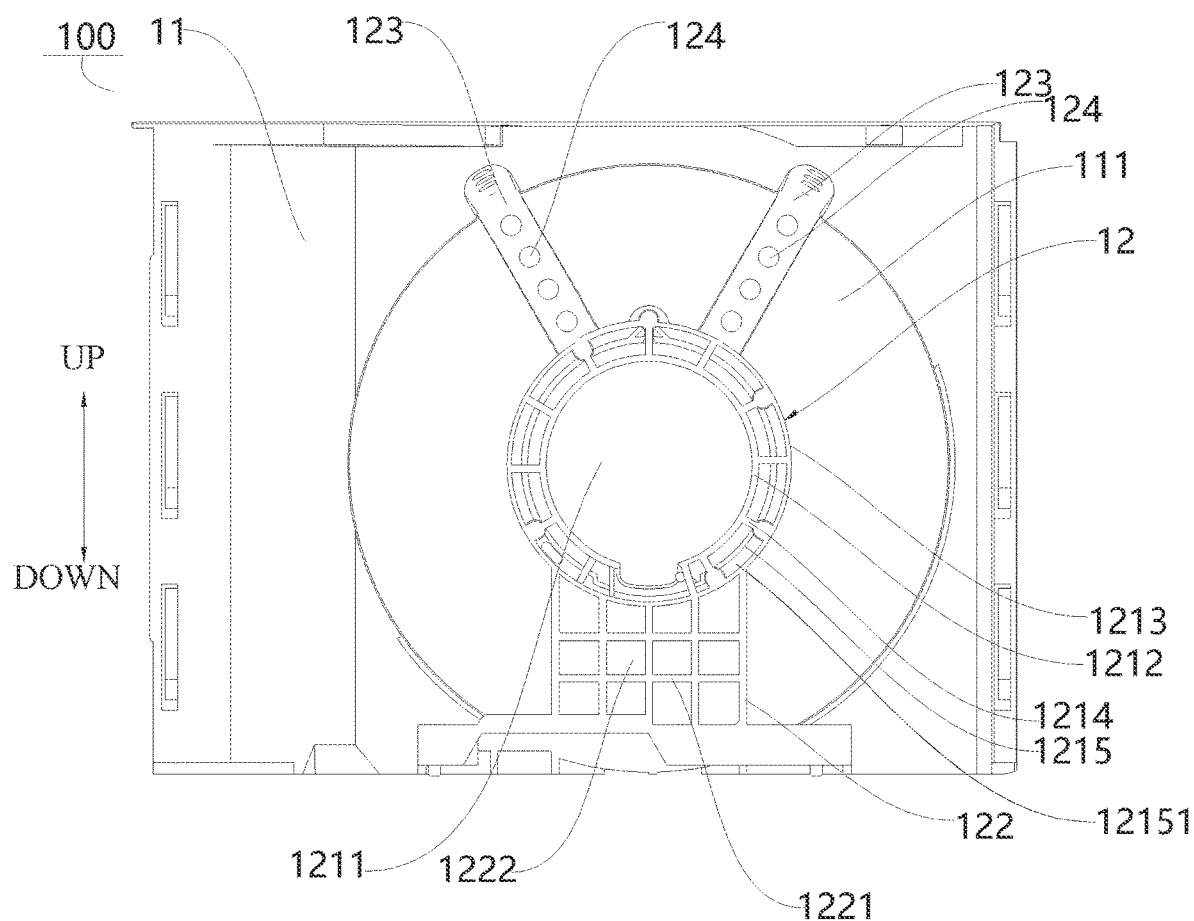
FIG. 3 is a front view of the rear panel assembly according to the first embodiment of the present disclosure.

In some embodiments of the present disclosure, as shown in FIGS. 1 and 3, the motor bracket 12 includes a motor mounting part 121, a support part 122, and at least one connection arm 123. The motor is mounted on the motor mounting part 121, and the motor mounting part 121 is opposite to the vent 111, which makes it convenient for the motor to be connected with the impeller and drive the impeller to rotate. A first end of the support part 122 is connected to an outer peripheral wall of the motor mounting part 121, and a second end of the support part 122 is connected to the rear panel body 11, thereby fixing the motor mounting part 121. The support part 122 is at least partially opposite to the vent 111, facilitating the connection between the support part 122 and the motor mounting part 121 and the connection between the support part 122 and the rear panel body 11.

As shown in FIGS. 1 and 3, a first end of the connection arm 123 is connected to the outer peripheral wall of the motor mounting part 121, and a second end of the connection arm 123 is connected to the rear panel body 11, thereby fixing the motor mounting part 121 and improving reliability of fixation of the motor mounting part 121 and in turn reliability of fixation of the motor. In some embodiments of the present disclosure, as shown in FIG. 3, the at least one connection arm 123 and the support part 122 are distributed at intervals along a peripheral direction of the motor mounting part 121, thereby enhancing a fixing effect on the motor mounting part 121 and a fixing effect on the motor, and improving the reliability of fixation of the motor. The connection arm 123 is at least partially opposite to the vent 111, which not only facilitates the connection between the connection arm 123 and the motor mounting part 121, but also facilitates the connection between the connection arm 123 and the rear panel body 11.

In an example of FIG. 3, the support part 122 is located below the motor mounting part 121 (as shown in FIG. 3), a lower end of the support part 122 is connected to the rear panel body 11, and an upper end of the support part 122 is mounted at the outer peripheral wall of the motor mounting part 121 to support the motor mounting part 121. There are two connection arms 123 both located above the motor mounting part 121 (as shown in FIG. 3). The two connection arms 123 are spaced apart along the peripheral direction of the motor mounting part 121, lower ends of the two connection arms 123 are both connected to the outer peripheral wall of the motor mounting part 121, and upper ends of the two connection arms 123 are both connected to the rear panel body 11, to enhance the fixing effect on the motor mounting part 121.

Figure 4:
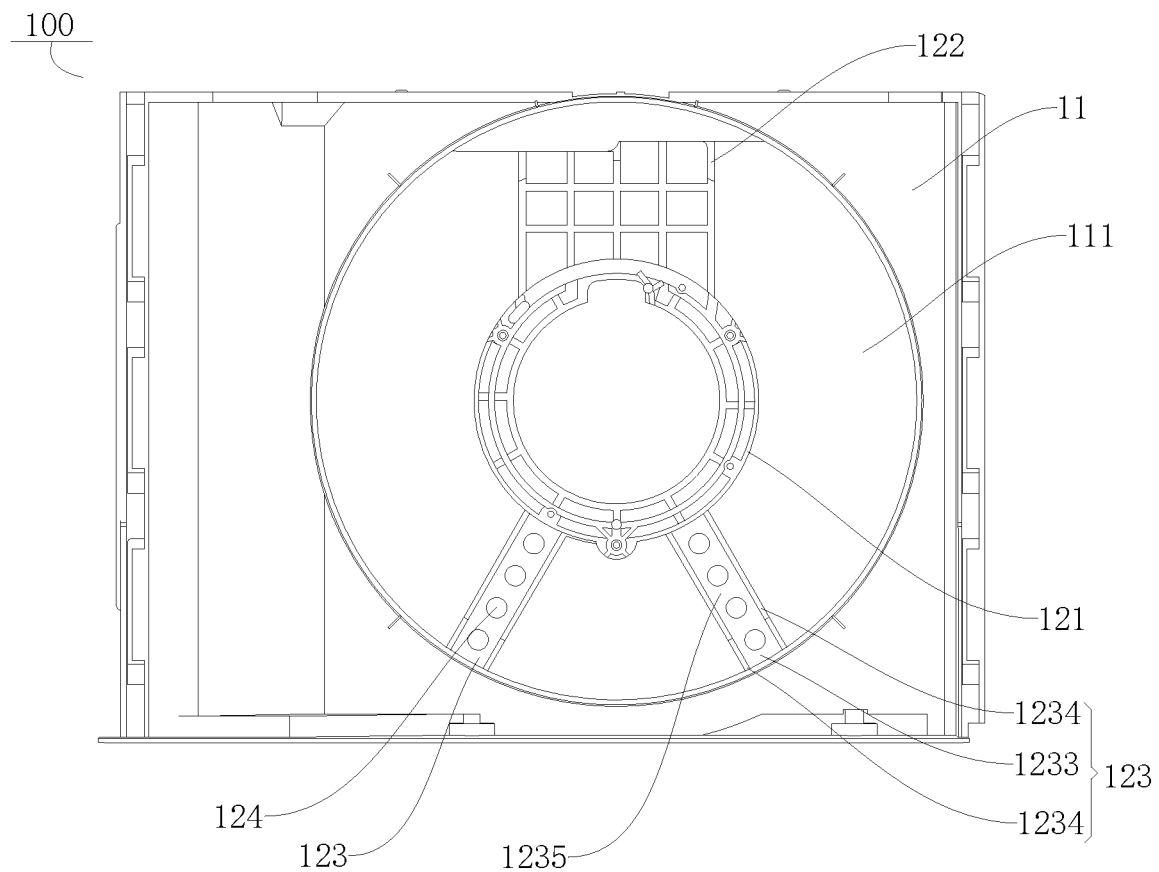
FIG. 4 is a rear view of the rear panel assembly according to the first embodiment of the present disclosure.

In some embodiments of the present disclosure, as shown in FIGS. 3 and 4, at least one of the motor mounting part 121, the support part 122, and the at least one connection arm 123 is provided with the air hole 124. Therefore, the structure of the motor bracket 12 can be diversified to meet different requirements.

In some embodiments of the present disclosure, as shown in FIGS. 1, 3, and 4, the support part 122 includes a first bottom plate 1222 and a plurality of staggered rib plates 1221. The plurality of rib plates 1221 are connected to a side of the first bottom plate 1222 away from the rear panel body 11. As a result, the structural strength of the support part 122 can be enhanced, and a supporting effect of the support part 122 on the motor mounting part 121 can be improved, thereby improving operational reliability of the motor.

In examples shown in FIGS. 3 and 4, the support part 122 includes a plurality of first rib plates extending in a vertical direction and spaced apart in a horizontal direction, and a plurality of second rib plates spaced apart in the vertical direction and extending in the horizontal direction. Each of the second rib plates is connected with each of the first rib plates in a staggered manner, and the first rib plates and the second rib plates are arranged at the first bottom plate 1222.

In some embodiments of the present disclosure, as shown in FIGS. 1 and 3, the motor mounting part 121 is provided with a motor mounting hole 1211 for mounting the motor. The motor can be mounted in the motor mounting hole 1211, which can simplify installation of the motor and improve production efficiency.

Further, as shown in FIGS. 1 and 3, the motor mounting part 121 includes a second bottom plate 1215, a first annular plate 1212, and a second annular plate 1213. The first annular plate 1212 and the second annular plate 1213 are both connected to a side of the second bottom plate 1215 away from the rear panel body 11. The second annular plate 1213 is sleeved outside the first annular plate 1212, and the first annular plate 1212 is spaced apart from the second annular plate 1213. A plurality of connection plates 1214 are connected between the first annular plate 1212 and the second annular plate 1213, and the plurality of connection plates 1214 are arranged at intervals along a circumferential direction of the first annular plate 1212. The first annular plate 1212 forms the motor mounting hole 1211, and the second bottom plate 1215 is provided with an avoidance hole 12151 opposite to the motor mounting hole 1211. As a result, the material of the motor mounting part 121 can be saved, reducing the cost, but also the structural strength of the motor mounting part 121 can be improved, improving the reliability of fixation of the motor.

In some embodiments of the present disclosure, as shown in FIGS. 1 and 3, the connection arm 123 is provided with a plurality of air holes 124, and the plurality of air holes 124 are distributed at intervals along a length direction of the connection arm 123. When flowing through the connection arm 123, the air can flow to the vent 111 via the plurality of air holes 124 on the connection arm 123, which reduces air obstruction by the connection arm 123, increases the ventilation area on the air inlet side of the impeller, and improves the heat exchange efficiency of the window air conditioner 1000, thereby enhancing the cooling and heating capacity of the window air conditioner 1000. In addition, the air holes 124 are arranged at the connection arm 123, which can also reduce the resistance in the air flow process and lower the noise.

Figure 5:
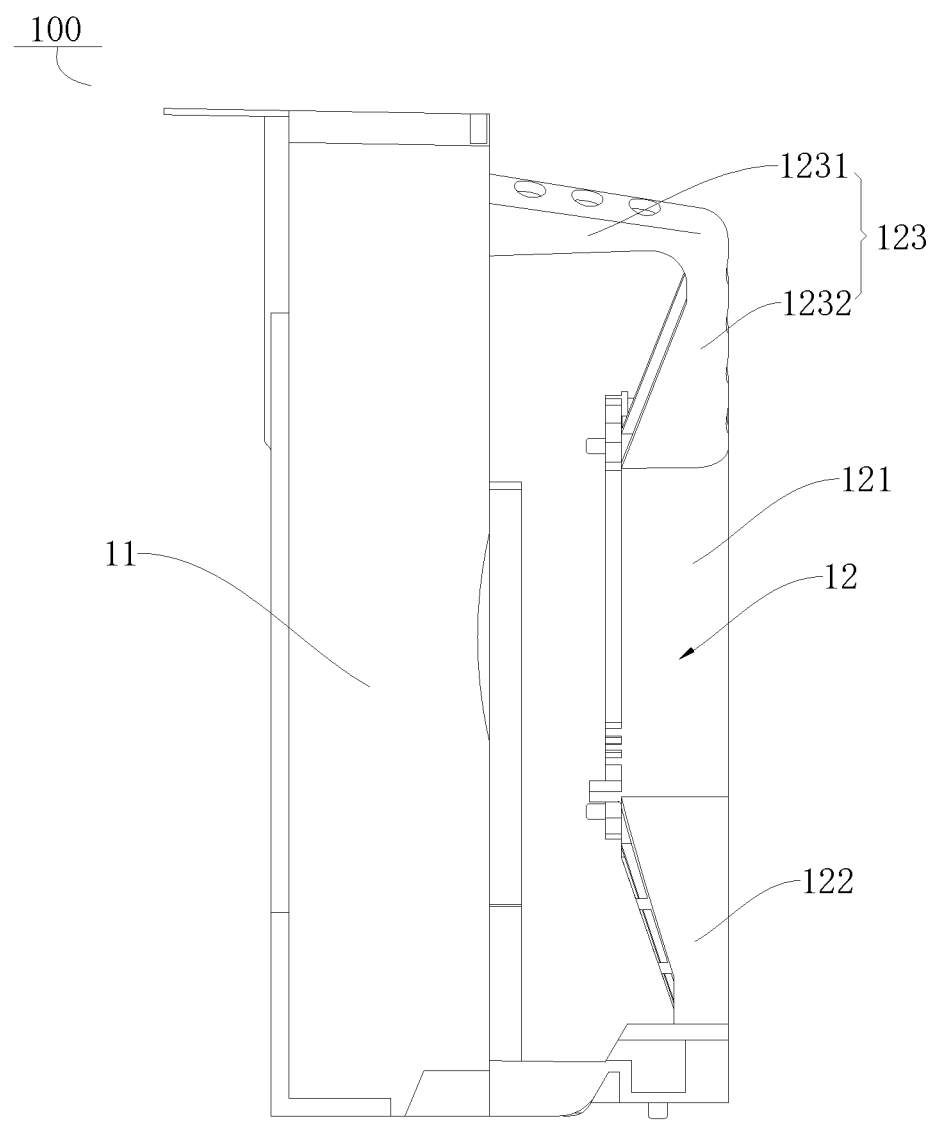
FIG. 5 is a side view of the rear panel assembly according to the first embodiment of the present disclosure.
Figure 6:
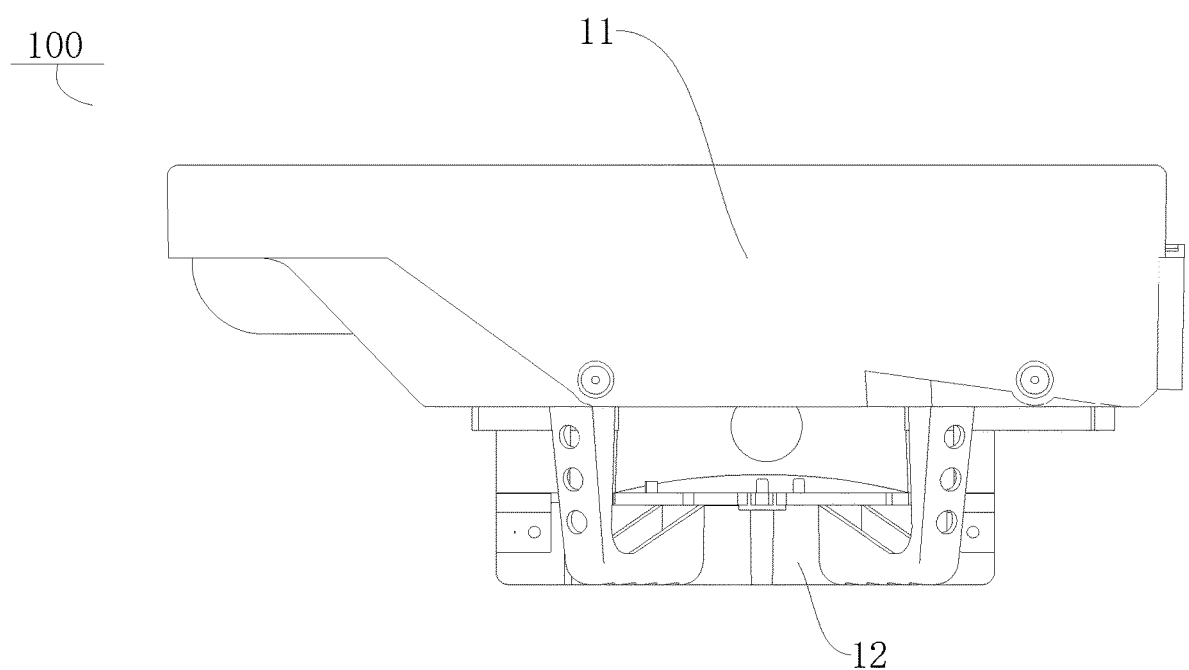
FIG. 6 is a top view of the rear panel assembly according to the first embodiment of the present disclosure.

Further, as shown in FIGS. 1, 5 and 6, the connection arm 123 includes a first segment 1231 and a second segment 1232. A first end of the first segment 1231 is connected to the rear panel body 11; a first end of the second segment 1232 is connected to a second end of the first segment 1231; a second end of the second segment 1232 is connected to the outer peripheral wall of the motor mounting part 121; and the first segment 1231 and the second segment 1232 are at an angle to each other. As a result, the motor mounting part 121 can be spaced apart from the rear panel body 11, which facilitates the installation of the motor and the cooperation between the motor and the impeller. Moreover, the structural strength of the motor bracket 12 can be improved.

At least one of the first segment 1231 and the second segment 1232 is provided with the air hole 124. That is, only the first segment 1231 is provided with the air hole 124, or only the second segment 1232 is provided with the air hole 124, or both the first segment 1231 and the second segment 1232 are provided with the air holes 124. As a result, the structure of the motor bracket 12 can be diversified. In an example shown in FIG. 1, the first segment 1231 and the second segment 1232 are both provided with the air holes 124.

In some embodiments of the present disclosure, as shown in FIGS. 3 and 4, a projection of the second segment 1232 in a plane, where the vent 111 is located, is located inside the vent 111, and a projection of the first segment 1231 in the plane, where the vent 111 is located, is located outside the vent 111. Therefore, the obstruction against air intake by the connection arm 123 can be reduced, which is beneficial to increasing the ventilation area and improving a heat exchange effect of the window air conditioner 1000. As shown in FIG. 5, the second segment 1232 is substantially perpendicular to the rear panel body 11.

In some embodiments of the present disclosure, as shown in FIGS. 1 and 4, the connection arm 123 includes a bottom plate 1233 and two side plates 1234. Respective first ends of the two side plates 1234 are connected to the bottom plate 1233 to form a recess 1235. The recess 1235 extends along the length direction of the connection arm 123, and an opening of the recess 1235 faces a space formed by the motor bracket 12 and the rear panel. The structural strength of the connection arm 123 can be enhanced, and the weight of the motor bracket 12 can be decreased, thereby reducing the weight of the window air conditioner 1000.

Further, as shown in FIG. 1, the bottom plate 1233 and the side plates 1234 are connected through smooth transition. That is, the connection between the bottom plate 1233 and the side plates 1234 is realized by smooth curved surfaces, which can reduce the resistance of the connection arm 123 to the airflow, and lower the noise.

In some embodiments of the present disclosure, as shown in FIG. 3, an inner wall of the vent 111 is smoothly connected to a surface of the rear panel body 11 facing the motor bracket 12. As a result, the resistance at the vent 111 can be reduced, which is beneficial to reducing noise.

In some embodiments of the present disclosure, as shown in FIG. 1, the motor bracket 12 and the rear panel body 11 are integrally formed. As a result, the number of parts can be reduced, the assembly efficiency of the window air conditioner 1000 can be improved, the production efficiency of the window air conditioner 1000 can be improved, and the cost can be effectively reduced.

In some embodiments of the present disclosure, as shown in FIG. 1, the rear panel body 11 has a vertical reference plane passing through a central axis of the vent 111. A first water-retaining rib 112 is arranged at the vent 111 and located on a first side of the reference plane. The first water-retaining rib 112 protrudes toward a side of the rear panel body 11 close to the motor bracket 12. The first water-retaining rib 112 extends along a peripheral direction of the vent 111. A lower end of the first water-retaining rib 112 is adjacent to a bottom end of the vent 111.

It should be noted that during operation of the window air conditioner 1000, condensate water in a water receiving tray is easily thrown out from the water receiving tray. By arranging the first water-retaining rib 112, the first water-retaining rib 112 has a blocking effect on the thrown water, which can prevent the condensate water from being thrown out, improving operational safety of the window air conditioner 1000.

In some embodiments of the present disclosure, an angle between a connection line between a bottom end of the first water-retaining rib 112 and a center of the vent 111 and the reference plane is $\alpha 1$ that satisfies: $10°\leq \alpha 1 \leq 20°$. During the operation of the window air conditioner 1000, the condensate in the water receiving tray has a certain inertial force when it is thrown out, and the condensate water thrown out will continue to move by a certain distance under the action of the inertial force, that is, no condensate is thrown out near the bottom end of the reference plane. By setting the angle between the connection line between the bottom end of the first water-retaining rib 112 and the center of the vent 111 and the reference plane to be between 10° and 20°, it is ensured that a layout range of the first water-retaining rib 112 can be reduced while the rear panel assembly 100 has a better water-retaining effect. Thus, the space occupied by and manufacturing materials used for the first water-retaining rib 112 can be reduced, saving costs.

For example, the angle between the connection line between the bottom end of the first water-retaining rib 112 and the center of the vent 111 and the reference plane may be 12°, 14°, 16°, 18° and son on. Specifically, the angle between the connection line between the bottom end of the first water-retaining rib 112 and the center of the vent 111 and the reference plane can be designed according to the model and working environment of the rear panel assembly 100. Certainly, the present disclosure is not limited thereto, and the angle between the connection line between the bottom end of the first water-retaining rib 112 and the center of the vent 111 and the reference plane may also be 25°, 30°, 35°, etc.

In some embodiments of the present disclosure, an angle between a connection line between a top end of the first water-retaining rib 112 and the center of the vent 111 and the reference plane is $\alpha 2$ that satisfies: $45°\leq \alpha 2 \leq 145°$. By setting the angle between the connection line between the top end of the first water-retaining rib 112 and the center of the vent 111 and the reference plane to be between 45° and 145°, it is possible that the condensate water thrown out can be blocked in a larger range, improving the water-retaining effect of the first water-retaining rib 112.

For example, the angle between the connection line between the top end of the first water-retaining rib 112 and the center of the vent 111 and the reference plane may be 50°, 70°, 90°, 110°, 130° and so on. Specifically, the angle between the connection line between the bottom end of the first water-retaining rib 112 and the center of the vent 111 and the reference plane may be designed according to the model and working environment of the rear panel assembly 100.

In some embodiments of the present disclosure, α2 satisfies: 90°≤α2≤145°. By setting the angle between the connection line between the top end of the first water-retaining rib 112 and the center of the vent 111 and the reference plane to be between 90° and 145°, a water-retaining range of the first water-retaining rib 112 can be further increased, further improving the water-retaining effect of the first water-retaining rib 112, and enhancing the operational safety of the window air conditioner 1000. For example, the angle between the connection line between the top end of the first water-retaining rib 112 and the center of the vent 111 and the reference plane may be 95°, 105°, 115°, 120°, 125°, 130°, 135°, 140°, etc.

In some embodiments of the present disclosure, as shown in FIG. 1, a second water-retaining rib 113 is arranged at the vent 111 and located on a second side of the reference plane. The second water-retaining rib 113 protrudes toward the side of the rear panel body 11 close to the motor bracket 12. The second water-retaining rib 113 extends along the peripheral direction of the vent 111. A lower end of the second water-retaining rib 113 is adjacent to the bottom end of the vent 111. It can be understood that by providing the second water-retaining rib 113, the second water-retaining rib 113 can block water thrown from the second side of the reference plane, to prevent the condensate water from being thrown out from the second side of the reference plane. Thus, the operational safety of the window air conditioner 1000 can be further improved.

Further, an angle between a connection line between a bottom end of the second water-retaining rib 113 and the center of the vent 111 and the reference plane is β1 that satisfies: 10°≤β1≤20°. During the operation of the window air conditioner 1000, the condensate in the water receiving tray has a certain inertial force when it is thrown out, and the condensate water thrown out will continue to move by a certain distance under the action of the inertial force, that is, no condensate is thrown out near the bottom end of the reference plane. By setting the angle between the connection line between the bottom end of the second water-retaining rib 113 and the center of the vent 111 and the reference plane to be between 10° and 20°, it is ensured that a layout range of the second water-retaining rib 113 can be reduced while the rear panel assembly 100 has a better water-retaining effect. Thus, the space occupied by and manufacturing materials used for the second water-retaining rib 113 can be reduced, saving costs.

In some embodiments of the present disclosure, an angle between a connection line between a top end of the second water-retaining rib 113 and the center of the vent 111 and the reference plane is β2 that satisfies: 45°≤β2≤65°. By setting the angle between the connection line between the top end of the second water-retaining rib 113 and the center of the vent 111 and the reference plane to be between 45° and 65°, it is possible that the condensate water thrown out can be blocked in a larger range, improving the water-retaining effect of the second water-retaining rib 113.

For example, the angle between the connection line between the top end of the second water-retaining rib 113 and the center of the vent 111 and the reference plane may be 50°, 55°, 60°, and so on. Specifically, the angle between the connection line between the bottom end of the second water-retaining rib 113 and the center of the vent 111 and the reference plane may be designed according to the model and working environment of the rear panel assembly 100.

A rear panel assembly 100 of a window air conditioner 1000 according to a second embodiment of the present disclosure will be described below with reference to the accompanying drawings. The window air conditioner 1000 includes a heat exchanger and side boards on opposite sides of the heat exchanger.

Figure 12:
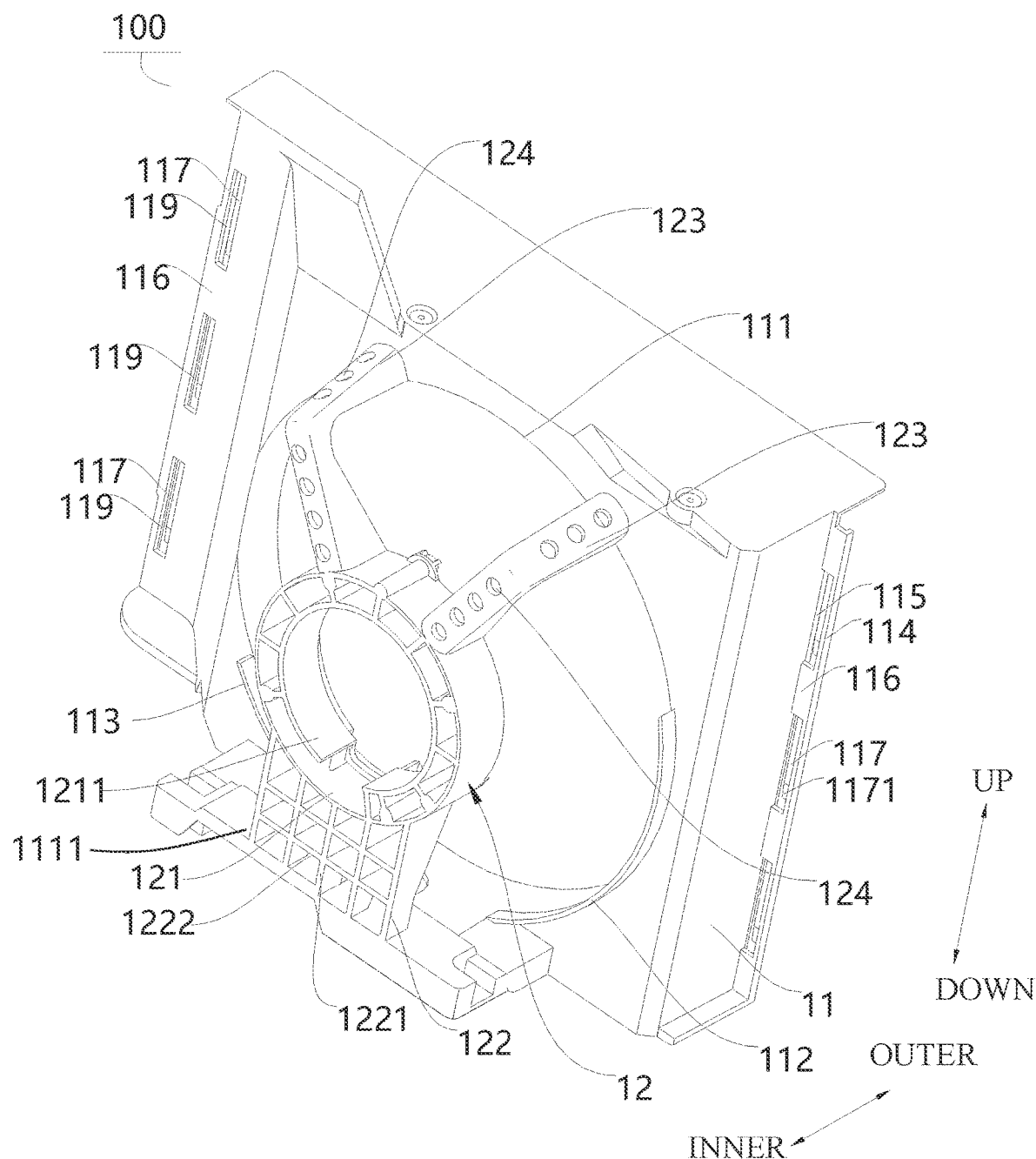
FIG. 12 is a perspective view of a rear panel assembly according to a second embodiment of the present disclosure.
Figure 13:
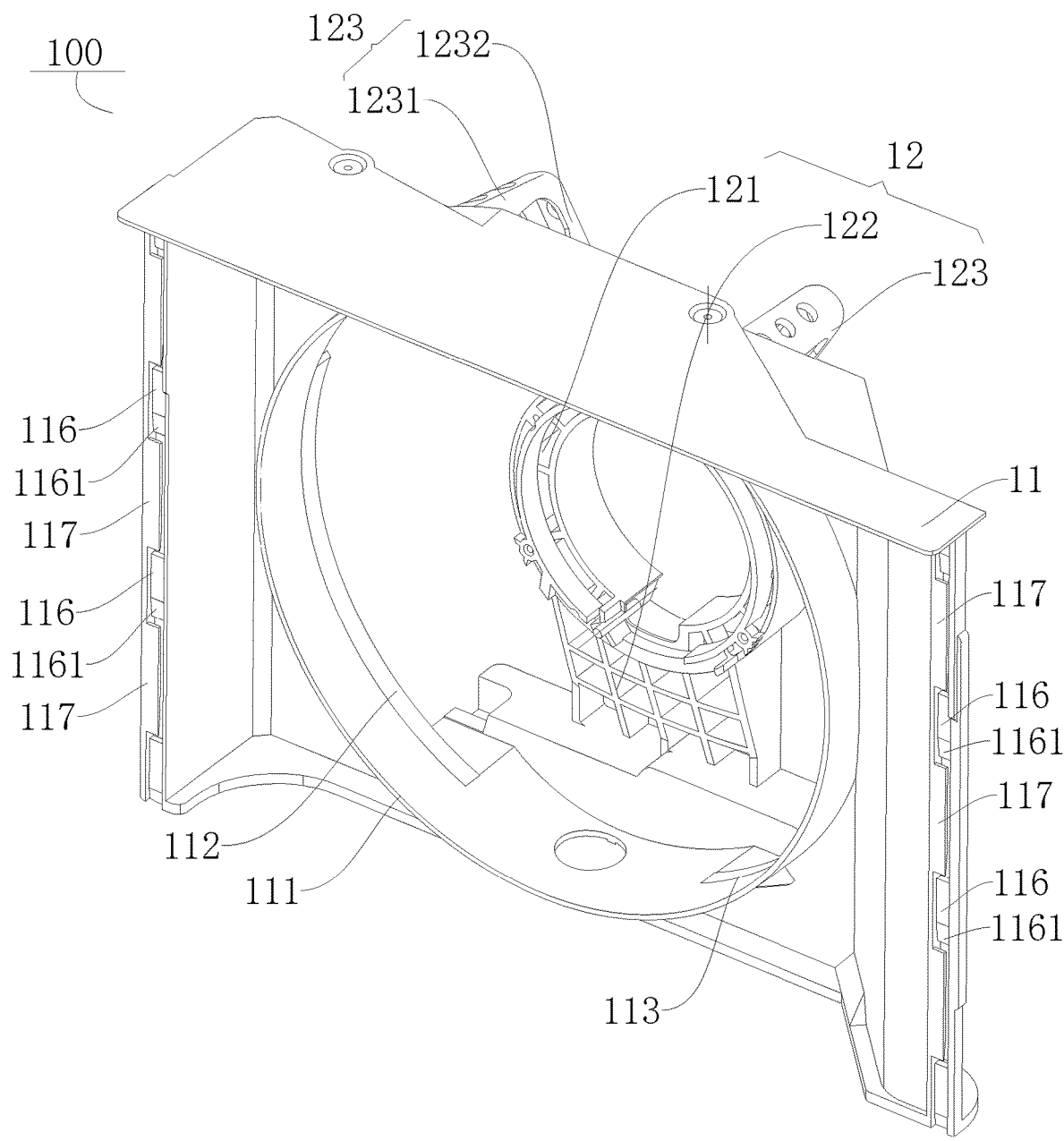
FIG. 13 is a perspective view of the rear panel assembly according to the second embodiment of the present disclosure from another angle of view.

As shown in FIG. 12 and FIG. 13, the rear wall assembly 100 according to the second embodiment of the present disclosure includes: a rear wall body 11, as well as a first vertical plate 114 and a second vertical plate 115 arranged at each of two opposite sides of the rear wall body 11 and spaced apart from each other. Both the first vertical plate 114 and the second vertical plate 115 extend in the vertical direction. A first baffle 116 is connected between a first end of the first vertical plate 114 (an outer end as shown in FIG. 12) and a first end of the second vertical plate 115 (an outer end shown in FIG. 12). There are a plurality of first baffles 116 spaced apart in the vertical direction. A gap 119 is formed between two adjacent first baffles 116. A second end of one of the first vertical plate 114 and the second vertical plate 115 (an inner end as shown in FIG. 12) is connected with a second baffle 117, and the second baffle 117 is parallel to the first baffle 116. There is a space between the second baffle 117 and the other of the first vertical plate 114 and the second vertical plate 115, to allow the side board to pass through. There are a plurality of second baffles 117 in one-to-one correspondence with and opposite to a plurality of gaps 119. A portion of the side board is located in a sliding groove 118 formed by the first baffle 116 and the second baffle 117.

It can be understood that when the heat exchanger is assembled with the rear panel assembly 100, a portion of the side board is located in the sliding groove 118 formed by the first baffle 116 and the second baffle 117. That is, the first baffle 116 and the second baffle 117 are used to limit the position of the side board, realizing the connection and fixation of the heat exchanger and the rear panel assembly 100. For example, in an embodiment shown in FIG. 12, there are four first baffles 116 spaced apart in the vertical direction, one second baffle 117 is arranged between adjacent two first baffles 116, and the second baffle 117 is spaced apart from the first baffle 116.

In the description of the present disclosure, unless otherwise specified, the term "a plurality of" means two or more than two.

Figure 15:
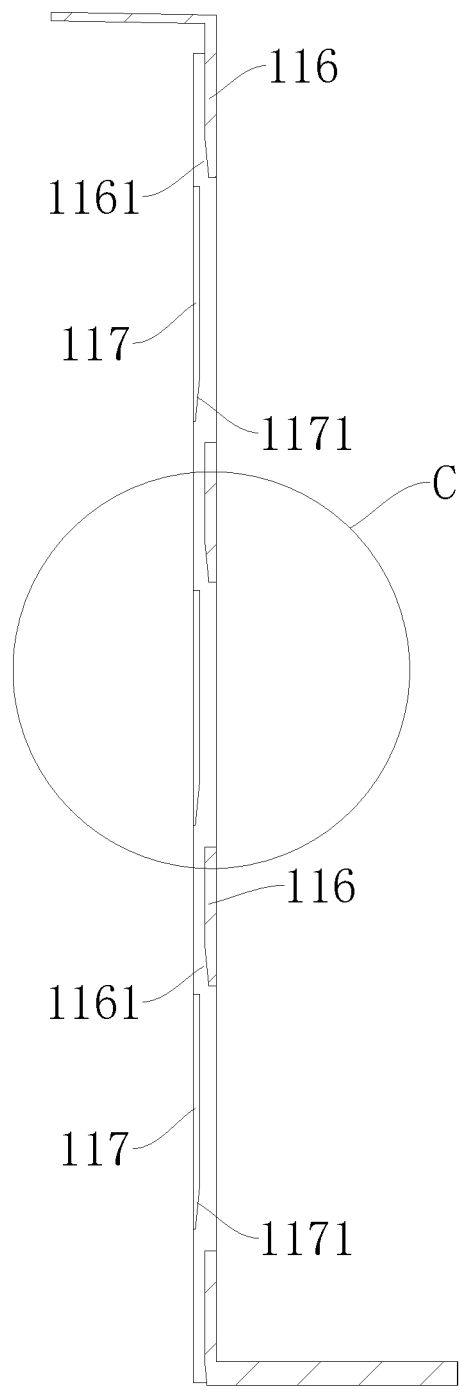
FIG. 15 is a sectional view along A-A in FIG. 14.
Figure 16:
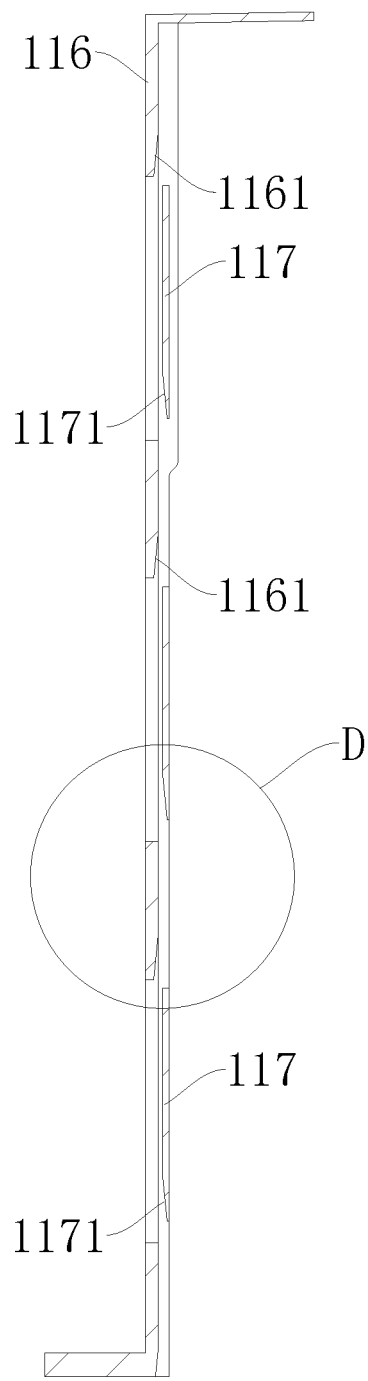
FIG. 16 is a sectional view along B-B in FIG. 14.
Figure 17:
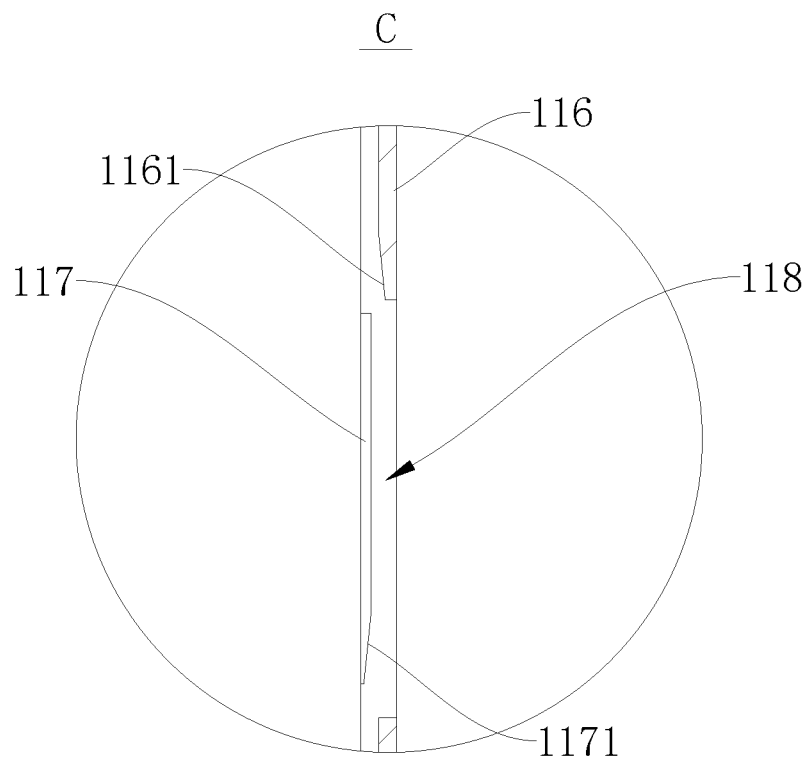
FIG. 17 is an enlarged view at C in FIG. 15.
Figure 18:
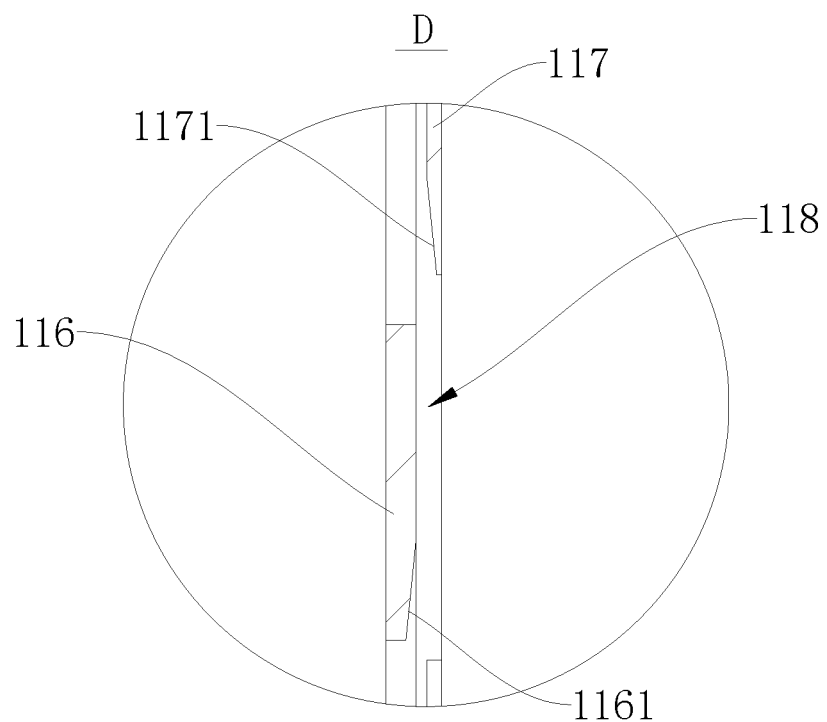
FIG. 18 is an enlarged view at D in FIG. 16.

As shown in FIGS. 12, 15 and 16, a surface of the first baffle 116 facing the sliding groove 118 has a first inclined guide surface 1161 (refer to FIG. 17). The first inclined guide surface 1161 is located on a lower end of the first baffle 116 and is inclined toward a direction away from the sliding groove 118 in an up-to-down direction. A surface of the second baffle 117 facing the sliding groove 118 has a second inclined guide surface 1171 (refer to FIG. 19). The second inclined guide surface 1171 is located at a lower end of the second baffle 117 and is inclined toward the direction away from the sliding groove 118 in the up-to-down direction.

It can be understood that when the heat exchanger is assembled with the rear panel assembly 100, the side board of the heat exchanger can be slid vertically upwards from a lower end of the rear panel assembly 100 into a predetermined mounting position. During the upward sliding-in process of the side board, the first inclined guide surface 1161 and the second inclined guide surface 1171 have a guiding effect on the upward sliding of the side board, so that the side board can be slid upwards more smoothly.

For example, in the process of sliding the side board from bottom to top, when the side board is slid to the first inclined guide surface 1161 of the first baffle 116, the side board can be directed to slide toward the sliding groove 118 under the guidance of the first inclined guide surface 1161 and hence slide upwards more smoothly. As another example, in the process of sliding the side board from bottom to top, when the side board is slid to the second inclined guide surface 1171 of the second baffle 117, the side board can be directed to slide toward the sliding groove under the guidance of the second inclined guide surface 1171 and hence slide upwards more smoothly.

For the rear wall assembly 100 of the window air conditioner 1000 according to the second embodiment of the present disclosure, the rear wall assembly 100 includes the rear wall body 11, as well as the first vertical plate 114 and the second vertical plate 115 arranged at each of two opposite sides of the rear wall body 11 and spaced apart from each other. The plurality of first baffles 116 are connected between the first end of the first vertical plate 114 and the first end of the second vertical plate 115 and spaced apart from each other. The plurality of second baffles 117 are connected between the second end of the first vertical plate 114 and the second end of the second vertical plate 115 and spaced apart from each other. The first baffle 116 and the second baffle 117 forms the sliding groove 118. The first inclined guide surface 1161 is arranged at the surface of the first baffle 116 facing the sliding groove 118 and is inclined toward the direction away from the sliding groove 118 in the up-to-down direction; meanwhile, the second inclined guide surface 1171 is arranged at the surface of the second baffle 117 facing the sliding groove 118 and is inclined toward the direction away from the sliding groove 118 in the up-to-down direction. When the heat exchanger is assembled with the rear panel assembly 100, the side board of the heat exchanger can be slid upward more smoothly under the guidance of the first inclined guide surface 1161 and the second inclined guide surface 1171, thereby reducing the difficulty of assembling the heat exchanger and the rear panel assembly 100, and improving the efficiency of assembling the heat exchanger and the rear panel assembly 100.

According to some embodiments of the present disclosure, as shown in FIGS. 12 and 13, the rear panel body 11 is provided with a vent 111, and the rear panel body 11 has a vertical reference plane passing through a central axis of the vent 111. A first water-retaining rib 112 is arranged at the vent 111 and located on a first side of the reference plane. The first water-retaining rib 112 protrudes toward a side of the rear panel body 11. The first water-retaining rib 112 extends along a peripheral direction of the vent 111. A lower end of the first water-retaining rib 112 is adjacent to a bottom end of the vent 111.

It should be noted that during operation of the window air conditioner 1000, condensate water in a water receiving tray is easily thrown out from the water receiving tray. By arranging the first water-retaining rib 112, the first water-retaining rib 112 has a blocking effect on the thrown water, which can prevent the condensate water from being thrown out, improving operational safety of the window air conditioner 1000.

Figure 14:
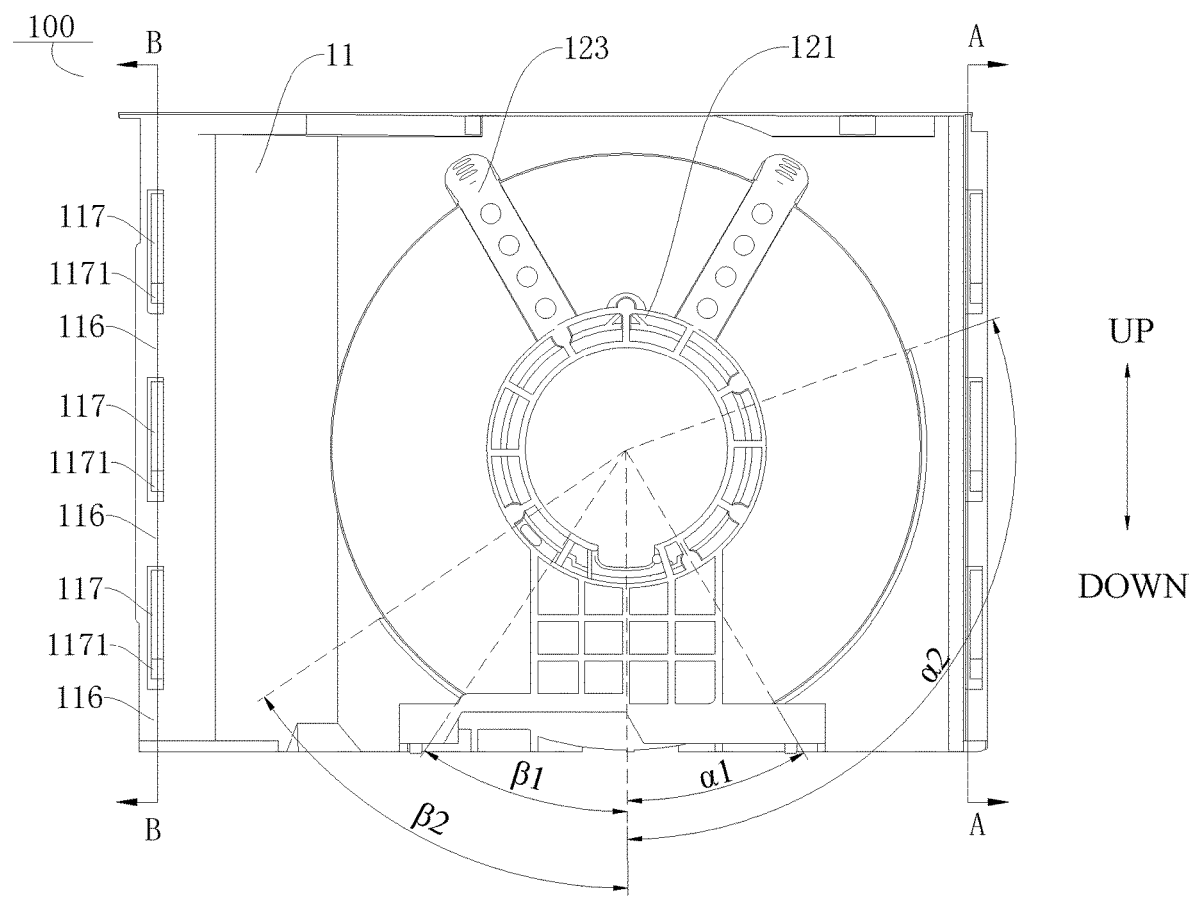
FIG. 14 is a front view of the rear panel assembly according to the second embodiment of the present disclosure.

In some embodiments of the present disclosure, as shown in FIGS. 12 and 14, an angle between a connection line between a bottom end (a lower end as shown in FIG. 14) of the first water-retaining rib 112 and a center of the vent 111 and the reference plane is $\alpha 1$ that satisfies: $10° \leq \alpha 1 \leq 20°$. During the operation of the window air conditioner 1000 (referring to FIG. 7), the condensate in the water receiving tray has a certain inertial force when it is thrown out, and the condensate water thrown out will continue to move by a certain distance under the action of the inertial force, that is, no condensate is thrown out near the bottom end of the reference plane. By setting the angle between the connection line between the bottom end of the first water-retaining rib 112 and the center of the vent 111 and the reference plane to be between 10° and 20°, it is ensured that a layout range of the first water-retaining rib 112 can be reduced while the rear panel assembly 100 has a better water-retaining effect. Thus, the space occupied by and manufacturing materials used for the first water-retaining rib 112 can be reduced, saving costs.

For example, the angle between the connection line between the bottom end of the first water-retaining rib 112 and the center of the vent 111 and the reference plane may be 12°, 14°, 16°, 18° and son on. Specifically, the angle between the connection line between the bottom end of the first water-retaining rib 112 and the center of the vent 111 and the reference plane can be designed according to the model and working environment of the rear panel assembly 100. Certainly, the present disclosure is not limited thereto, and the angle between the connection line between the bottom end of the first water-retaining rib 112 and the center of the vent 111 and the reference plane may also be 25°, 30°, 35°, etc.

In some embodiments of the present disclosure, as shown in FIGS. 12 and 14, an angle between a connection line between a top end (an upper end as shown in FIG. 14) of the first water-retaining rib 112 and the center of the vent 111 and the reference plane is $\alpha 2$ that satisfies: $45° \leq \alpha 2 \leq 145°$. By setting the angle between the connection line between the top end of the first water-retaining rib 112 and the center of the vent 111 and the reference plane to be between 45° and 145°, it is possible that the condensate water thrown out can be blocked in a larger range, improving the water-retaining effect of the first water-retaining rib 112.

For example, the angle between the connection line between the top end of the first water-retaining rib 112 and the center of the vent 111 and the reference plane may be 50°, 70°, 90°, 110°, 130° and so on. Specifically, the angle between the connection line between the bottom end of the first water-retaining rib 112 and the center of the vent 111 and the reference plane may be designed according to the model and working environment of the rear panel assembly 100.

In some embodiments of the present disclosure, $\alpha 2$ satisfies: $90° \leq \alpha 2 \leq 145°$. By setting the angle between the connection line between the top end of the first water-retaining rib 112 and the center of the vent 111 and the reference plane to be between 90° and 145°, a water-retaining range of the first water-retaining rib 112 can be further increased, further improving the water-retaining effect of the first water-retaining rib 112, and enhancing the operational safety of the window air conditioner 1000 (referring to FIG. 7). For example, the angle between the connection line between the top end of the first water-retaining rib 112 and the center of the vent 111 and the reference plane may be 95°, 105°, 115°, 120°, 125°, 130°, 135°, 140°, etc.

In some embodiments of the present disclosure, a second water-retaining rib 113 is arranged at the vent 111 and located on a second side of the reference plane. The second water-retaining rib 113 protrudes toward the side of the rear panel body 11. The second water-retaining rib 113 extends along the peripheral direction of the vent 111. A lower end of the second water-retaining rib 113 is adjacent to the bottom end of the vent 111. It can be understood that by providing the second water-retaining rib 113, the second water-retaining rib 113 can block water thrown from the second side of the reference plane, to prevent the condensate water from being thrown out from the second side of the reference plane. Thus, the operational safety of the window air conditioner 1000 (referring to FIG. 7) can be further improved.

Further, an angle between a connection line between a bottom end (a lower end as shown in FIG. 14) of the second water-retaining rib 113 and the center of the vent 111 and the reference plane is $\beta 1$ that satisfies: $10° \leq \beta 1 \leq 20°$. During the operation of the window air conditioner 1000 (referring to FIG. 7), the condensate in the water receiving tray has a certain inertial force when it is thrown out, and the condensate water thrown out will continue to move by a certain distance under the action of the inertial force, that is, no condensate is thrown out near the bottom end of the reference plane. By setting the angle between the connection line between the bottom end of the second water-retaining rib 113 and the center of the vent 111 and the reference plane to be between 10° and 20°, it is ensured that a layout range of the second water-retaining rib 113 can be reduced while the rear panel assembly 100 has a better water-retaining effect. Thus, the space occupied by and manufacturing materials used for the second water-retaining rib 113 can be reduced, saving costs.

In some embodiments of the present disclosure, as shown in FIGS. 12 and 14, an angle between a connection line between a top end (an upper end as shown in FIG. 14) of the second water-retaining rib 113 and the center of the vent 111 and the reference plane is $\beta 2$ that satisfies: $45° \leq \beta 2 \leq 65°$. By setting the angle between the connection line between the top end of the second water-retaining rib 113 and the center of the vent 111 and the reference plane to be between 45° and 65°, it is possible that the condensate water thrown out can be blocked in a larger range, improving the water-retaining effect of the second water-retaining rib 113.

For example, the angle between the connection line between the top end of the second water-retaining rib 113 and the center of the vent 111 and the reference plane may be 50°, 55°, 60°, and so on. Specifically, the angle between the connection line between the bottom end of the second water-retaining rib 113 and the center of the vent 111 and the reference plane may be designed according to the model and working environment of the rear panel assembly 100.

It should be noted that in the description of the present disclosure, terms "top," "bottom" and the like refer to the orientation as then described or as shown in the drawings under discussion. These relative terms are for convenience and simplicity of description and do not indicate or imply that the devices or elements referred to have a particular orientation and be constructed or operated in a particular orientation. Thus, these terms shall not be construed as limitation on the present disclosure.

Figure 19:
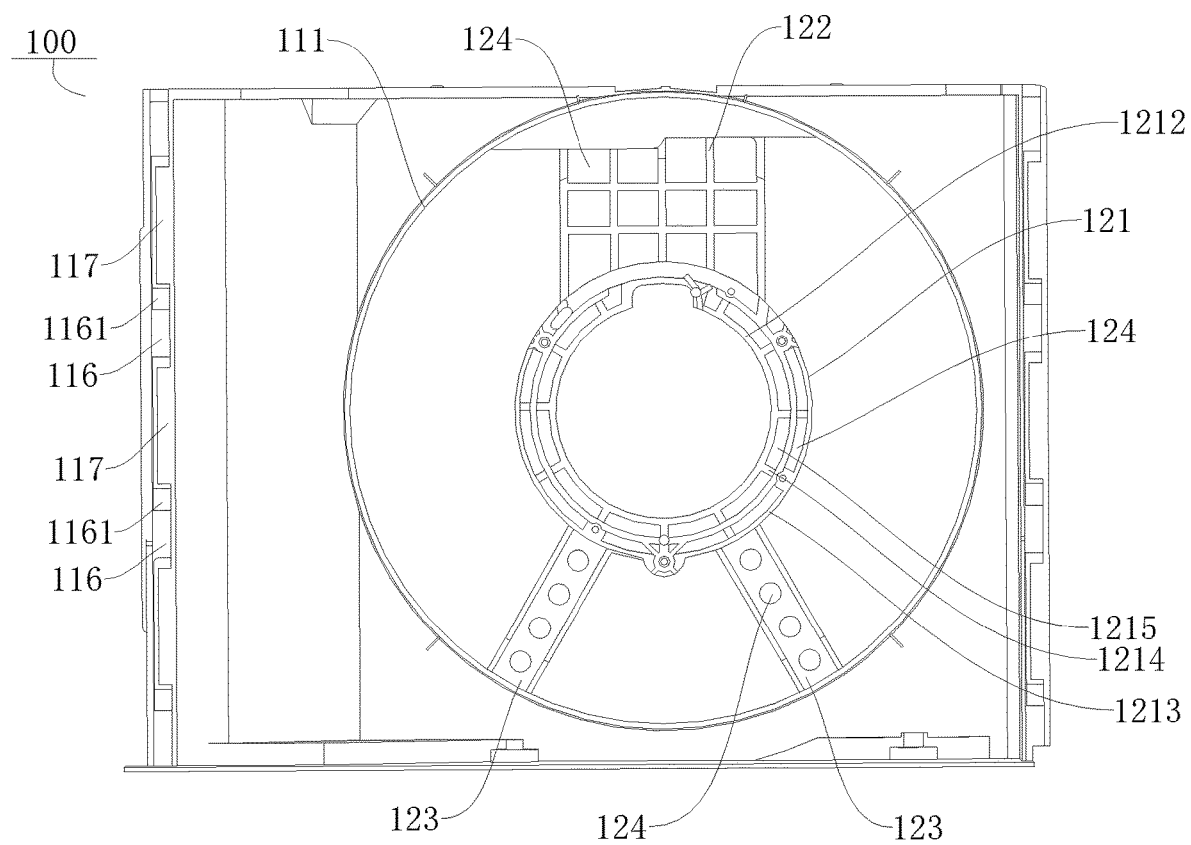
FIG. 19 is a rear view of the rear panel assembly according to the second embodiment of the present disclosure.

In some embodiments of the present disclosure, as shown in FIG. 13 and FIG. 19, the rear panel assembly 100 further includes a motor bracket 12 connected to the rear panel body 11. The motor bracket 12 is at least partially opposite the vent 111, and the motor bracket 12 is provided with an air hole 124 to allow air to flow into the vent 111 through the air hole 124. In general, the air enters from an outdoor air inlet of an outdoor portion of the window air conditioner (referring to FIG. 7), and under drive of the impeller bypasses the motor bracket and enters the vent 111 to exchange heat with the heat exchanger. However, the motor bracket blocks air intake, which restricts ventilation on an air inlet side of the impeller and reduces heat exchange efficiency. In addition, the motor bracket blocks air flow, increasing resistance to the air flow and noise.

Since the motor bracket 12 is provided with the air hole 124, the air under the drive of the impeller can enter the vent 111 through the air hole 124 in the motor bracket 12, when the air flows, which reduces air obstruction by the motor bracket 12, increases a ventilation area on the air inlet side of the impeller, and improves the heat exchange efficiency of the window air conditioner 1000 (referring to FIG. 7), thereby enhancing cooling and heating capacity of the window air conditioner 1000. In addition, the air hole 124 is arranged at the motor bracket 12, which can also reduce the resistance in the air flow process and lower the noise.

Figure 20:
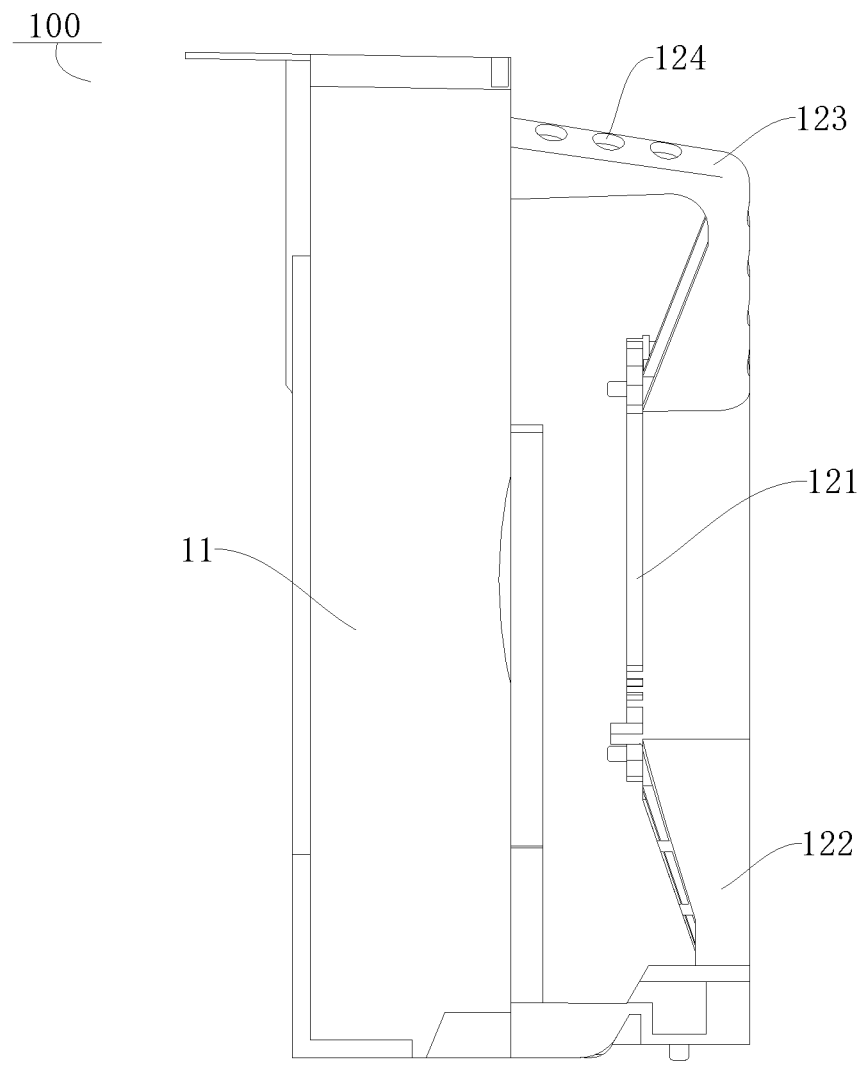
FIG. 20 is a side view of the rear panel assembly according to the second embodiment of the present disclosure.

Further, as shown in FIGS. 12, 13 and 20, the motor bracket 12 includes a motor mounting part 121, a support part 122, and at least one connection arm 123. A first end of the support part 122 is connected to an outer peripheral wall of the motor mounting part 121, and a second end of the support part 122 is connected to a support member 1111, thereby fixing the motor mounting part 121. The support part 122 is at least partially opposite to the vent 111, facilitating the connection between the support part 122 and the motor mounting part 121 and the connection between the support part 122 and the rear panel body 11.

As shown in FIGS. 12 and 13, a first end of the connection arm 123 is connected to the outer peripheral wall of the motor mounting part 121, and a second end of the connection arm 123 is connected to the rear panel body 11, thereby fixing the motor mounting part 121 and improving reliability of fixation of the motor mounting part 121 and in turn reliability of fixation of the motor. In some embodiments of the present disclosure, as shown in FIG. 2, the at least one connection arm 123 and the support part 122 are distributed at intervals along a peripheral direction of the motor mounting part 121, thereby enhancing a fixing effect on the motor mounting part 121 and a fixing effect on the motor, and improving the reliability of fixation of the motor. The connection arm 123 is at least partially opposite to the vent 111, which not only facilitates the connection between the connection arm 123 and the motor mounting part 121, but also facilitates the connection between the connection arm 123 and the rear panel body 11.

In examples shown in FIGS. 12 and 13, the support part 122 is located below the motor mounting part 121, a lower end of the support part 122 is connected to the rear panel body 11, and an upper end of the support part 122 is mounted at the outer peripheral wall of the motor mounting part 121 to support the motor mounting part 121. There are two connection arms 123 both located above the motor mounting part 121. The two connection arms 123 are spaced apart along the peripheral direction of the motor mounting part 121, lower ends of the two connection arms 123 are both connected to the outer peripheral wall of the motor mounting part 121, and upper ends of the two connection arms 123 are both connected to the rear panel body 11, to enhance the fixing effect on the motor mounting part 121.

In some embodiments of the present disclosure, as shown in FIGS. 12 and 13, at least one connection arm 123 and the support part 122 are spaced along the peripheral direction of the motor mounting part 121; the motor mounting part 121, at least a portion of the support part 122, and at least a portion of the connection arm 123 are all opposite to the vent 111; at least one of the motor mounting part 121, the support part 122, and the at least one connection arm 123 is provided with the air hole 124. Therefore, the structure of the motor bracket 12 can be diversified to meet different requirements.

Further, as shown in FIGS. 12, 14 and 19, the support part 122 includes a first bottom plate 1222 and a plurality of staggered rib plates 1221. The plurality of rib plates 1221 are connected to a side of the first bottom plate 1222 away from the rear panel body 11. As a result, the structural strength of the support part 122 can be enhanced, and a supporting effect of the support part 122 on the motor mounting part 121 can be improved, thereby improving operational reliability of the motor.

In examples shown in FIGS. 12 and 14, the support part 122 includes a plurality of first rib plates 1221 extending in a vertical direction and spaced apart in a horizontal direction, and a plurality of second rib plates 1221 spaced apart in the vertical direction and extending in the horizontal direction. Each of the second rib plates 1221 is connected with each of the first rib plates 1221 in a staggered manner, and the first rib plates and the second rib plates are arranged at the first bottom plate 1222.

In some embodiments of the present disclosure, as shown in FIGS. 12, 14 and 19, the motor mounting part 121 is provided with a motor mounting hole 1211 for mounting the motor. The motor can be mounted in the motor mounting hole 1211, which can simplify installation of the motor and improve production efficiency.

Further, as shown in FIGS. 12 and 14, the motor mounting part 121 includes a second bottom plate 1215, a first annular plate 1212, and a second annular plate 1213. The first annular plate 1212 and the second annular plate 1213 are both connected to a side of the second bottom plate 1215 away from the rear panel body 11. The second annular plate 1213 is sleeved outside the first annular plate 1212, and the first annular plate 1212 is spaced apart from the second annular plate 1213. A plurality of connection plates 1214 are connected between the first annular plate 1212 and the second annular plate 1213, and the plurality of connection plates 1214 are arranged at intervals along a circumferential direction of the first annular plate 1212. The first annular plate 1212 forms the motor mounting hole 1211, and the second bottom plate 1215 is provided with an avoidance hole 12151 opposite to the motor mounting hole 1211. As a result, the material of the motor mounting part 121 can be saved, reducing the cost, but also the structural strength of the motor mounting part 121 can be improved, improving the reliability of fixation of the motor.

In some embodiments of the present disclosure, as shown in FIGS. 12, 14 and 19, the connection arm 123 is provided with a plurality of air holes 124, and the plurality of air holes 124 are distributed at intervals along a length direction of the connection arm 123. When flowing through the connection arm 123, the air can flow to the vent 111 via the plurality of air holes 124 on the connection arm 123, which reduces air obstruction by the connection arm 123, increases the ventilation area on the air inlet side of the impeller, and improves the heat exchange efficiency of the window air conditioner 1000 (referring to FIG. 7), thereby enhancing the cooling and heating capacity of the window air conditioner 1000. In addition, the air holes 124 are arranged at the connection arm 123, which can also reduce the resistance in the air flow process and lower the noise.

Further, as shown in FIGS. 12 and 13, the connection arm 123 includes: a first segment 1231 having a first end connected to the rear panel body 11; and a second segment 1232 having a first end connected to a second end of the first segment 1231 and a second end connected to the outer peripheral wall of the motor mounting part 121. The first segment 1231 and the second segment 1232 are at an angle to each other. As a result, the motor mounting part 121 can be spaced apart from the rear panel body 11, which facilitates the installation of the motor and the cooperation between the motor and the impeller. Moreover, the structural strength of the motor bracket 12 can be improved.

Figure 21:
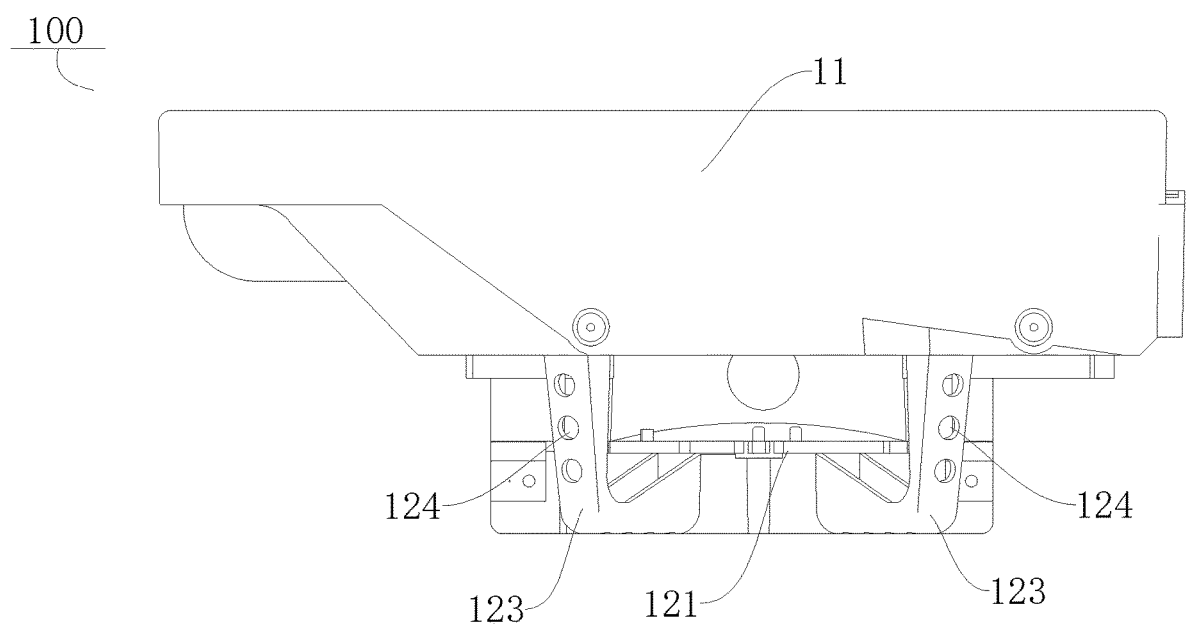
FIG. 21 is a top view of the rear panel assembly according to the second embodiment of the present disclosure.

At least one of the first segment 1231 and the second segment 1232 is provided with the air hole 124 (referring to FIG. 21). That is, only the first segment 1231 is provided with the air hole 124, or only the second segment 1232 is provided with the air hole 124, or both the first segment 1231 and the second segment 1232 are provided with the air holes 124. As a result, the structure of the motor bracket 12 can be diversified. In examples shown in FIGS. 13 and 21, the first segment 1231 and the second segment 1232 are both provided with the air holes 124.

The window air conditioner 1000 according to embodiments of the present disclosure includes a housing 200 and the rear panel assembly 100 as described above. The rear panel assembly 100 is arranged within the housing 200.

For the window air conditioner 1000 according to the embodiments of the present disclosure, by arranging the air hole 124 in the motor bracket 12, the air can flow into the vent 111 through the air hole 124, which reduces the air obstruction by the motor bracket 12, increases the ventilation area on the air inlet side of the impeller, and improves the heat exchange efficiency of the window air conditioner 1000, thereby enhancing the cooling and heating capacity of the window air conditioner 1000. In addition, the air hole 124 is arranged at the motor bracket 12, which can also reduce the resistance in the air flow process and lower the noise.

Figure 7:
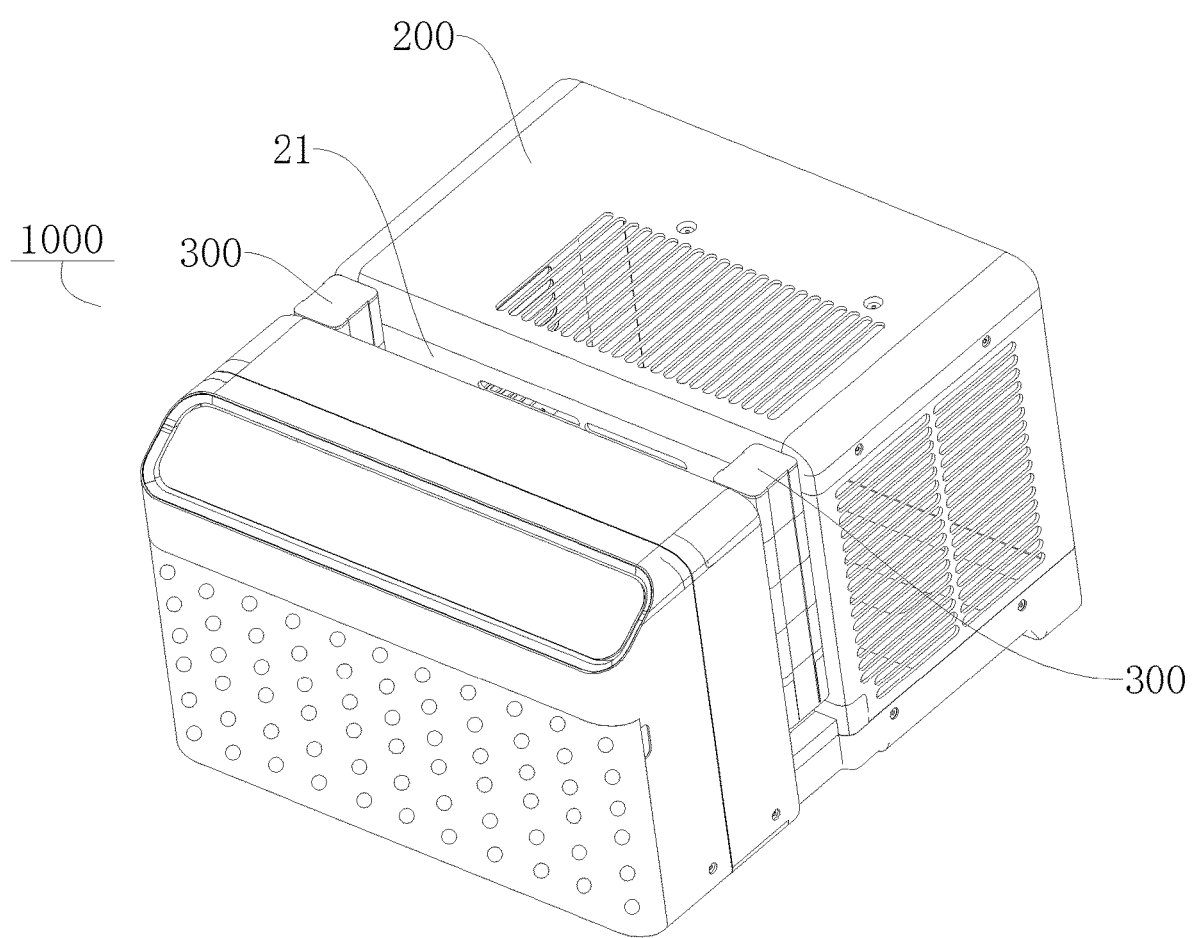
FIG. 7 is a perspective view of a window air conditioner according to the first embodiment of the present disclosure.
Figure 8:
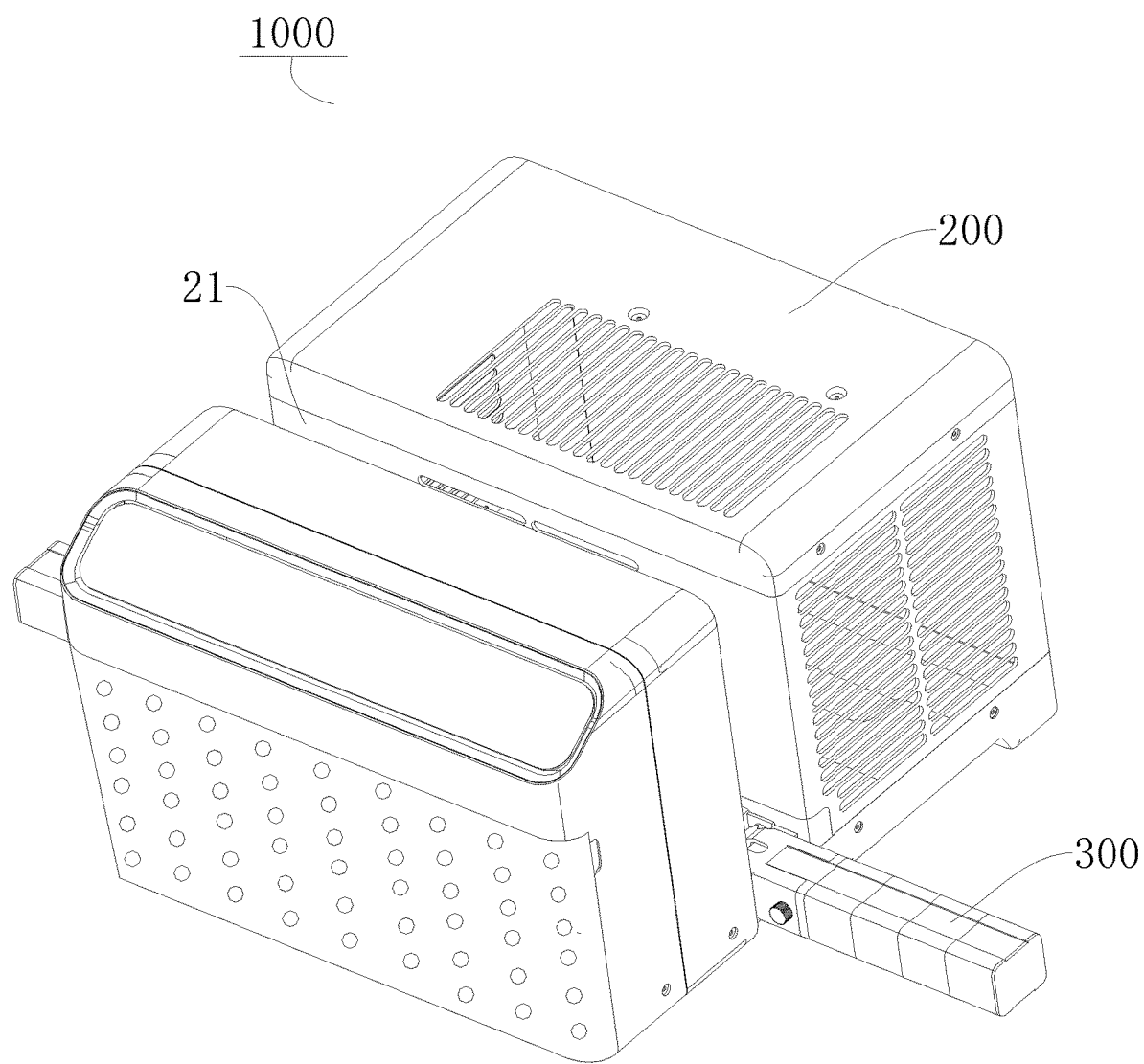
FIG. 8 is a perspective view of the window air conditioner according to the first embodiment of the present disclosure.
Figure 9:
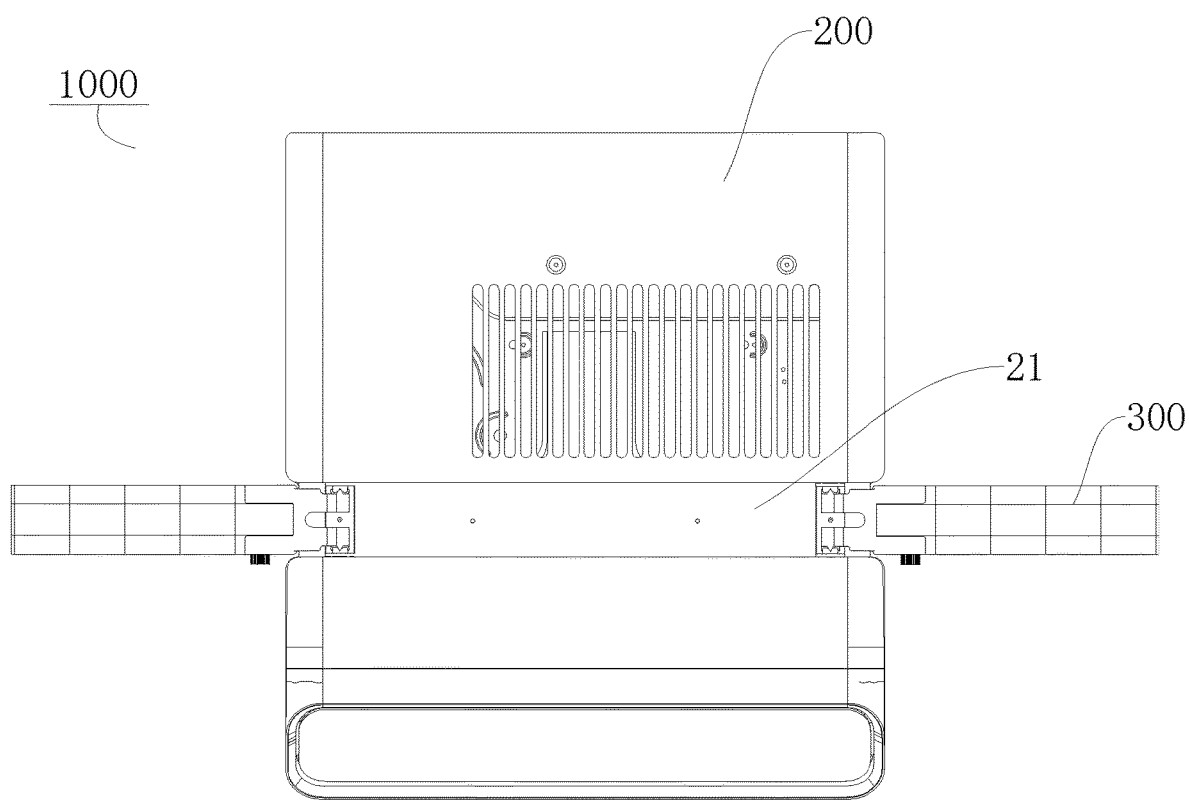
FIG. 9 is a top view of the window air conditioner according to the first embodiment of the present disclosure.
Figure 10:
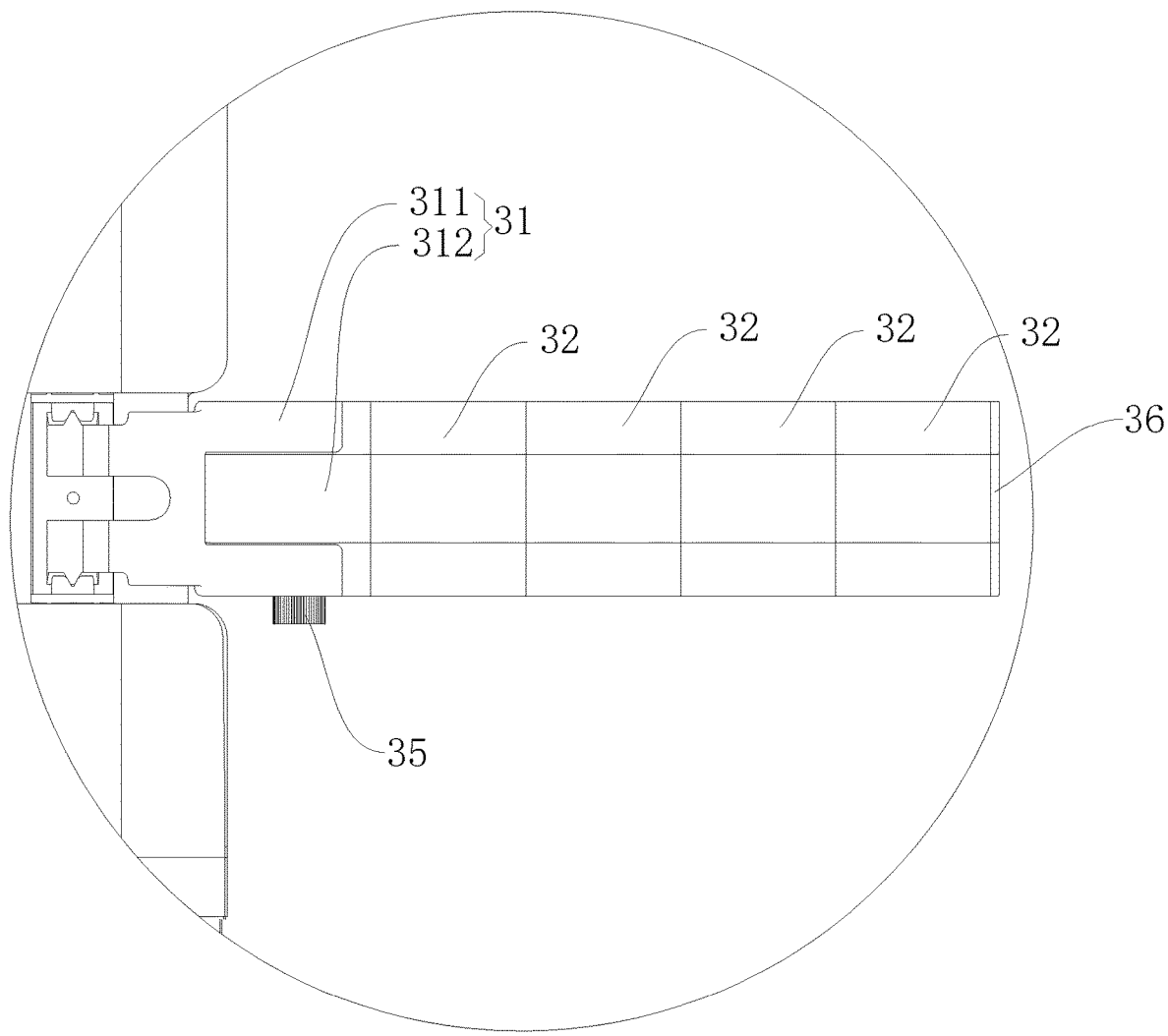
FIG. 10 is a schematic partial structural diagram of the window air conditioner in FIG. 9.

In some embodiments of the present disclosure, the window air conditioner 1000 is supported in a window opening of a wall body, and a movable window is arranged at the window opening. As shown in FIGS. 7 and 8, and the housing 200 has a receiving groove 21, with an indoor part and an outdoor part on both sides of the receiving groove 21. At least a portion of the window can extend into the receiving groove 21. The window air conditioner 1000 also includes a sealing assembly 300, which is in contact with the window and an inner wall of the window opening. As shown in FIGS. 9 and 10, the sealing assembly 300 includes a first connection component 31 having a variable length and a plurality of second connection components 32. The first connection component 31 includes a fixed member 311 and a sliding block 312, the fixed member 311 is located in the receiving groove 21, and the sliding block 312 is in sliding cooperation with the fixed member 311. Any one of the second connection components 32 is detachably connected to the sliding block 312, and any two of the second connection components 32 are detachably connected to each other.

Accordingly, since the sealing assembly 300 includes the first connection component 31, and the first connection component 31 includes the fixed member 311 and the sliding block 312, the sealing assembly 300 can be mounted at the window air conditioner using the fixed member 311, which facilitates the arrangement of the sealing assembly 300 and avoids losing the sealing assembly 300. Moreover, through the sliding cooperation between the sliding block 312 and the fixed member 311, the length of the first connection component 31 can be adjusted, so that a sealing length of the sealing assembly 300 can be adjusted, and the sealing assembly 300 can seal windows of different sizes, which can enhance a sealing effect of the sealing assembly 300, broaden an application range of the sealing assembly 300 and an application range of the window air conditioner 1000, and improve the functionality and applicability of the window air conditioner 1000.

In addition, by providing the plurality of second connection components 32, any one of the second connection components 32 is detachably connected to the sliding block 312, and any two of the second connection components 32 are detachably connected to each other, which improves the structural flexibility of the sealing assembly 300, allows the length of the sealing assembly 300 to be adjusted by connecting different numbers of the second connection components 32, and widen a variation range of the sealing length of the sealing assembly 300, to facilitate adaptation of the sealing assembly 300 to windows of different sizes, enhance the sealing reliability and stability of the sealing assembly 300, and broaden the application range of the sealing assembly 300.

Thus, the sealing assembly 300 of the window air conditioner according to the embodiments of the present disclosure has the advantages of variable sealing length and ease of use.

Specifically, the sliding block 312 and the second connection component 32 form a sealing fit, and the sealing fit is connected to the fixed member 311 and can be rotated to extend out of the receiving groove 21 to abut against the inner wall of the window opening. In this way, the sealing length of the sealing assembly 300 can be adjusted by adjusting a length of the sealing fit.

Figure 11:
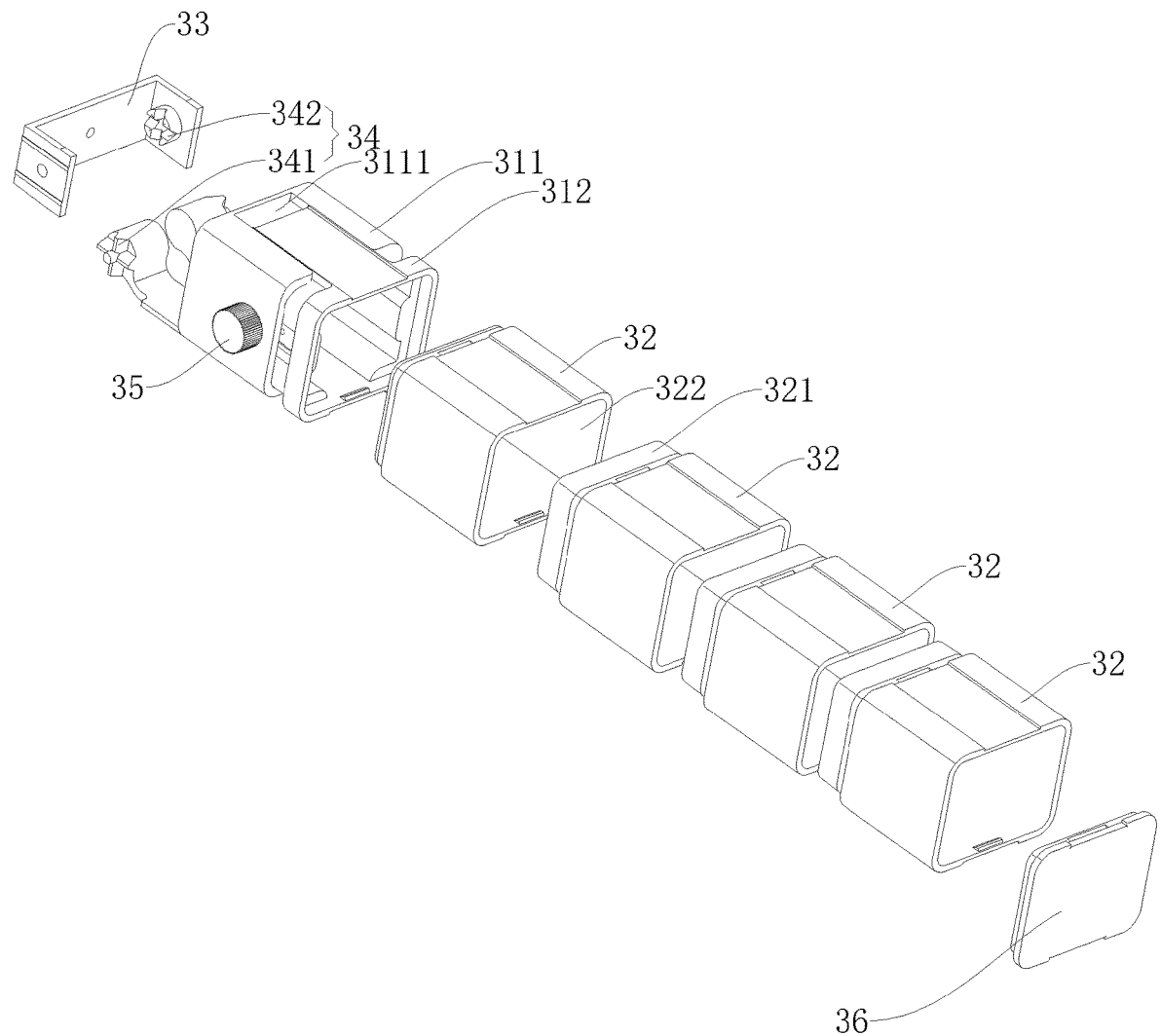
FIG. 11 is an exploded view of a sealing assembly of the window air conditioner according to the first embodiment of the present disclosure.

In some embodiments of the present disclosure, as shown in FIGS. 10 and 11, the sealing assembly 300 also includes a rotatable support 33 fixed to the housing 200, and the fixed member 311 is rotatably located on the rotatable support 33 so that the sealing assembly 300 can be rotated to be stored in the receiving groove 21. As a result, the installation of the fixed member 311 can be facilitated, and the rotation of the fixed member 311 relative to the rotatable support 33 can be realized, which facilitates the storage of the sealing assembly 300 and reduces space occupied by the sealing assembly 300.

Further, as shown in FIGS. 10 and 11, the fixed member 311 is provided with a pivot shaft the rotatable support 33 is provided with a pivot hole, and the pivot shaft is in rotating cooperation with the pivot hole. In this way, the pivot shaft and the pivot hole can cooperate with each other to facilitate smooth rotation of the fixed member 311 and improve the reliability of rotation of the fixed member 311.

Specifically, as shown in FIG. 11, the sealing assembly 300 also includes an angle positioning assembly 34, which cooperates with the rotatable support 33 and the fixed member 311 to position the fixed member 311 at a current angle when the fixed member 311 is rotated to a set angle. As a result, the fixed member 311 can be positioned at a specific angle, e.g., 90°, 45° or 30° relative to the horizontal direction, so that the user can position a rotation angle of the fixed member 311 according to requirements and improve the performance of the sealing assembly 300.

More specifically, as shown in FIG. 11, the angle positioning assembly 34 includes a positioning protrusion 341 and a plurality of positioning recesses 342. One of the rotatable support 33 and the fixed member 311 is provided with the positioning protrusion 341, and the other of the rotatable support 33 and the fixed member 311 is provided with the plurality of positioning recesses 342.

Further, the positioning protrusion 341 is located on the fixed member 311 and the plurality of positioning recesses 342 are located on the rotatable support 33. Specifically, the plurality of positioning recesses 342 are arranged at a circular shape, and the positioning protrusion 341 can be switched to cooperate with the plurality of positioning recesses 342 when the rotation support 33 is rotated, and the positioning protrusion 341 cooperates with one of the positioning recesses 342 to position the fixed member 311. In such a way, the positioning protrusion 341 and the positioning recesses 342 can be used to position the rotation angle of the fixed member 311, which can enhance the positioning reliability and stability of the fixed member 311.

Further, there are a plurality of the positioning protrusions 341 arranged at a ring shape, and the plurality of positioning protrusions 341 are in one-to-one correspondence with the plurality of positioning recesses 342. Thus, the angle positioning assembly 34 can be subjected to a more balanced force, improving the structural strength of the angle positioning assembly 34, and enhancing the positioning reliability and accuracy of the angle positioning assembly 34.

Specifically, the sealing assembly 300 also includes a sliding positioning assembly 35, which is located on the fixed member 311 and cooperates with the sliding block 312 to position the sliding block 312 in a current position. In such a way, the sliding positioning assembly 35 can be used to position the sliding block 312 to maintain the sealing assembly 300 at a specific sealing length, improve the structural stability of the sealing assembly 300, and achieve reliable sealing of the sealing assembly 300.

More specifically, the fixed member 311 is provided with a sliding cavity 3111, and at least a portion of the sliding block 312 extends into the sliding cavity 3111, which facilitates the cooperation between the fixed member 311 and the sliding block 312 and facilitates the sliding of the sliding block 312 relative to the fixed member 311.

Further, the sliding positioning assembly 35 is a rotation member, and the rotation member is rotatably inserted into the fixed member 311 to adjust a length of a portion of the rotation member which extends into the sliding cavity 3111. The rotation member can abut against the sliding block 312 to position the sliding block 312. Thus, the user can control whether the sliding block 312 can slide by rotating the rotation member, and adjust the length of the sliding block 312 as needed.

Specifically, each second connection component 32 includes an insertion member 321; each second connection component 32 and the sliding block 312 are provided with an insertion cavity 322; each insertion member 321 is fitted in the insertion cavity 322 in a withdrawable manner. Thus, the connection of adjacent second connection components 32 can be facilitated, and the plurality of second connection components 32 can be assembled conveniently, which further facilitates change in the sealing length of the sealing assembly 300.

In some embodiments of the present disclosure, an outer peripheral surface of the insertion member 321 is arranged to incline forward and inward, in an insertion/withdrawal direction of the second connection component 32.

In some embodiments of the present disclosure, as shown in FIG. 11, the sealing assembly 300 also includes a sealing end cover 36 used to seal an open end of the insertion cavity 322 farthest from the fixed member 311, which can facilitate sealing of the insertion cavity 322 farthest from the fixed member 311 and improve the sealing of the second connection component 32. Moreover, the plurality of second connection components 32 have the same structure, which is convenient to process and manufacture the second connection components 32 and improve the interchangeability of the second connection components 32.

Specifically, a top wall of the sealing assembly 300 is provided with sealing sponge, and the window abuts against the sealing sponge, which can avoid direct contact between the window and the sealing assembly 300, reduce wear due to contact between the window and the sealing assembly 300, and improve the sealing effect between the window and the sealing assembly 300.

A window air conditioner apparatus 10000 according to embodiments of the present disclosure will be described below with reference to the accompanying drawings.

Figure 22:
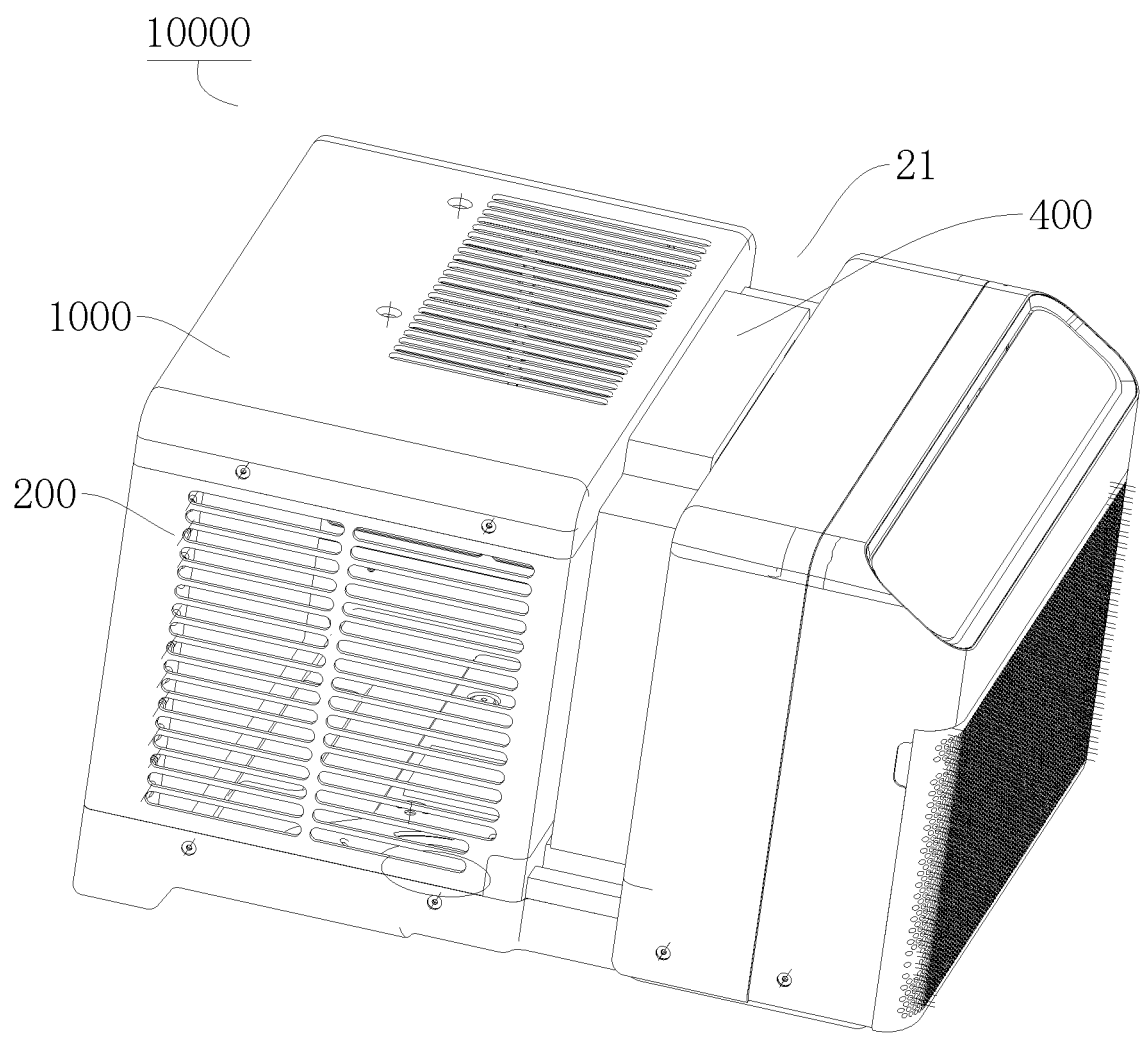
FIG. 22 is a perspective view of a window air conditioner apparatus according to embodiments of the present disclosure.

As shown in FIG. 22, the window air conditioner apparatus 10000 according to the embodiments of the present disclosure include a window air conditioner 1000 and a mounting assembly 400. A movable window is arranged at a window opening 801a of a wall body 801.

Figure 23:
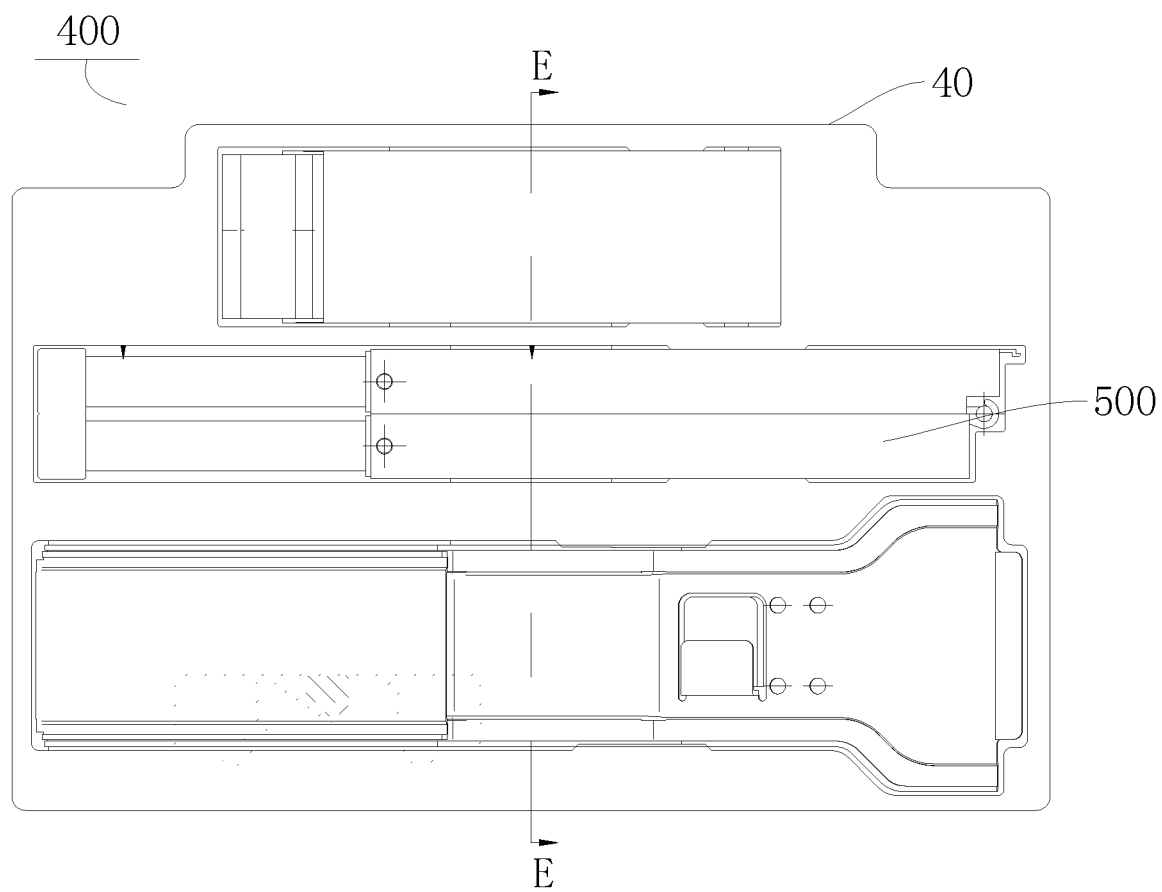
FIG. 23 is a schematic view of a mounting assembly according to embodiments of the present disclosure.

As shown in FIGS. 22 and 23, the window air conditioner 1000 includes a housing 200, and the housing 200 is provided with a receiving groove 21, in which, for example, a top of the receiving groove 21 is open. The window air conditioner 1000 has a mounted state and an unmounted state. The mounting assembly 400 includes a storage box 40 and a mounting attachment 500. In the mounted state, the window air conditioner 1000 is mounted at the window opening 801a by the mounting attachment 500, and the receiving groove 21 is adapted to receive a window; in the unmounted state, the mounting attachment 500 is stored in the storage box 40, and the storage box 40 is placed in the receiving groove 21 and held by opposite side walls of the receiving groove 21.

Specifically, for example, when the window air conditioner apparatus 10000 leave factory and is transported, or is stored, the window air conditioner apparatus 1000 is in the unmounted state, the mounting attachment 500 is stored in the storage box 40, the storage box 40 is placed in the receiving groove 21 and held by the opposite side walls of the receiving groove 21, and the window air conditioner apparatus 10000 is packaged in a packaging box for the window air conditioner apparatus 10000. Thus, a size of the packaging box for the window air conditioner apparatus 10000 can be reduced to increase the packaging quantity of the window air conditioner apparatus 10000, which is conducive to reducing the transportation cost, thereby increasing the market competitiveness of the window air conditioner apparatus 10000. Moreover, the overall structural stability of the window air conditioner apparatus 10000 can be enhanced.

Before the window air conditioner 1000 is mounted in the window opening 801a, the mounting assembly 400 can be removed from the receiving groove 21, the mounting attachment 500 is then removed from the storage box 40, and the mounting attachment 500 and the window air conditioner 1000 are mounted at the window opening 801a. In the mounted state, the window air conditioner 1000 is mounted at the window opening 801a by the mounting attachment 500, and the receiving groove 21 is suitable for receiving the window.

Thus, in the unmounted state, since the mounting attachment 500 is stored in the storage box 40, while the storage box 40 is placed in the receiving groove 21 and held by the opposite side walls of the receiving groove 21, it is beneficial to reducing the size of the packaging box for the window air conditioner apparatus 10000, thereby increasing the packaging quantity of the window air conditioner apparatus 10000, which is conducive to reducing the transportation cost and thus increasing the market competitiveness of the window air conditioner apparatus 10000. Moreover, the overall structural stability of the window air conditioner apparatus 10000 can be improved.

For the window air conditioner apparatus 10000 according to the embodiments of the present disclosure, in the unmounted state, since the mounting attachment 500 is stored in the storage box 40, while the storage box 40 is placed in the receiving groove 21 and held by the opposite side walls of the receiving groove 21, it is beneficial to reducing the size of the packaging box for the window air conditioner apparatus 10000, thereby increasing the packaging quantity of the window air conditioner apparatus 10000, which is conducive to reducing the transportation cost and thus increasing the market competitiveness of the window air conditioner apparatus 10000. Moreover, the overall structural stability of the window air conditioner apparatus 10000 can be improved.

Figure 24:
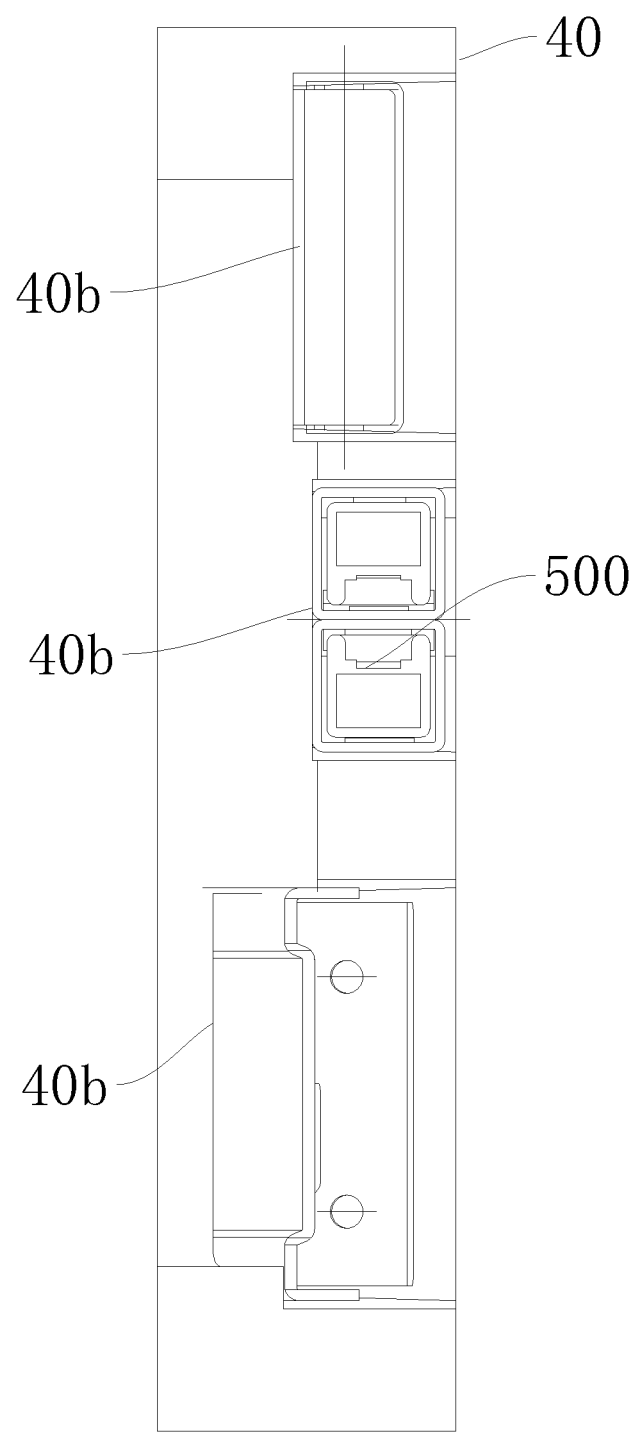
FIG. 24 is a sectional view along E-E in FIG. 23.

In an embodiment of the present disclosure, referring to FIGS. 23-24, the storage box 40 is a polystyrene foam member. Hence, when the storage box 40 is placed in the receiving groove 21, the storage box 40 may be deformed, thus making the storage box 40 tightly fit against the opposite side walls of the receiving groove 21, which is conducive to preventing the storage box 40 from coming out of the receiving groove 21. Moreover, the overall structural stability of the window air conditioner apparatus 10000 can be improved.

In some embodiments of the present disclosure, as shown in FIG. 24, the mounting attachment 500 includes a plurality of members, and a plurality of receiving cavities 40b are formed within the storage box 40 and spaced apart from each other. The plurality of receiving cavities 40b are in one-to-one correspondence with the plurality of members, so that the plurality of members are received in the corresponding receiving cavities 40b. Thus, the storage box 40 can accommodate the plurality of members, and each member is placed in the corresponding receiving cavity 40b, which helps to avoid the members from being misplaced or omitted. For example, the members may be a rack part 51 and a connection part 52 as described below. In some embodiments of the present disclosure, a shape of each receiving cavity 40b matches a shape of the corresponding receiving cavity 40b.

Figure 25:
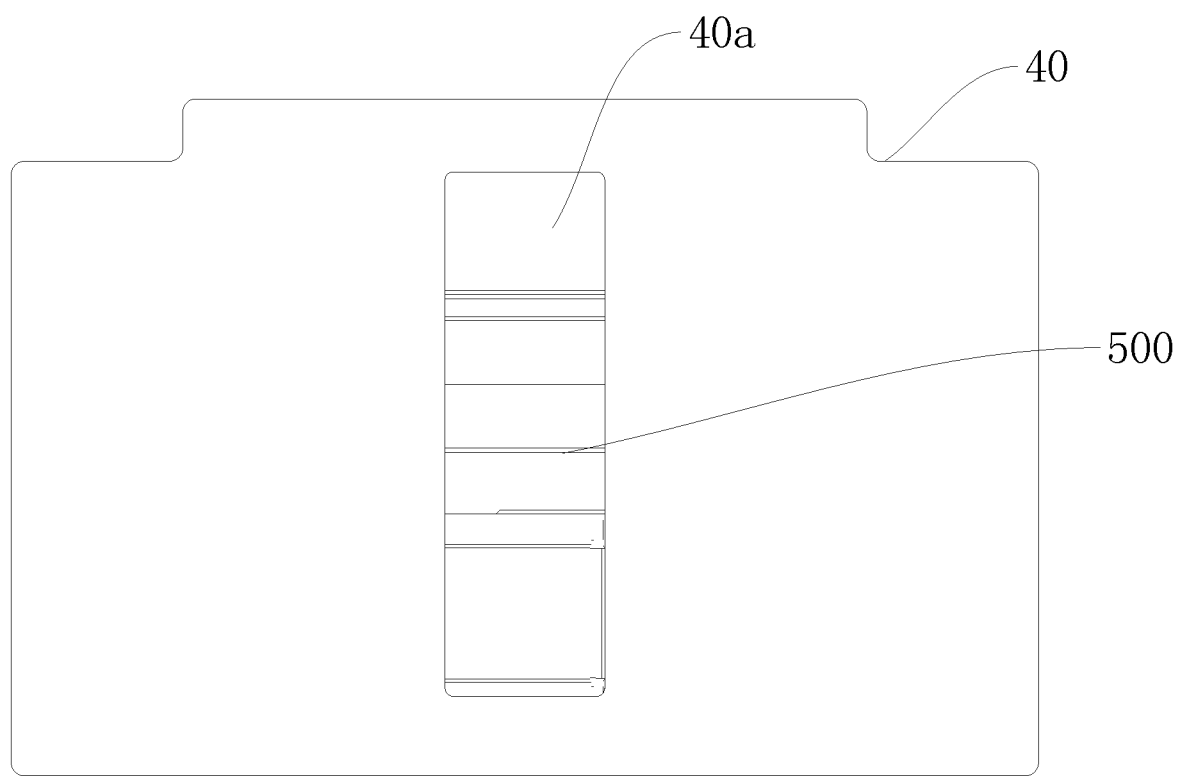
FIG. 25 is a side view of the mounting assembly according to embodiments of the present disclosure.

In some embodiments of the present disclosure, as shown in FIG. 25, a side wall of the storage box 40 is provided with a notch 40a in communication with the receiving cavity 40b, and the mounting attachment 500 is arranged at the receiving cavity 40b. The user can break the storage box 40 through the notch 40a to take out the mounting attachment 500.

Figure 26:
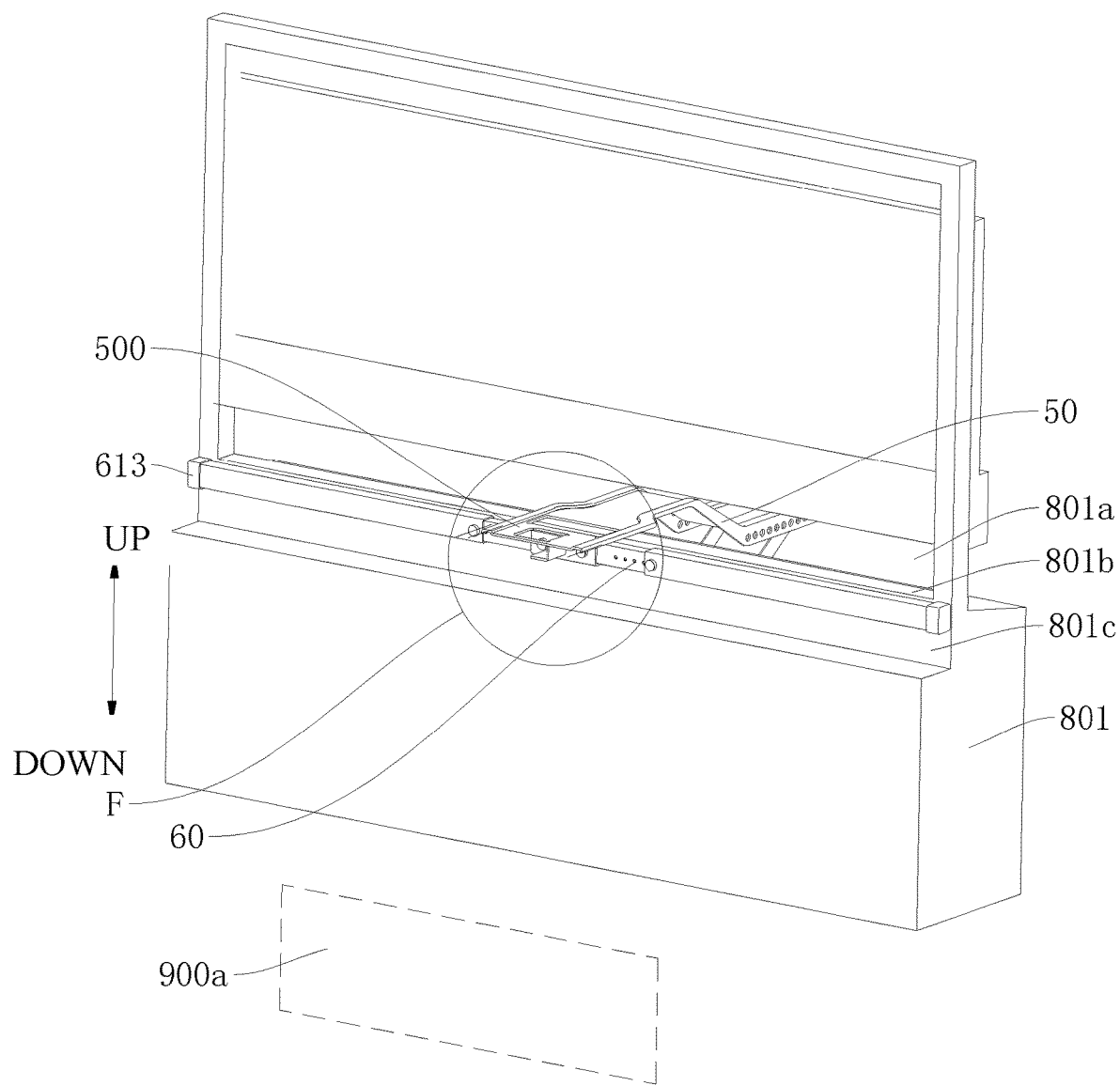
FIG. 26 is a schematic view illustrating a mounting attachment according to embodiments of the present disclosure being mounted in a window opening.
Figure 27:
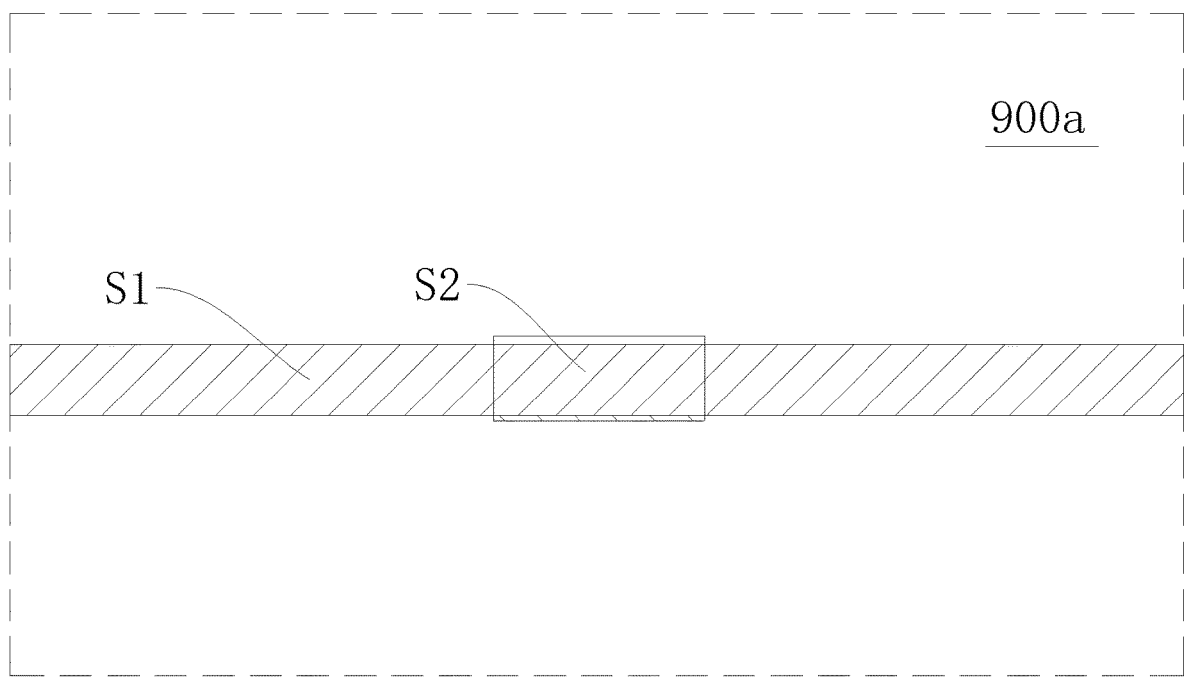
FIG. 27 is a schematic view of projections of a spacer and a connection part shown in FIG. 26 on a projection plane.
Figure 28:
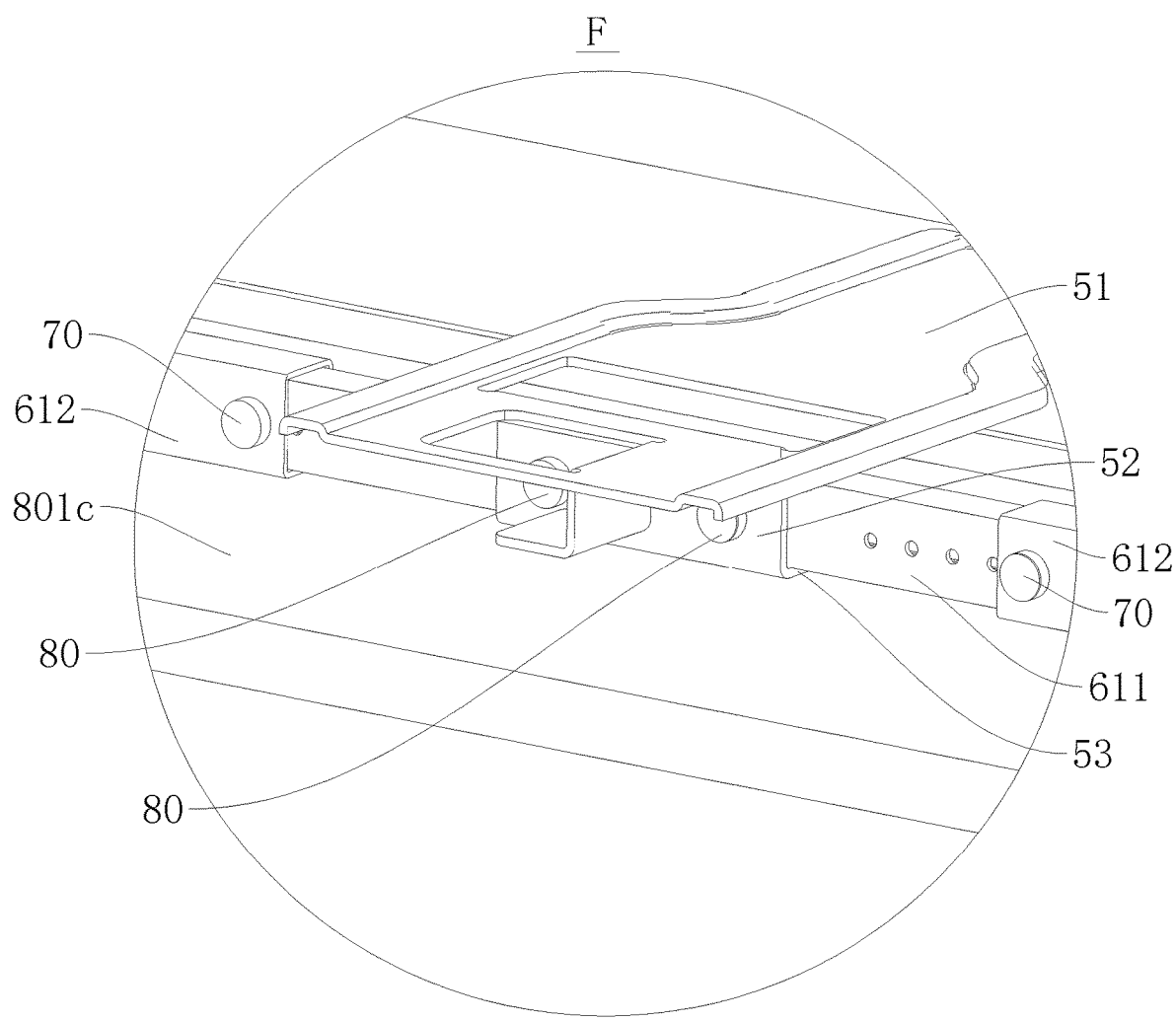
FIG. 28 is a partially enlarged view at F in FIG. 26.

In some embodiments of the present disclosure, as shown in FIGS. 26-28, the mounting attachment 500 includes a mounting rack 50, the mounting rack 50 includes a rack part 51 and a connection part 52, and the rack part 51 is mounted on the wall body 801 and used to mount the window air conditioner 1000. As shown in FIG. 28, the connection part 52 is connected to the rack part 51 and located on an indoor side 801e or an outdoor side 801f of the wall body 801. One side of the wall body 801 in a thickness direction is the indoor side 801e, while the other side of the wall body 801 in the thickness direction is the outdoor side 801f The window air conditioner 1000 can be mounted in the window opening 801a by the mounting attachment 500. A spacer 60 is mounted at the connection part 11 and located on a side of the connection part 11 close to the wall body 801. A plane perpendicular to the thickness direction of the wall body 801 is defined as a projection plane 900*a*. An orthographic projection area S1 of the spacer 60 on the projection plane 900*a* is larger than an orthographic projection area S2 of the connection part 52 on the projection plane 900*a*.

For example, as shown in FIGS. 26-28, the window air conditioner 1000 may be fixedly arranged at the rack part 51. The rack part 51 may extend from the indoor side 801*e* of the wall body 801 to the outdoor side 801*f* thereof, and an extension length of a portion of the rack part 51 located on the indoor side 801*e* may be smaller than an extension length of a portion of the rack part 51 located on the outdoor side 801*f*. The connection part 52 may be fixedly connected to the rack part 51 and may be located on the indoor side 801*e* of the wall body 801. The connection part 52 may be spaced apart from an inner side wall 801*c* of the wall body 801. The spacer 60 may be fixedly arranged at the connection part 52 and may be located between the connection part 52 and the wall body 801.

When the mounting attachment 500 is used to mount the window air conditioner 1000, a center of gravity of the window air conditioner 1000 is located on the outdoor side 801*f*, and the spacer 60 can abut against the inner side wall 801*c* of the wall body 801, so that the mounting attachment 500 can be stuck at the window opening 801*a*. An edge of the window opening 801*a* is subjected to a certain force due to a gravitational force of the window air conditioner 1000. Since the orthographic projection area S1 of the spacer 60 on the projection plane 900*a* is larger than the orthographic projection area S2 of the connection part 52 on the projection plane 900*a*, an area of the window opening 801*a*, on which a force from the mounting attachment 500 acts, is larger. That is, a force-exerting area of the edge of the window opening 801*a* is larger, thus reducing the force per unit area of the window opening 801*a* while the force exerted on the window opening 801*a* remains constant. Hence, the deformation of the window opening 801*a* can be reduced effectively, avoiding damage caused by an excessive local force on the window opening 801*a*, improving the mounting reliability of the window air conditioner 1000, and ensuring normal use by the user.

It can be understood that the connection part 52 may be located on the outdoor side 801*f* of the wall body 801. For example, when a portion of the window air conditioner 1000 located on the indoor side 801*e* is heavy, the center of gravity of the window air conditioner 1000 is located on the indoor side 801*e*. The connection part 52 can be located on the outdoor side 801*f* of the wall body 801 to ensure the reliable installation of the window air conditioner 1000. At this time, the connection part 52 can be spaced apart from an outer side wall 801*d* of the wall body 801. The spacer 60 is located between the connection part 52 and the wall body 801. An extension length of a portion of the rack part 51 located on the outdoor side 801*f* may be smaller than an extension length of a portion of the rack part 51 located on the indoor side 801*e*. As a result, the force per unit area of the window opening 801*a* can likewise be reduced and the installation reliability of the window air conditioner 1000 can be improved.

Figure 30:
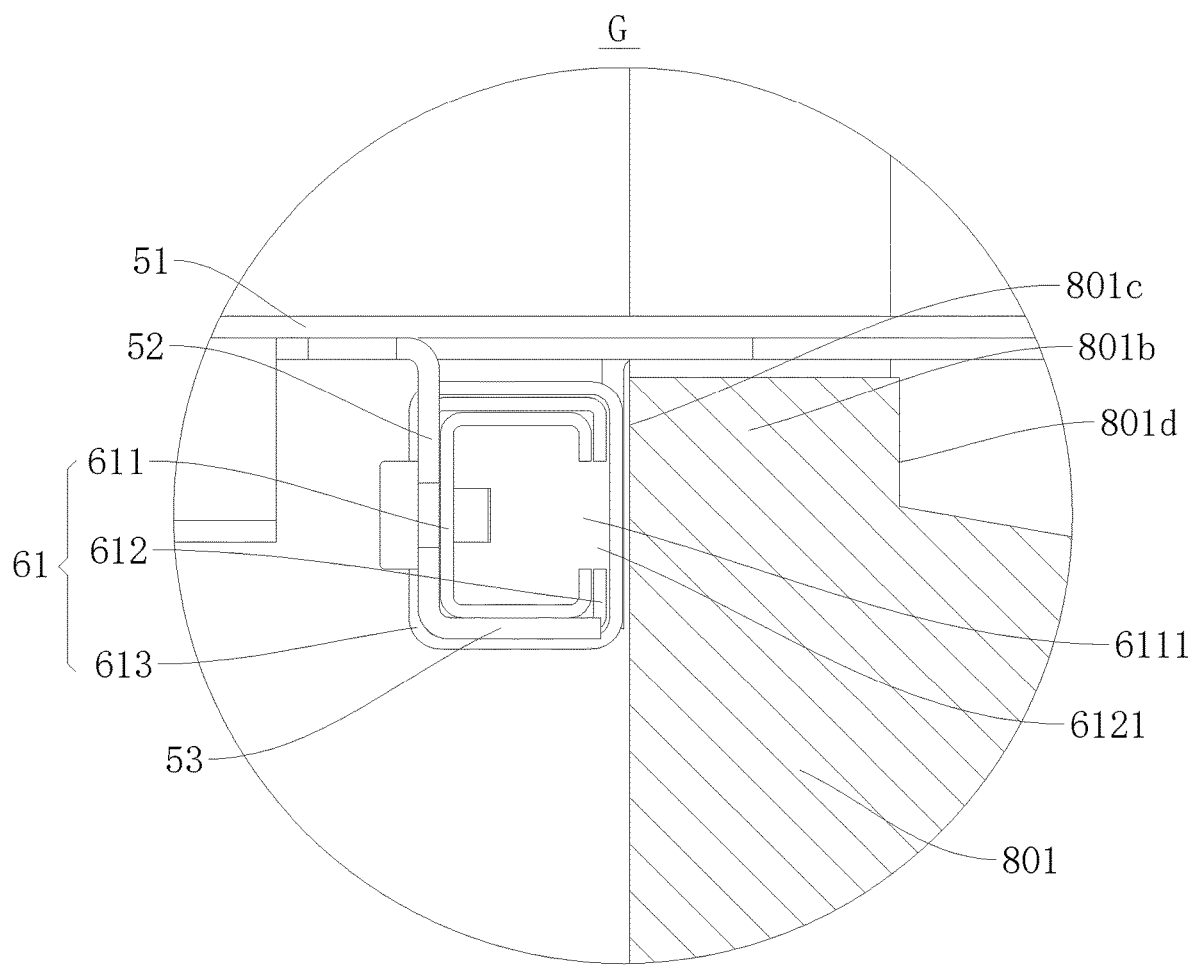
FIG. 30 is a partially enlarged view at G in FIG. 29.
Figure 31:
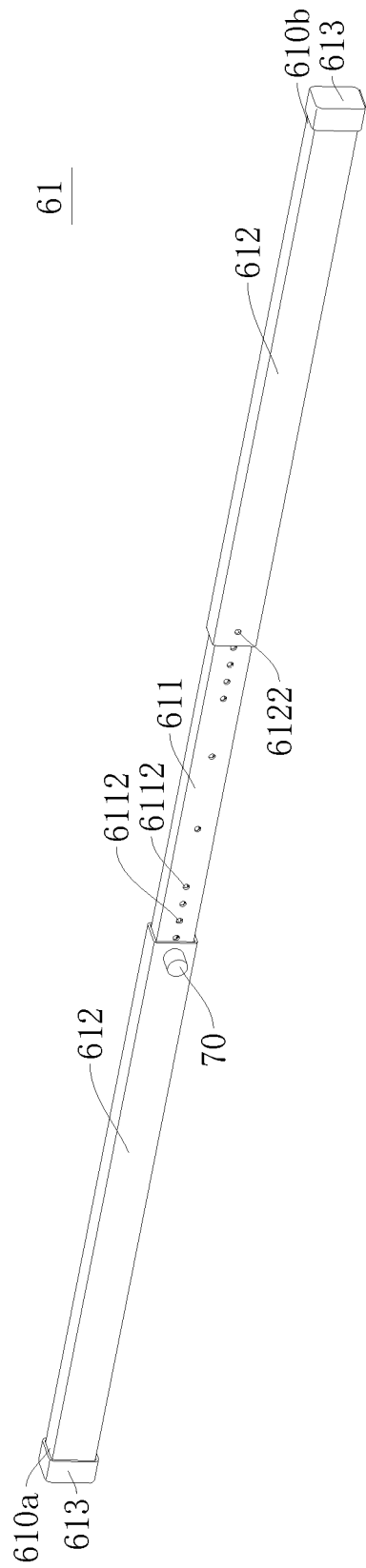
FIG. 31 is a schematic view of a telescopic structure according to embodiments of the present disclosure.

In some embodiments of the present disclosure, as shown in FIGS. 30 and 31, the spacer 60 includes a telescopic mechanism 61, and the telescopic mechanism 61 includes a first pulling member 611 and a second pulling member 612. The first pulling member 611 is in sliding cooperation with the second pulling member 612, so that a length of the telescopic mechanism 61 can be adjusted telescopically, thereby adjusting an orthographic projection area of the telescopic mechanism 61 on the projection plane 900*a* and thus the orthographic projection area S1 of the spacer 60 on the projection plane 900*a*. Hence, the area S1 may be increased or decreased, but the area S1 is always larger than the area S2. For example, as illustrated, both the first pulling member 611 and the second pulling member 612 can extend along a length direction of the telescopic mechanism 61, and the first pulling member 611 and the second pulling member 612 slide cooperatively so that the first pulling member 611 and the second pulling member 612 can move relative to each other in the length direction of the telescopic mechanism 61, to change a cooperating length of the first pulling member 611 and the second pulling member 612, so as to change the length of the telescopic mechanism 61. For example, the first pulling member 611 and the second pulling member 612 can move close to each other along the length direction of the telescopic mechanism 61 to increase the cooperating length of the first pulling member 611 and the second pulling member 612, thereby reducing the length of the telescopic mechanism 61. Alternatively, the first pulling member 611 and the second pulling member 612 can move away from each other along the length of the telescopic mechanism 61 to decrease the cooperating length of the first pulling member 611 and the second pulling member 612, thereby increasing the length of the telescopic mechanism 61. Thus, the telescopic mechanism 61 can be adjusted to a suitable length according to different window air conditioners 1000 to ensure a suitable force exerted on the window opening 801*a*, further enhancing the installation reliability of the window air conditioner 1000, and improving the applicability of the mounting attachment 500 to allow the mounting attachment 500 to be applied to window air conditioners 1000 of different weights. Moreover, the telescopic mechanism 61 can also be applied to different sizes of windows 801*a*, further enhancing the applicability of the mounting attachment 500.

In some embodiments of the present disclosure, with reference to FIG. 31, the first pulling member 611 is mounted at the connection part 52, and the second pulling member 612 is fitted over and slides outside the first pulling member 611. In an example of FIG. 31, the first pulling member 611 may be fixedly connected to the connection part 52, and the second pulling member 612 may define a hollow cavity. At least one axial end of the hollow cavity is open so that at least a portion of the first pulling member 611 is inserted into the hollow cavity to achieve a slip fit between the first pulling member 611 and the second pulling member 612, which is simple in structure and easy to implement. On the premise that the second pulling member 612 has sufficient strength, the amount of material used for the second pulling member 612 is reduced, the cost of the mounting attachment 500 is reduced, and a lightweight design of the mounting attachment 500 is facilitated, further reducing the force exerted on the window opening 801*a*.

It can be understood that the first pulling member 611 may also define a hollow cavity such that the first pulling member 611 is substantially formed as a hollow structure to further reduce the material cost of the mounting attachment 500 and reduce the weight of the mounting attachment 500.

In the example of FIG. 31, a first opening 6111 may be formed in the first pulling member 611 so that a cross-sectional shape of the first pulling member 611 is substantially C-shaped, and a second opening 6121 may be formed in the second pulling member 612 so that a cross-sectional shape of the second pulling member 612 is substantially C-shaped. Both the first opening 6111 and the second opening 6121 may be oriented toward the wall body 801 to ensure that the first pulling member 611 and the second pulling member 612 have sufficient bending stiffness. Certainly, the cross sections of the first pulling member 611 and the second pulling member 612 may be formed in other shapes, which will not be limited here. For example, the cross-sectional shape of the first pulling member 611 may also be formed as a ring (e.g., a square ring).

In some embodiments of the present disclosure, as shown in FIG. 31, the first pulling member 611 has a plurality of first positioning holes 6112, and the plurality of first positioning holes 6112 may be sequentially spaced along a length direction of the first pulling member 611; the second pulling member 612 has a second positioning hole 6122. When the first pulling member 611 and the second pulling member 612 move relative to each other, the plurality of first positioning holes 6112 can be sequentially right opposite to the second positioning hole 6122. The mounting attachment 500 also includes a positioning member 70, and the positioning member 70 is inserted through the second positioning hole 6122 and the first positioning hole 6112 right opposite to the second positioning hole 6122, to limit relative movement of the first pulling member 611 and the second pulling member 612 in the length direction of the telescopic mechanism 61, so as to fix the relative positions of the first pulling member 611 and the second pulling member 612 and ensure the stability of the length of the telescopic mechanism 61.

Specifically, when the first pulling member 611 and the second pulling member 612 slide relative to each other to adjust the length of the telescopic mechanism 61, the positioning member 70 may not be inserted into the second positioning hole 6122 and the corresponding first positioning hole 6112; when the first pulling member 611 and the second pulling member 612 slide until the length of the telescopic mechanism 61 is appropriate, the user can insert the positioning member 70 into the second positioning hole 6122 and the corresponding first positioning hole 6112 to limit the relative movement of the first pulling member 611 and the second pulling member 612, and at this time the length of the telescopic mechanism 61 cannot be changed, so that the length of the telescopic mechanism 61 is stable, leading to good reliability during use.

In some embodiments of the present disclosure, as shown in FIG. 31, the positioning member 70 is a pin, or a screw, or a bolt, so that the positioning member 70 has a good positioning effect and is reliable during use, ensuring the reliability of use of the mounting attachment 500. Moreover, it is convenient for the user to insert the positioning member 70 into the second positioning hole 6122 and the corresponding first positioning hole 6112, which facilitates the assembly of the mounting attachment 500. Furthermore, the positioning member 70 is simple in structure and low in cost. It can be understood that the positioning member 70 can also form other structural components that can achieve a positioning effect, which will not be limited here, as long as the positioning member 70 can be inserted into the second positioning hole 6122 and the corresponding first positioning hole 6112 to limit the relative sliding between the first pulling member 611 and the second pulling member 612.

In a further embodiment of the present disclosure, referring to FIG. 31, two longitudinal ends of the telescopic mechanism 61 are a first end 610*a* and a second end 610*b* respectively. The spacer 60 also includes an end cap 613 fitted over the first end 610*a* and/or the second end 610*b*. That is, the spacer 60 includes an end cap 613 fitted over the first end 610*a*; or the spacer 60 includes an end cap 613 fitted over the second end 610*b*; or the spacer 60 includes an end cap 613 fitted over the first end 610*a* and an end cap 613 fitted over the second end 610*b*. Thus, when the user operates the spacer 60, the first end 610*a* and/or the second end 610*b* are/is not in direct contact with the user and the user will not be scratched. Thus, the end cap 613 can protect the user and ensure the safety of using the spacer 60.

For example, as shown in FIG. 31, the first end 610*a* and the second end 610*b* are each provided with the end cap 613. When the mounting attachment 500 is used to mount the window air conditioner 1000, the length of the telescopic mechanism 61 can be adjusted to be greater than a width of the window opening 801*a*, and the two end caps 613 can abut against two sides of the window opening 801*a*, respectively. Due to a certain thickness of the end cap 613, the end cap 613 can further effectively disperse the force exerted on an edge of the window opening 801*a*, on which the rack part 51 is mounted, to other edges on both sides of the above edge, on which no rack part 51 is mounted. Thus, on the premise of increasing the force-exerting area of the window opening 801*a*, the force exerted on the edge of the window opening 801*a*, on which the rack part 51 is mounted, is reduced, making force distribution of the edges of the window opening 801*a* reasonable, and further improving the installation reliability of the window air conditioner 1000.

In some optional embodiments of the present disclosure, two second pulling members 612 are arranged, and the two second pulling members 612 are located on both sides of the connection part 52. For example, as shown in FIG. 31, the two second pulling members 612 can be located on both sides of the connection part 52 along the length direction of the telescopic mechanism 61, and each second pulling member 612 is in sliding cooperation with the first pulling member 611. Thus, at least one of the two second pulling members 612 can be moved to adjust the length of the telescopic mechanism 61, thereby expanding a length adjustment range of the telescopic mechanism 61 and further improving the applicability of the mounting attachment 500.

In some embodiments of the present disclosure, when the spacer 60 includes the end cap 613 fitted over the first end 610*a*, direct contact between the first end 610*a* and the user can be avoided, protecting the user from scratches; when the spacer 60 includes the end cap 613 fitted over the second end 610*b*, direct contact between the second end 610*b* and the user can be avoided, protecting the user from scratches; when the spacer 60 includes the end cap 613 fitted over the first end 610*a* and the end cap 613 fitted over the second end cap 613, the first end 610*a* and the second end 610*b* can be prevented from being in direct contact with the user and scratching the user.

It can be understood that the first end 610*a* may be an end of the first pulling member 611 or an end of the second pulling member 612, and the second end 610*b* may be an end of the first pulling member 611 or an end of the second pulling member 612. For example, when there is one first pulling member 611 and one second pulling member 612, the first end 610*a* may be an end of the first pulling member 611 away from the second pulling member 612, and the second end 610*b* may be an end of the second pulling member 612 away from the first pulling member 611; when there is one first pulling member 611 and two second pulling members 612, the two second pulling members 612 may be located on both sides of the connection part 52 along the length direction of the telescopic mechanism 61, and the first end 610*a* and the second end 610*b* may be ends of the second pulling members 612 away from each other, which is not limited thereto however.

Further, when there is one first pulling member 611 and one second pulling member 612, and the first pulling member 611 is mounted on the connection part 52, the first end 610*a* may be an end of the first pulling member 611 away from the second pulling member 612, and the second end 610*b* can be an end of the second pulling member 612 away from the first pulling member 611. In such a case, when the length of the telescopic mechanism 61 needs to be changed, the user can simply operate the second pulling member 612, and the end cap 613 may be only fitted over the second end 610*b*, which is not limited thereto however. When there is one first pulling member 611 and two second pulling members 612, and the first pulling member 611 is mounted on the connection part 52, the two second pulling members 612 can be located on both sides of the connection part 52 along the length direction of the telescopic mechanism 61, and the first end 610*a* and the second end 610*b* can be ends of the second pulling members 612 away from each other. When the length of the telescopic mechanism 61 needs to be changed, the user can operate at least one of the two second pulling members 612, and there may be two end caps 613 fitted over the first end 610*a* and the second end 610*b*, respectively, which is not limited thereto however.

As shown in FIG. 31, the end cap 613 can be a rubber part or a plastic part, so that the end cap 613 can effectively prevent the telescopic mechanism 61 from scratching the user, and the end cap 613 is easy to mold at a low cost, which ensures the practicality of the spacer 60. It can be understood that the end cap 613 may also be made of other materials. For example, the end cap 613 can also be a metal part, such as a sheet metal part, in which case an outer surface of the end cap 613 can be designed as a smooth curved surface, that is, the outer surface of the end cap 613 outer surface has no sharp corner, which can ensure the operation safety of the user.

In some embodiments of the present disclosure, referring to FIG. 28, the mounting rack 50 also includes a bottom-holding member 53 connected to a lower portion of the connection part 52 and supported on a bottom of the spacer 60. In examples of FIG. 27 and FIG. 30, the rack part 51 may be located on a bottom edge 801*b* of the window opening 801*a*, and the connection part 52 may extend in an up-down direction, with an upper end of the connection part 52 connected to the rack part 51 and a lower end of the connection part 52 connected to the bottom-holding member 53. In a process of mounting the spacer 60 to the connection part 52, a bottom surface of the spacer 60 may be placed on the bottom-holding member 53 so that the bottom-holding member 53 supports the spacer 60 to limit downward movement of the spacer 60, thus realizing the limitation of the spacer 60 and facilitating the installation of the spacer 60.

In some embodiments of the present disclosure, the rack part 51, the connection part 52 and the bottom-holding member 53 may be integrally formed.

Figure 29:
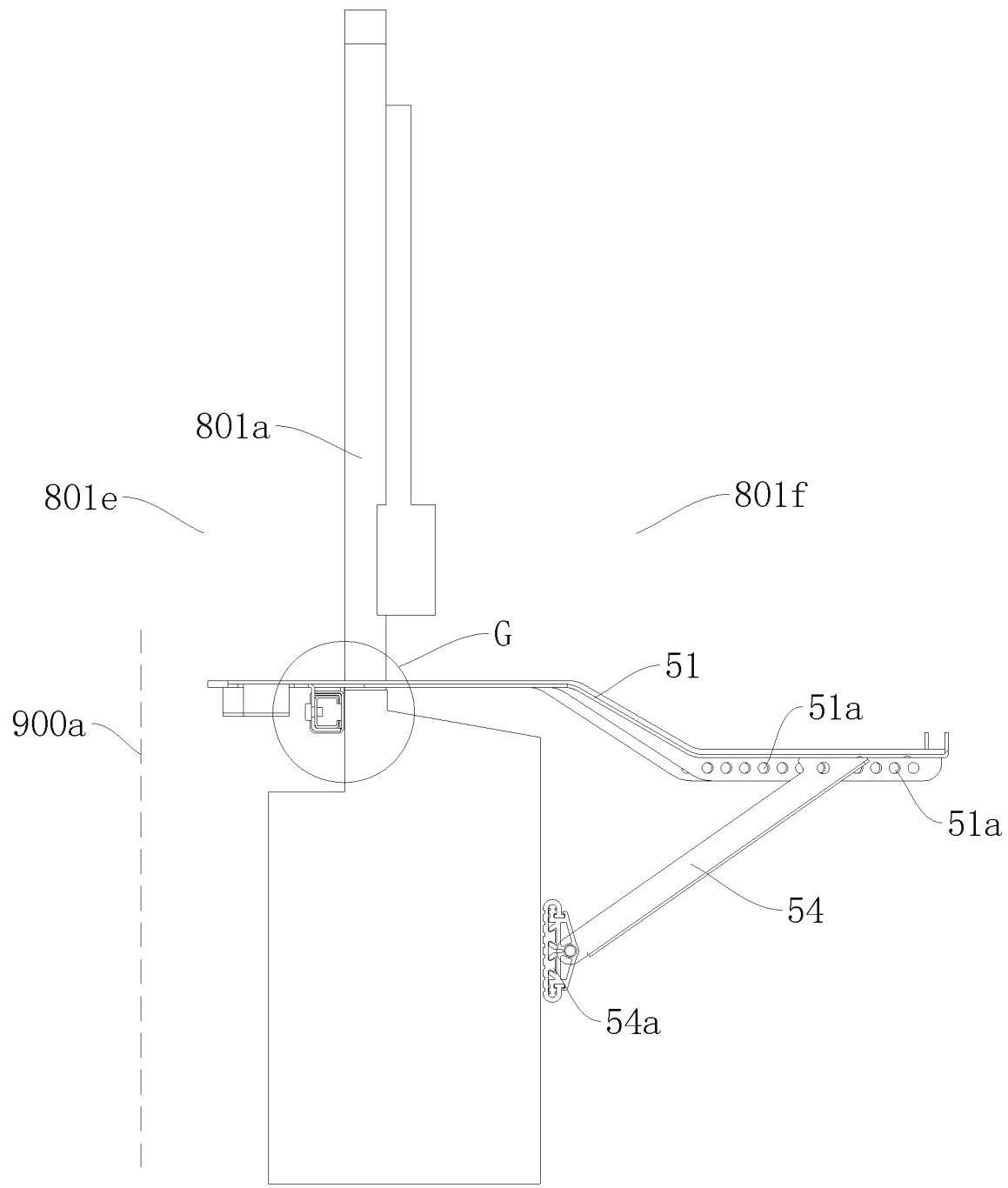
FIG. 29 is a side view according to FIG. 26.

In some embodiments of the present disclosure, as shown in FIG. 29, the rack part 51 has at least one articulation hole 51*a*. The mounting attachment 500 also includes a support rod 54, a first end of the support rod 54 being articulated with the rack part 51 through the articulation hole 51*a*, and a second end of the support rod 54 having an anti-slip member 54*a* and abutting against the wall body 801. The articulation hole 51*a* can be located at an end of the rack part 51 located on the outdoor side 801*f*. There may be a plurality of articulation holes 51*a* arranged at intervals along a length direction of the rack part 51. The first end of the support rod 54 is articulated with the rack part 51 through one articulation hole 51*a* to adjust an installation position of the support rod 54, and allow the support rod 54 to rotate around the first end to change an angle between the support rod 54 and the rack part 51, so that the mounting rack assembly 100 can adapt to the wall body 801 with a different thickness. Since the second end of the support rod 54 abuts against the wall body 801 through the anti-slip member 54*a*, the second end of the support rod 54 has greater friction with the wall body 801 to ensure a supporting effect of the support rod 54. Thus, the support rod 54 can cooperate with the wall body 801 without additional complicated fixing structures, which improves the overall structural stability of the mounting rack assembly 100. Certainly, there may be only one articulation hole 51*a*.

The anti-slip member 54*a* may be a rubber member, which is not limited thereto however.

In a further embodiment of the present disclosure, referring to FIG. 28, the mounting attachment 500 also includes a connection member 80, and the spacer 60 is detachably mounted at the connection part 52 by the connection member 80, so that the spacer 60 and the connection part 52 are detachably connected by the connection member 80. In such a case, the spacer 60 and the connection part 52 are two independent parts and are connected together by assembling means, thus simplifying the structures of the spacer 60 and the connection part 52, and facilitating the processing and assembly/disassembly of the spacer 60 and the connection part 52. The connection member 80 may be a threaded connection member 80, such as a bolt and a screw, but is not limited thereto.

In an example of FIG. 28, a first connection hole is formed in the connection part 52 and a second connection hole is formed in the spacer 60. Since the spacer 60 is located on a side of the connection part 52 close to the wall body 801, the connection member 80 can be inserted into the first connection hole and the second connection hole in sequence to securely connect the connection part 52 and the support member 1111 and realize the installation of the spacer 60. Since the connection member 80 is inserted into the connection part 52 and the spacer 60 in sequence, and the spacer 60 is located on the side of the connection part 52 close to the wall body 801, the user can install the spacer 60 indoors, which facilitates the assembly of the mounting attachment 500. Moreover, installation of various components of the mounting attachment 500 is reasonable, and for example, the mounting rack 50 can be mounted first, and then the spacer 60 can be mounted on the connection part 52, which further enhancing the assembly efficiency of the mounting attachment 500.

In some embodiments of the present disclosure, the rack part 51 is located on the bottom edge 801*b* of the window opening 801*a*, the connection part 52 extends downward from the rack part 51, and the spacer 60 extends along a length direction of the bottom edge 801*b*. For example, as shown in FIG. 26, the window opening 801*a* may include a plurality of edges including a top edge, a bottom edge 801*b*, and side edges, with the top edge and the bottom edge 801*b* opposite each other in the up-down direction, and the side edges located on sides of the top edge and the bottom edge 801*b*, so that an orthographic projection of the window opening 801*a* on the projection plane 900*a* forms a closed pattern. The bottom edge 801*b* may extend horizontally, and the rack part 51 may be located on an upper surface of the bottom edge 801*b* so that the bottom edge 801*b* supports the rack part 51 and reduces a force on a fixing member that mounts the rack part 51 to the wall body 801. The rack part 51 may be formed with a through hole, and the connection part 52 may be formed in such a way that a side edge of the through hole away from the wall body 801 extends vertically downward. The spacer 60 may extend in an extension direction of the bottom edge 801b to abut against the inner side wall 801c or the outer side wall 801c, thereby enlarging a contact area between the mounting attachment 500 and the edge of the window opening 801a to avoid deformation or damage of the bottom edge 801b and ensure the installation reliability of the window air conditioner.

It can be understood that the spacer 60 may abut against the inner side wall 801c of the bottom edge 801b when the connection part 52 is located on the indoor side 801e of the wall body 801; the spacer 60 may abut against the outer side wall 801d of the bottom edge 801b when the connection part 52 is located on the outdoor side 801f of the wall body 801.

In the description of the present disclosure, it shall be understood that terms such as "central," "longitudinal," "transverse," "length," "width," "thickness," "upper," "lower," "vertical," "horizontal," "top," "bottom," "inner," "outer," "axial," "radial," "circumferential" and the like should be construed to refer to the orientation as then described or as shown in the drawings under discussion. These relative terms are for convenience and simplicity of description and do not indicate or imply that the devices or elements referred to have a particular orientation and be constructed or operated in a particular orientation. Thus, these terms shall not be construed as limitation on the present disclosure.

Figure 32:
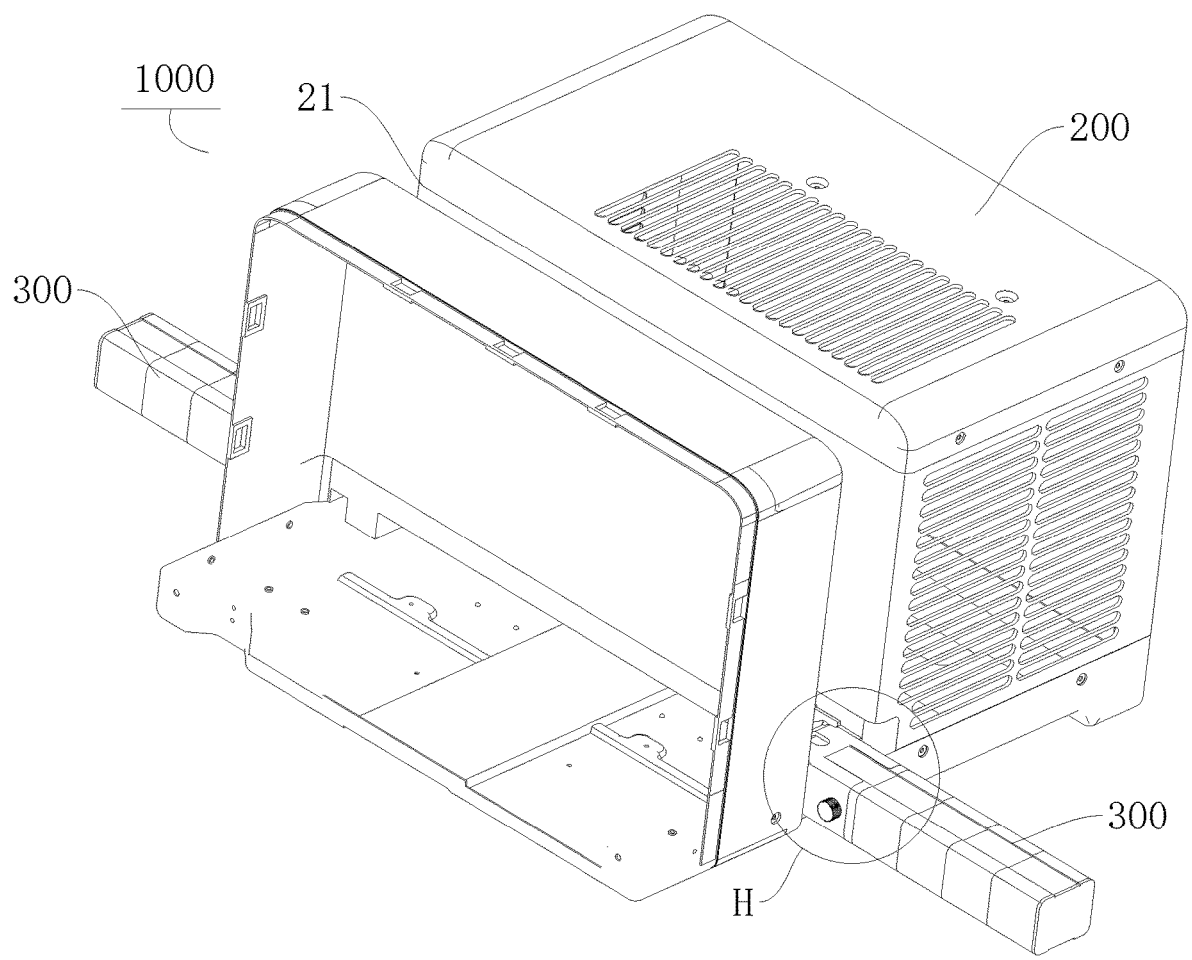
FIG. 32 is a schematic view of a window air conditioner according to embodiments of the present disclosure.
Figure 33:
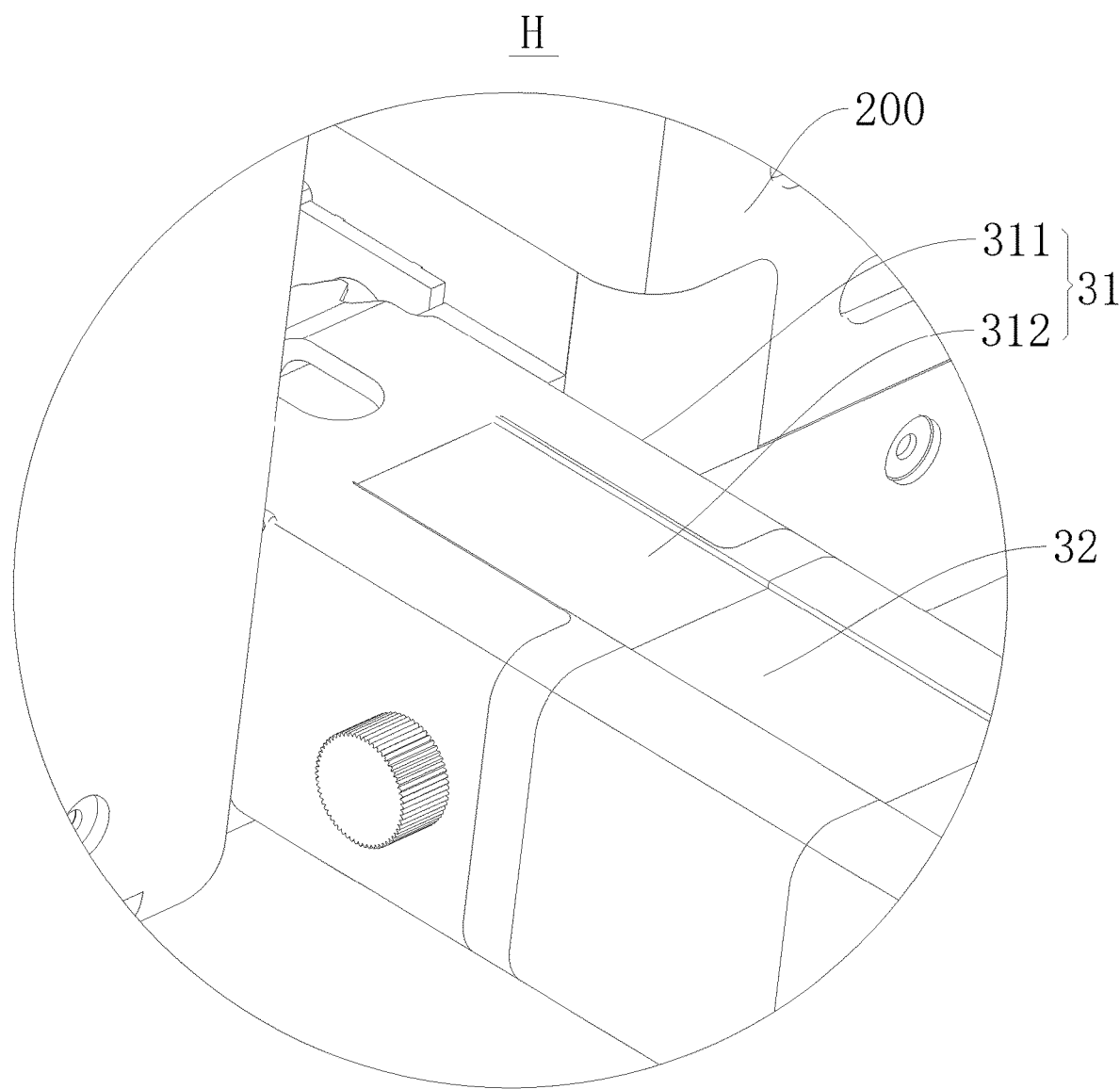
FIG. 33 is a partially enlarged view at H in FIG. 32.

In some embodiments of the present disclosure, as shown in FIGS. 32 and 33, the window air conditioner 1000 includes a sealing assembly 300, which is in contact with the window and the inner wall of the window opening 801a. The sealing assembly 300 includes a first connection component 31 having a variable length and a plurality of second connection components 32. The first connection component 31 includes a fixed member 311 and a sliding block 312, at least a portion of the fixed member 311 is located in the receiving groove 21, and the sliding block 312 is in sliding cooperation with the fixed member 311. Any one of the second connection components 32 is detachably connected to the sliding block 312, and any two of the second connection components 32 are detachably connected to each other. The fact "at least a portion of the fixed member 311 is located in the receiving groove 21" can be understood in such a way that a portion of the fixed member 311 is located in the receiving groove 21, or the entire fixed member 311 is located in the receiving groove 21.

Accordingly, since the sealing assembly 300 includes the first connection component 31, and the first connection component 31 includes the fixed member 311 and the sliding block 312, the sealing assembly 300 can be mounted at the window air conditioner 1000 using the fixed member 311, which facilitates the arrangement of the sealing assembly 300 and avoids losing the sealing assembly 300. Moreover, through the sliding cooperation between the sliding block 312 and the fixed member 311, the length of the first connection component 31 can be adjusted, so that a sealing length of the sealing assembly 300 can be adjusted, and the sealing assembly 300 can seal windows of different sizes, which can enhance a sealing effect of the sealing assembly 300, broaden an application range of the sealing assembly 300 and an application range of the window air conditioner 1000, and improve the functionality and applicability of the window air conditioner 1000.

Figure 34:
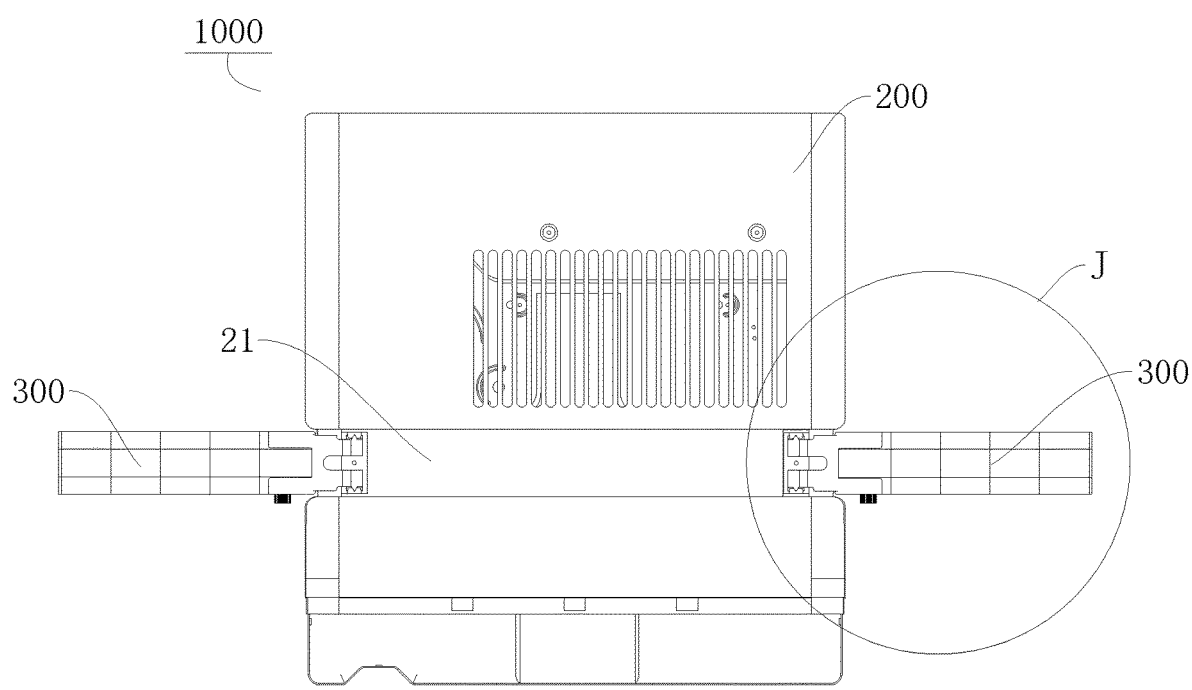
FIG. 34 is a plan view of a window air conditioner according to embodiments of the present disclosure.
Figure 35:
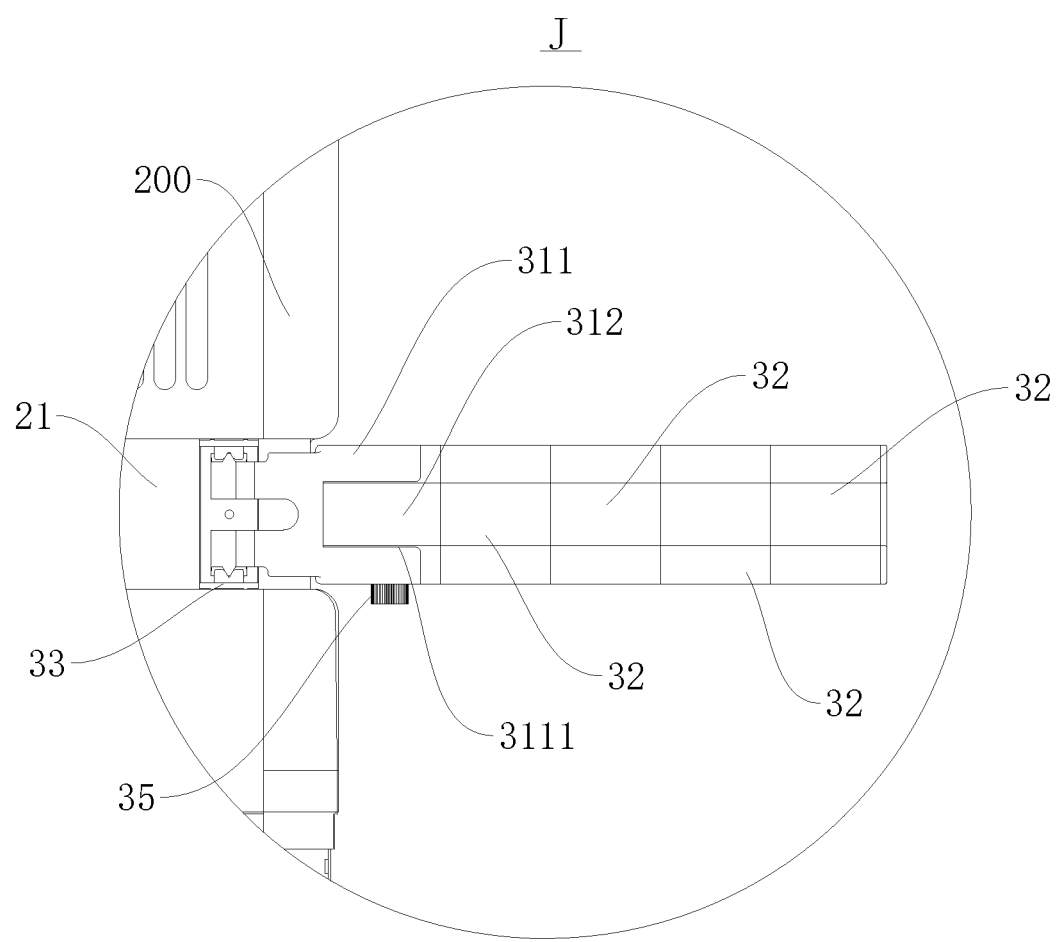
FIG. 35 is a partially enlarged view at J in FIG. 34.

In some embodiments of the present disclosure, as shown in FIGS. 34 and 35, the sealing assembly 300 also includes a rotatable support 33 fixed to the housing 200, and the fixed member 311 is rotatably located on the rotatable support 33 so that the sealing assembly 300 can be rotated to be stored in the receiving groove 21. As a result, the installation of the fixed member 311 can be facilitated, and the rotation of the fixed member 311 relative to the rotatable support 33 can be realized, which facilitates the storage of the sealing assembly 300 and reduces space occupied by the sealing assembly 300.

In some embodiments of the present disclosure, as shown in FIG. 35, the window air conditioner 1000 also includes a sliding positioning assembly 35, which is located on the fixed member 311 and cooperates with the sliding block 312 to position the sliding block 312 in a current position. In such a way, the sliding positioning assembly 35 can be used to position the sliding block 312 to maintain the sealing assembly 300 at a specific sealing length, improve the structural stability of the sealing assembly 300, and achieve reliable sealing of the sealing assembly 300.

In some embodiments of the present disclosure, as shown in FIG. 35, the fixed member 311 is provided with a sliding cavity 3111, and at least a portion of the sliding block 312 extends into the sliding cavity 3111; the sliding positioning assembly 35 is a rotation member, and the rotation member is rotatably inserted into the fixed member 311 to adjust a length of a portion of the rotation member which extends into the sliding cavity 3111. The rotation member can abut against the sliding block 312 to position the sliding block 312. Thus, the cooperation between the fixed member 311 and the sliding block 312 and the sliding of the sliding block 312 relative to the fixed member 311 can be facilitated.

Further, as shown in FIG. 35, the sliding positioning assembly 35 is a rotation member, and the rotation member is rotatably inserted into the fixed member 311 to adjust a length of a portion of the rotation member which extends into the sliding cavity 3111. The rotation member can abut against the sliding block 312 to position the sliding block 312. Thus, the user can control whether the sliding block 312 can slide by rotating the rotation member, and adjust the length of the sliding block 312 as needed.

Figure 36:
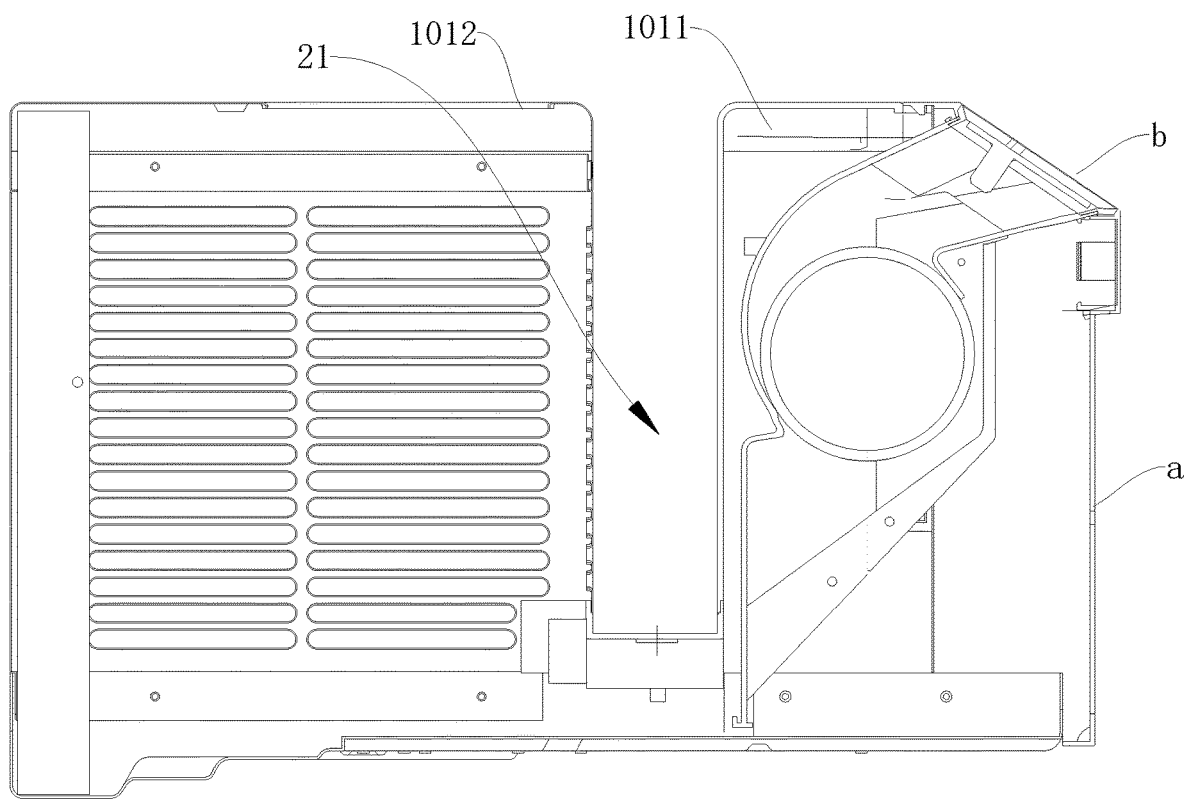
FIG. 36 is a schematic view of a window air conditioner according to embodiments of the present disclosure.

In some embodiments of the present disclosure, as shown in FIG. 36, the receiving groove 21 divides the housing into an indoor part 1011 and an outdoor part 1012. The indoor part 1011 has an air inlet a and an air outlet b. An indoor heat exchanger is arranged at the indoor part 103 and located between the air inlet a and the air outlet b. Indoor air can flow from the air inlet a into the indoor part 1011 and be discharged through the air outlet b, to regulate an indoor temperature.

Figure 37:
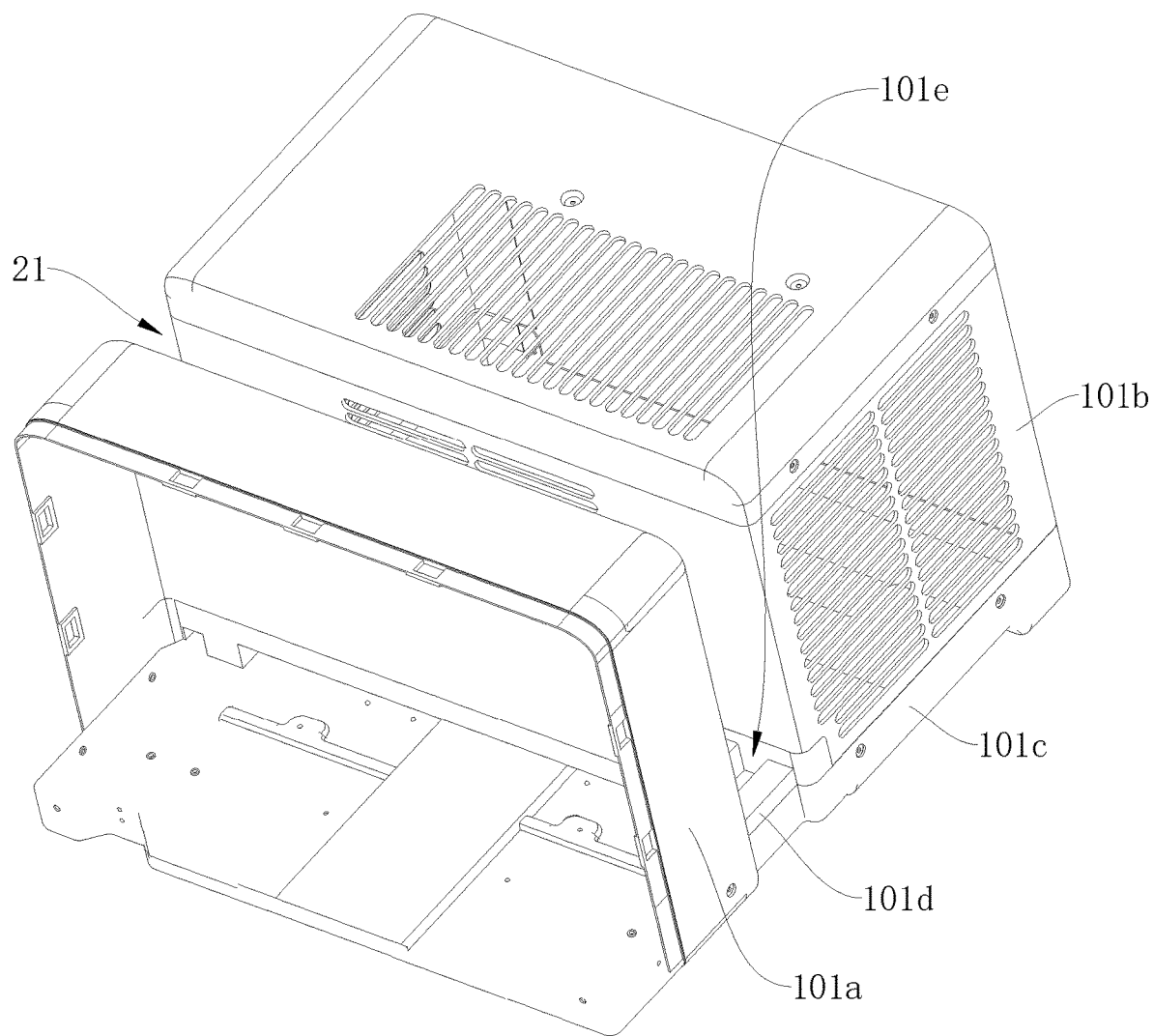
FIG. 37 is a schematic view of a window air conditioner according to embodiments of the present disclosure, in which a sealing assembly is removed from a housing.

Specifically, as shown in FIG. 37, the housing 200 includes a chassis 101c, a rear case 101b and a front case 101a. The rear case 101b is fixed at the chassis 101c and houses an outdoor heat exchanger. The front case 101a is fixed at the chassis 101c, and the front case 101a and the rear case 101b are spaced apart to form the receiving groove 21. Thus, the formation of the receiving groove 21 can be facilitated, to allow the window air conditioner 1000 to fit with the window, and the processing and manufacturing of the housing 200 becomes convenient, which improves the appearance aesthetics of the housing 200.

More specifically, the housing 200 also includes an intermediate partition plate 101d fixed to the chassis 101c and located in the receiving groove 21, and front and rear ends of the intermediate partition plate 101d cooperate with the rear case 101b and the front case 101a, respectively, which allows a lower surface of the window to abut against the intermediate partition plate 101*d* conveniently, facilitates the wiring and drainage of the window air conditioner 1000, and improves the working reliability of the window air conditioner 1000.

In some embodiments of the present disclosure, the above rotatable support 33 can be mounted at the intermediate partition plate 101*d*. Specifically, the intermediate partition plate 101*d* is provided with a placement space 101*e* having an open top, and the rotatable support 33 is stored in the placement space 101*e*. The fixing member 311 is provided with a receiving space. When the sealing assembly 300 is rotated to protrude from the receiving groove 21, an outer side edge of the placement space 101*e* extends into the receiving space, so that the sealing assembly 300 is substantially flush with the intermediate partition plate 101*d*. Thus, the sealing assembly 300 in a state of sealing the window opening 801*a* can be parallel or generally parallel to the chassis 101*c*, reducing the height of the sealing assembly 300 in the state of sealing window opening 801*a*, relative to the window opening 801*a*, which can further ensure the sealing effect.

In the description of the present disclosure, reference to terms "one embodiment," "some embodiments," "an exemplary embodiment," "an example," "a specific example," "some examples" or the like means that a particular feature, structure, material, or characteristic described in connection with the embodiment or example is included in at least one embodiment or example of the present disclosure. In this specification, the above terms are not necessarily referring to the same embodiment or example Furthermore, the particular features, structures, materials, or characteristics described may be combined in any suitable manner in one or more embodiments or examples.

Although embodiments of the present disclosure have been shown and described, it would be appreciated by those skilled in the art that various changes, modifications, alternatives and variants can be made to these embodiments without departing from principles and purposes of the present disclosure, and the scope of the present disclosure is defined by claims and their equivalents.

What is claimed is:

1. A rear panel assembly comprising:
   a rear panel body provided with a vent, the rear panel body including a support member; and
   a motor bracket arranged at a side of the rear panel body and connected to the rear panel body, the motor bracket being at least partially opposite to the vent, the motor bracket being provided with an air hole to allow air to flow into the vent through the air hole, and the motor bracket including:
   a motor mounting part;
   a support part, a first end of the support part being connected to an outer peripheral wall of the motor mounting part, and a second end of the support part being connected to the support member of the rear panel body, and the support part including a bottom plate and a plurality of staggered rib plates connected to a side of the bottom plate away from the rear panel body; and
   a connection arm spaced apart from the support part along a peripheral direction of the motor mounting part, a first end of the connection arm being connected to the outer peripheral wall of the motor mounting part, and a second end of the connection arm being connected to the rear panel body;

wherein:
   the motor mounting part, at least a portion of the support part, and at least a portion of the connection arm are opposite to the vent; and
   at least one of the motor mounting part, the support part, and the connection arm is provided with the air hole.

2. The rear panel assembly according to claim 1, wherein the motor mounting part includes:
   a bottom plate provided with an avoidance hole;
   a first annular plate connected to a side of the bottom plate away from the rear panel body and forming a motor mounting hole opposite to the avoidance hole and configured to mount a motor;
   a second annular plate sleeved outside the first annular plate and spaced apart from the first annular plate; and
   a plurality of connection plates connected between the first annular plate and the second annular plate and arranged at intervals along a circumferential direction of the first annular plate.

3. The rear panel assembly according to claim 1, wherein:
   the connection arm is provided with a plurality of air holes distributed at intervals along a length direction of the connection arm; or
   the connection arm includes:
   a first segment, a first end of the first segment being connected to the rear panel body, and a projection of the first segment on a plane where the vent being located is outside the vent; and
   a second segment at an angle to the first segment, a first end of the second segment being connected to a second end of the first segment, a second end of the second segment being connected to the outer peripheral wall of the motor mounting part, and a projection of the second segment on the plane is inside the vent.

4. The rear panel assembly according to claim 1, wherein the connection arm includes a bottom plate and two side plates connected to the bottom plate through smooth transition to form a recess extending along a length direction of the connection arm, and an opening of the recess faces a space formed by the motor bracket and the rear panel body.

5. The rear panel assembly according to claim 1, wherein:
   an inner wall of the vent is smoothly connected to a surface of the rear panel body facing the motor bracket;
   the motor bracket and the rear panel body are integrally formed; or
   an air guide ring is arranged at the vent and extends toward a side away from the motor bracket.

6. The rear panel assembly according to claim 1, wherein:
   the rear panel assembly is configured to be used in a window air conditioner that further includes:
   a heat exchanger; and
   side boards arranged at opposite sides of the heat exchanger;
   a first vertical plate and a second vertical plate are arranged at each of two opposite sides of the rear wall body and spaced apart from each other, the first vertical plate and the second vertical plate extending in a vertical direction;
   a plurality of first baffles are connected between a first end of the first vertical plate and a first end of the second vertical plate, the plurality of first baffles being arranged at intervals in the vertical direction with a gap formed between each two adjacent ones of the first baffles;
   a second end of one of the first vertical plate and the second vertical plate is connected with a plurality of second baffles parallel to the first baffles and a space exists between the second baffles and another one of the first vertical plate and the second vertical plate to allow the side boards to pass through;

the plurality of second baffles are in one-to-one correspondence with and opposite to the gaps between the first baffles;

a portion of one of the side boards is located in a sliding groove formed by one first baffle of the first baffles and one second baffle of the second baffles; and a surface of the one first baffle facing the sliding groove has a first inclined guide surface located at a lower end of the one first baffle and inclined toward a direction away from the sliding groove in an up-to-down direction; and a surface of the one second baffle facing the sliding groove has a second inclined guide surface located at a lower end of the one second baffle and inclined toward the direction away from the sliding groove in the up-to-down direction.

7. The rear panel assembly according to claim 6, wherein:
a water-retaining rib is arranged at the vent and located on one side of a vertical reference plane passing through a central axis of the vent;
the water-retaining rib protrudes toward a side of the rear panel body close to the motor bracket;
the water-retaining rib extends along a peripheral direction of the vent; and
a lower end of the water-retaining rib is adjacent to a bottom end of the vent.

8. The rear panel assembly according to claim 7, wherein:
an angle between the reference plane and a line connecting a bottom end of the water-retaining rib and a center of the vent is larger than or equal to 10° and smaller than or equal to 20°; or
an angle between the reference plane and a line connecting a top end of the water-retaining rib and the center of the vent is larger than or equal to 90° and smaller than or equal to 145°.

9. The rear panel assembly according to claim 7, wherein:
the water-retaining rib is a first water-retaining rib, and the one side of the reference plane is a first side of the reference plane;
a second water-retaining rib is arranged at the vent and located on a second side of the reference plane;
the second water-retaining rib protrudes toward the side of the rear panel body close to the motor bracket;
the second water-retaining rib extends along the peripheral direction of the vent; and
a lower end of the second water-retaining rib is adjacent to the bottom end of the vent.

10. The rear panel assembly according to claim 9, wherein:
an angle between the reference plane and a line connecting a bottom end of the second water-retaining rib and the center of the vent is larger than or equal to 10° and smaller than or equal to 20°; or
an angle between the reference plane and a line connecting a top end of the second water-retaining rib is larger than or equal to 45° and smaller than or equal to 65°.

11. A window air conditioner comprising:
a housing; and
the rear panel assembly according to claim 1, the rear panel assembly being arranged at the housing.

12. The window air conditioner according to claim 11, further comprising:

a sealing assembly configured to be in contact with an inner wall of a window opening of a wall body and a movable window provided in the window opening when the window air conditioner is supported in the window opening;
wherein:
the housing has a receiving groove configured to receive at least a portion of the window; and
the sealing assembly includes:
a first connection component having a variable length and including a fixed member located in the receiving groove and a sliding block in sliding cooperation with the fixed member; and
a plurality of second connection components each being detachably connected to the sliding block, and any two of the plurality of second connection components being configured to be detachably connected to each other.

13. The window air conditioner according to claim 12, further comprising:
a sliding positioning assembly located at the fixed member and configured to cooperate with the sliding block to position the sliding block at a position;
wherein:
the sealing assembly further includes a rotatable support fixed to the housing;
the fixed member is rotatably located at the rotatable support to allow the sealing assembly to rotate to be stored in the receiving groove;
the fixed member is provided with a sliding cavity, and at least a portion of the sliding block extends into the sliding cavity; and
the sliding positioning assembly is configured to:
be rotatably inserted into the fixed member and in threaded fit with the fixed member;
rotates to adjust a length of a portion of the sliding positioning assembly that extends into the sliding cavity; and
abut against the sliding block to position the sliding block.

14. A window air conditioner apparatus comprising:
the window air conditioner according to claim 11; and
a mounting assembly including:
a storage box made of polystyrene foam; and
a mounting attachment;
wherein the window air conditioner has:
a mounted state in which the window air conditioner is mounted at a window opening of a wall body by the mounting attachment and a receiving groove of the housing receives a movable window of the window opening; and
an unmounted state in which the mounting attachment is stored in the storage box and the storage box is placed in the receiving groove and held by opposite side walls of the receiving groove.

15. The window air conditioner apparatus according to claim 14, wherein the mounting attachment includes:
a mounting rack including:
a rack part configured to be mounted on the wall body to mount the window air conditioner; and
a connection part configured to be connected to the rack part and located on an indoor side or an outdoor side of the wall body; and
a spacer configured to be mounted at the connection part and located on a side of the connection part close to the wall body, and an orthographic projection area of the spacer on a projection plane perpendicular to a thickness direction of the wall body being larger than an orthographic projection area of the connection part on the projection plane.

16. The window air conditioner apparatus according to claim 15, wherein:
the spacer includes a telescopic mechanism including:
a first pulling member mounted at the connection part and having a plurality of first positioning holes; and
a second pulling member configured to be fitted over and slide outside the first pulling member to adjust a length of the telescopic mechanism telescopically, the second pulling member having a second positioning hole; and
the mounting attachment includes a positioning member configured to be inserted through the second positioning hole and one of the first positioning holes right opposite to the second positioning hole.

17. The window air conditioner apparatus according to claim 15, wherein:
the mounting attachment further includes a connection member, and the spacer is detachably mounted at the connection part by the connection member;
the mounting rack further includes a bottom-holding member connected to a lower portion of the connection part and supported on a bottom of the spacer;
the rack part has an articulation hole and the mounting attachment further includes a support rod, a first end of the support rod being articulated with the rack part through the articulation hole, and a second end of the support rod having an anti-slip member and being configured to abut against the wall body; or
the rack part is configured to be arranged at a bottom edge of the window opening, the connection part extends downward from the rack part, and the spacer extends along a length direction of the bottom edge.

18. The window air conditioner apparatus according to claim 14, wherein:
the mounting attachment includes a plurality of members;
a plurality of receiving cavities are formed within the storage box and spaced apart from each other; and
the plurality of receiving cavities are in one-to-one correspondence with the plurality of members, and each of the plurality of members is received in a corresponding one of the receiving cavities.

* * * * *